US007350238B2

(12) United States Patent
Abe et al.

(10) Patent No.: US 7,350,238 B2
(45) Date of Patent: Mar. 25, 2008

(54) DATA TRANSFER SYSTEM, DATA TRANSFER APPARATUS, DATA-RECORDING APPARATUS, DATA MANAGEMENT METHOD AND IDENTIFIER GENERATION METHOD

(75) Inventors: Miki Abe, Kanagawa (JP); Takafumi Hosoi, Tokyo (JP); Hiromi Matsuda, Kanagawa (JP); Masao Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 579 days.

(21) Appl. No.: 10/344,432

(22) PCT Filed: Jun. 13, 2002

(86) PCT No.: PCT/JP02/05908

§ 371 (c)(1),
(2), (4) Date: Jul. 28, 2003

(87) PCT Pub. No.: WO02/103529

PCT Pub. Date: Dec. 27, 2002

(65) Prior Publication Data

US 2004/0015713 A1 Jan. 22, 2004

(30) Foreign Application Priority Data

Jun. 13, 2001 (JP) ............................ 2001-178512

(51) Int. Cl.
*G06F 21/22* (2006.01)
*H04L 9/00* (2006.01)

(52) U.S. Cl. ............................ 726/29; 726/33; 705/58; 713/193

(58) Field of Classification Search ..................... None
See application file for complete search history.

(56) References Cited

U.S. PATENT DOCUMENTS 5,857,021 A * 1/1999 Kataoka et al. ............... 705/54

(Continued)

FOREIGN PATENT DOCUMENTS

EP 1037460 * 9/2000

(Continued)

OTHER PUBLICATIONS

"Protecting Music Copyright with Small-Size Memory Card," Nikkei Electronics, No. 739, pp. 49-53, Mar. 3, 1999.

*Primary Examiner*—Christopher Revak
(74) *Attorney, Agent, or Firm*—Finnegan, Henderson, Farabow, Garrett & Dunner, L.L.P.

(57) ABSTRACT

A data transfer system provided by the present invention is capable of executing proper management of content transfers with a high degree of efficiency. In a data transfer apparatus employing a primary recording medium, rights to transfer contents stored in a primary recording medium are managed, and transfer rights of contents already transferred to a secondary recording medium employed in a data-recording apparatus are managed by using a generated table for associating first content identifiers each generated by the data transfer apparatus for a content stored in the primary recording medium with a second content identifier received from the data-recording apparatus and generated by the data-recording apparatus for the content, which has already been transferred to the data-recording apparatus. Thus, even if the secondary recording medium cannot be used for recording a second content identifier (or a content ID), a content ID (a second content identifier) generated for a content can be used for identifying the content by associating the content ID (the second content identifier) with a content ID (a first content identifier) stored in the primary recording medium.

11 Claims, 34 Drawing Sheets

U.S. PATENT DOCUMENTS

| | | | | |
|---|---|---|---|---|
| 6,496,802 | B1 * | 12/2002 | van Zoest et al. | 705/14 |
| 6,539,468 | B1 * | 3/2003 | Inoue et al. | 712/36 |
| 6,782,190 | B1 * | 8/2004 | Morito | 386/94 |
| 6,832,319 | B1 * | 12/2004 | Bell et al. | 713/193 |
| 6,834,348 | B1 * | 12/2004 | Tagawa et al. | 713/193 |
| 6,847,950 | B1 * | 1/2005 | Kamibayashi et al. | 705/57 |
| 6,865,552 | B1 * | 3/2005 | Inoue et al. | 705/57 |
| 6,959,366 | B2 * | 10/2005 | Abe et al. | 711/154 |
| 7,134,145 | B1 * | 11/2006 | Epstein | 726/27 |
| 7,159,244 | B2 * | 1/2007 | Matsushima et al. | 726/30 |
| 7,191,346 | B2 * | 3/2007 | Abe et al. | 713/194 |
| 7,240,033 | B2 * | 7/2007 | Kuriya et al. | 705/51 |
| 2001/0032088 | A1 * | 10/2001 | Utsumi et al. | 705/1 |
| 2002/0181355 | A1 * | 12/2002 | Shikunami et al. | 369/47.12 |

FOREIGN PATENT DOCUMENTS

| | | |
|---|---|---|
| JP | 2000-305854 | 11/2000 |
| JP | 2000-315193 | 11/2000 |
| JP | 2000-357201 | 12/2000 |
| JP | 2001-84339 | 3/2001 |
| JP | 2001-160054 | 6/2001 |
| WO | WO 99/38093 | 7/1999 |
| WO | WO 01/67668 A1 * | 9/2001 |

* cited by examiner

F I G. 2 A

| VERSION : t | |
|---|---|
| INDEX | ENCRYPTED KEY |
| 0 | E(K(t)0, K(t)R) |
| 00 | E(K(t)00, K(t)0) |
| 000 | E(K000, K(t)00) |
| 001 | E(K(t)001, K(t)00) |
| 0010 | E(K0010, K(t)001) |

F I G. 2 B

| VERSION : t | |
|---|---|
| INDEX | ENCRYPTED KEY |
| 000 | E(K000, K(t)00) |
| 001 | E(K(t)001, K(t)00) |
| 0010 | E(K0010, K(t)001) |

FIG. 3

| OFFSET ADDRESS | CONTENTS | SIZE (BYTES) |
|---|---|---|
| 0 | NODE-KEY COUNT | 4 |
| 4 | NODE-KEY DEPTH | 4 |
| 8 | EKB VERSION | 4 |
| 12 | RESERVED | 4 |
| 16 | ENCRYPTED NODE KEYS | 16×M |
| 16+16×M | RESERVED | 16 |
| 32+16×M | ENCRYPTED EKB VERSION | 8 |
| 40+16×M | ELECTRONIC SIGNATURE | 5 |

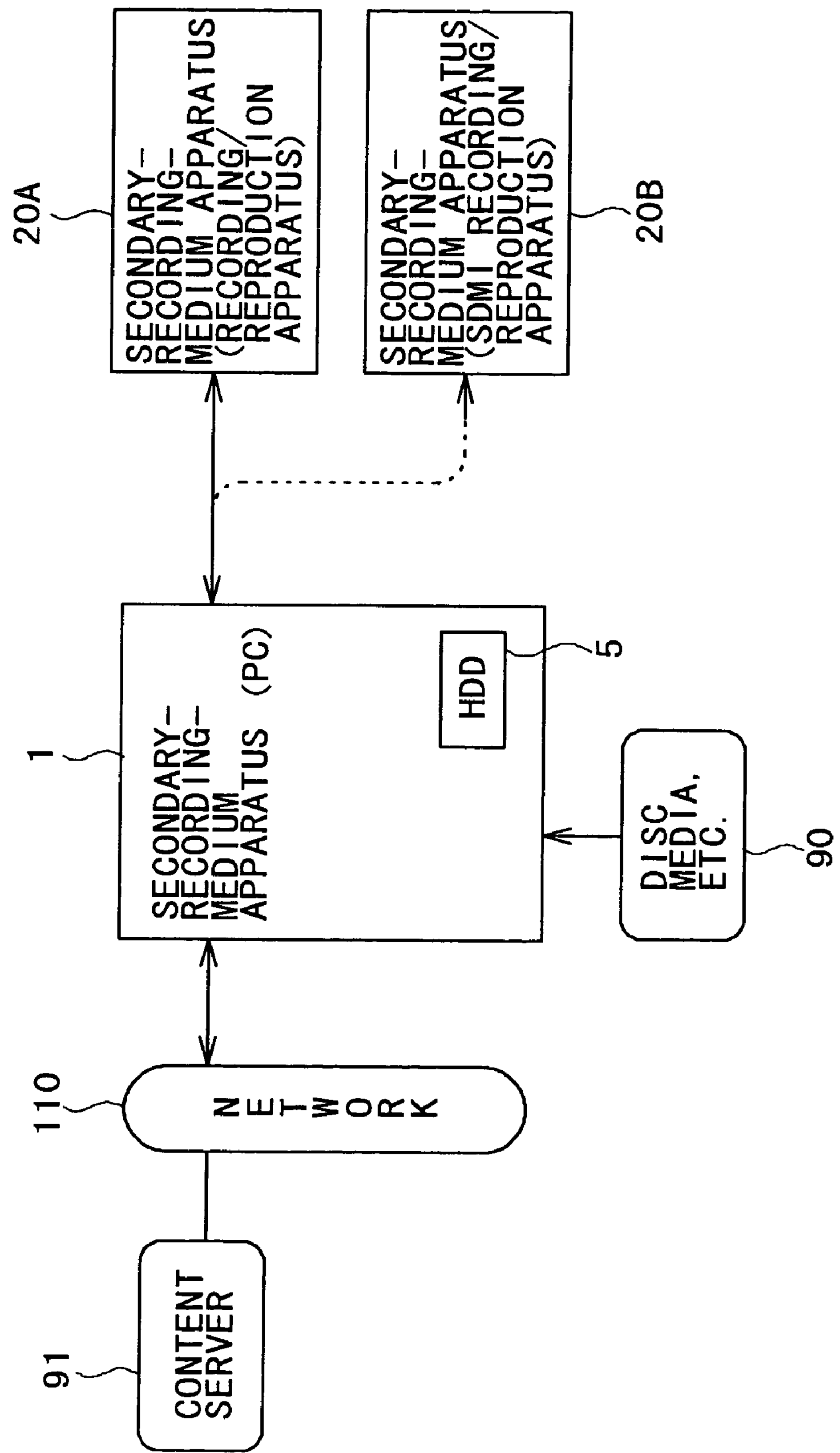
F I G. 4
SECONDARY-RECORDING-MEDIUM APPARATUS (RECORDING/REPRODUCTION APPARATUS)
20A
SECONDARY-RECORDING-MEDIUM APPARATUS (SDMI RECORDING/REPRODUCTION APPARATUS)
20B
SECONDARY-RECORDING-MEDIUM APPARATUS (PC)
1
HDD
5
DISC MEDIA, ETC.
90
NETWORK
110
CONTENT SERVER
91

F I G. 5
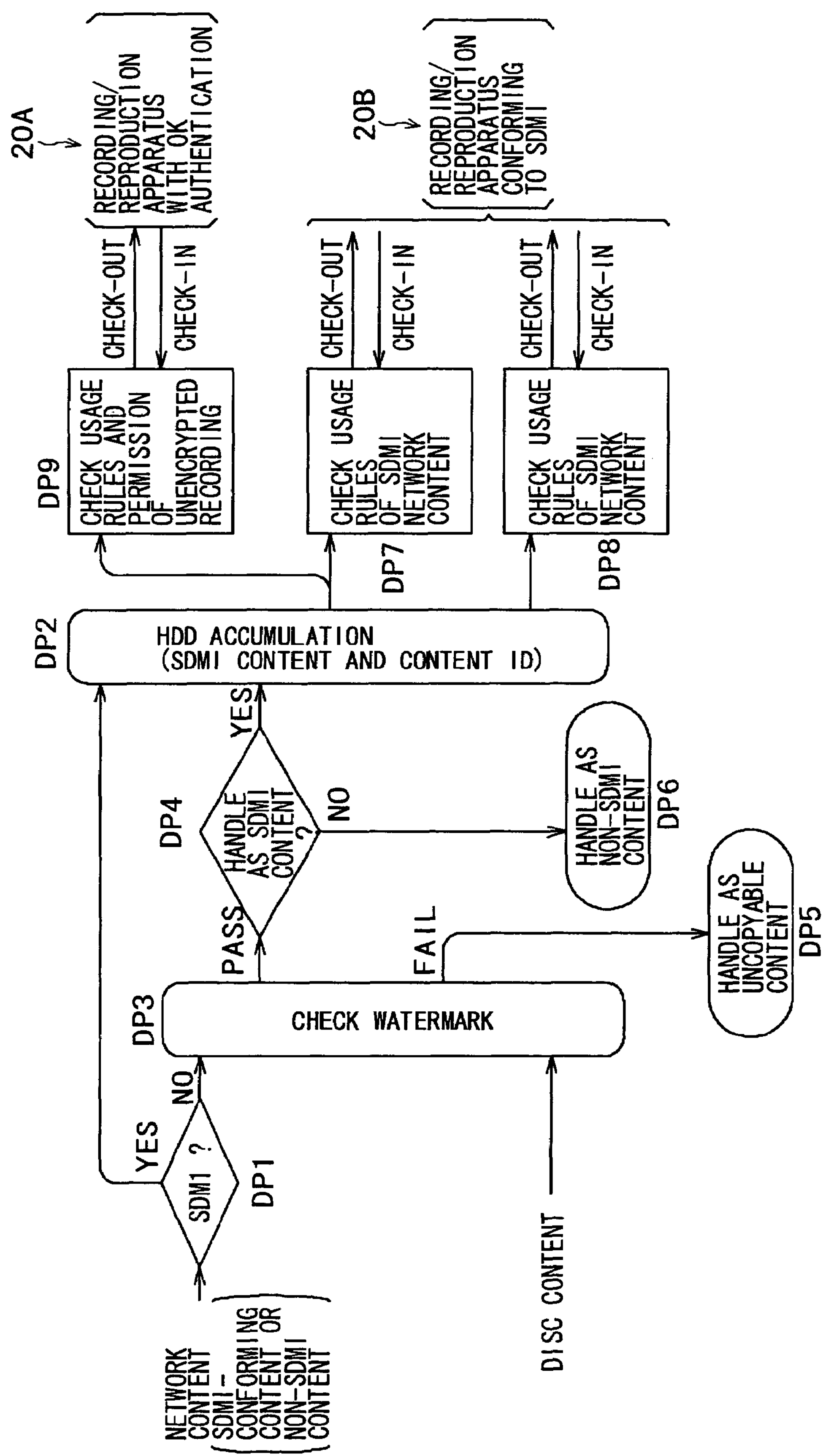

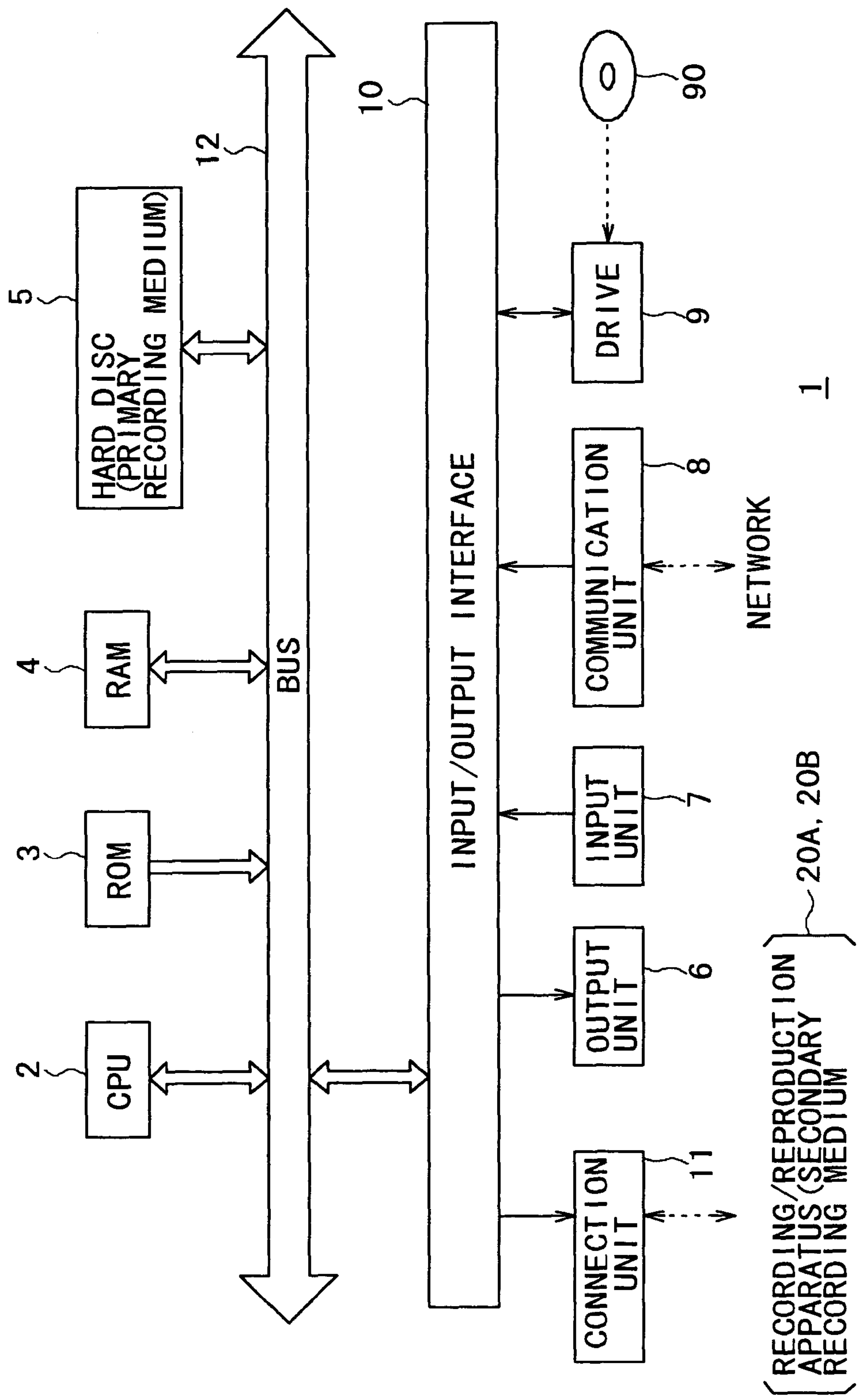
F I G. 6
CPU
2
ROM
3
RAM
4
HARD DISC (PRIMARY RECORDING MEDIUM)
5
BUS
12
INPUT/OUTPUT INTERFACE
10
CONNECTION UNIT
11
OUTPUT UNIT
6
INPUT UNIT
7
COMMUNICATION UNIT
8
DRIVE
9
90
NETWORK
RECORDING/REPRODUCTION APPARATUS (SECONDARY RECORDING MEDIUM)
20A, 20B
1

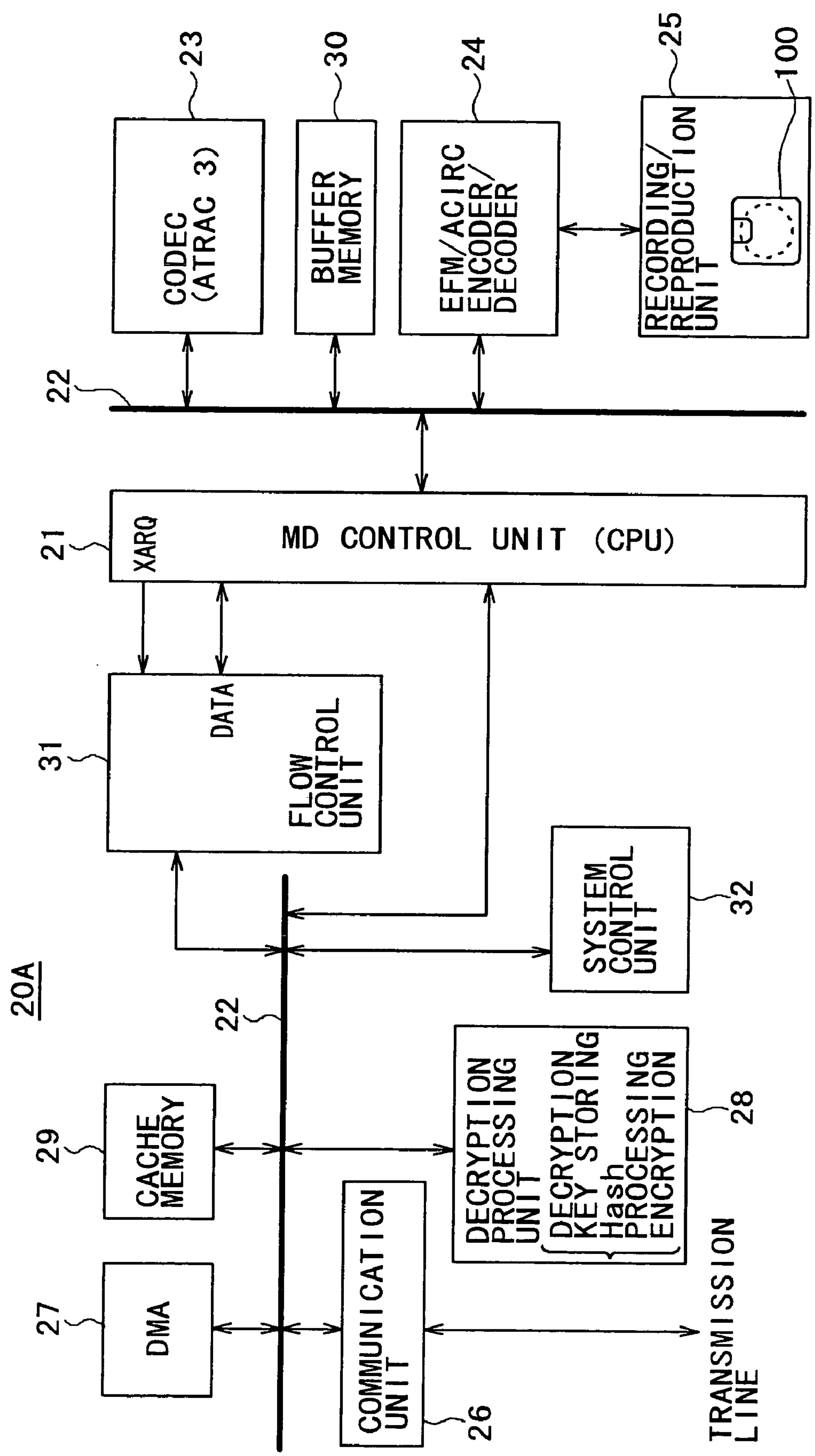
F I G. 7
20A
CODEC (ATRAC 3)
23
BUFFER MEMORY
30
EFM/ACIRC ENCODER/ DECODER
24
RECORDING/ REPRODUCTION UNIT
25
100
22
MD CONTROL UNIT (CPU)
XARQ
21
DATA
FLOW CONTROL UNIT
31
SYSTEM CONTROL UNIT
32
22
CACHE MEMORY
29
DMA
27
COMMUNICATION UNIT
26
DECRYPTION PROCESSING UNIT
DECRYPTION KEY STORING
Hash PROCESSING
ENCRYPTION
28
TRANSMISSION LINE

FIG. 10

| | 16BIT | | 16BIT | | |
|---|---|---|---|---|---|
| | MSB LSB | MSB LSB | MSB LSB | MSB LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | CLUSTERH | CLUSTERL | SECTOR (00h) | MODE (02h) | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | MAKER CODE | MODEL CODE | FIRST TNO | LAST TNO | 7 |
| | 00000000 | 00000000 | 00000000 | USED SECTORS | 8 |
| | 00000000 | 00000000 | 00000000 | 00000000 | 9 |
| | 00000000 | 00000000 | 00000000 | DISC SERIAL NO | 10 |
| POINTER PORTION | DISC | ID | P-DFA | P-EMPTY | 11 |
| | P-FRA | P-TN01 | P-TN02 | P-TN03 | 12 |
| | P-TN04 | P-TN05 | P-TN06 | P-TN07 | 13 |
| | | | | | |
| | | | | | |
| | P-TN0248 | P-TN0249 | P-TN0250 | P-TN0251 | 74 |
| | P-TN0252 | P-TN0253 | P-TN0254 | P-TN0256 | 75 |
| | 00000000 | 00000000 | 00000000 | 00000000 | 76 |
| | 00000000 | 00000000 | 00000000 | 00000000 | 77 |
| TABLE PORTION (255 PART TABLE) (01h) | START ADDRESS | | | TRACK MODE | 78 |
| | END ADDRESS | | | LINK INFORMATION | 79 |
| (02h) | START ADDRESS | | | TRACK MODE | 80 |
| | END ADDRESS | | | LINK INFORMATION | 81 |
| (03h) | START ADDRESS | | | TRACK MODE | 82 |
| | END ADDRESS | | | LINK INFORMATION | 83 |
| | | | | | |
| | | | | | |
| (FCh) | START ADDRESS | | | TRACK MODE | 580 |
| | END ADDRESS | | | LINK INFORMATION | 581 |
| (FDh) | START ADDRESS | | | TRACK MODE | 582 |
| | END ADDRESS | | | LINK INFORMATION | 583 |
| (FEh) | START ADDRESS | | | TRACK MODE | 584 |
| | END ADDRESS | | | LINK INFORMATION | 585 |
| (FFh) | START ADDRESS | | | TRACK MODE | 586 |
| | END ADDRESS | | | LINK INFORMATION | 587 |

F I G. 1 1
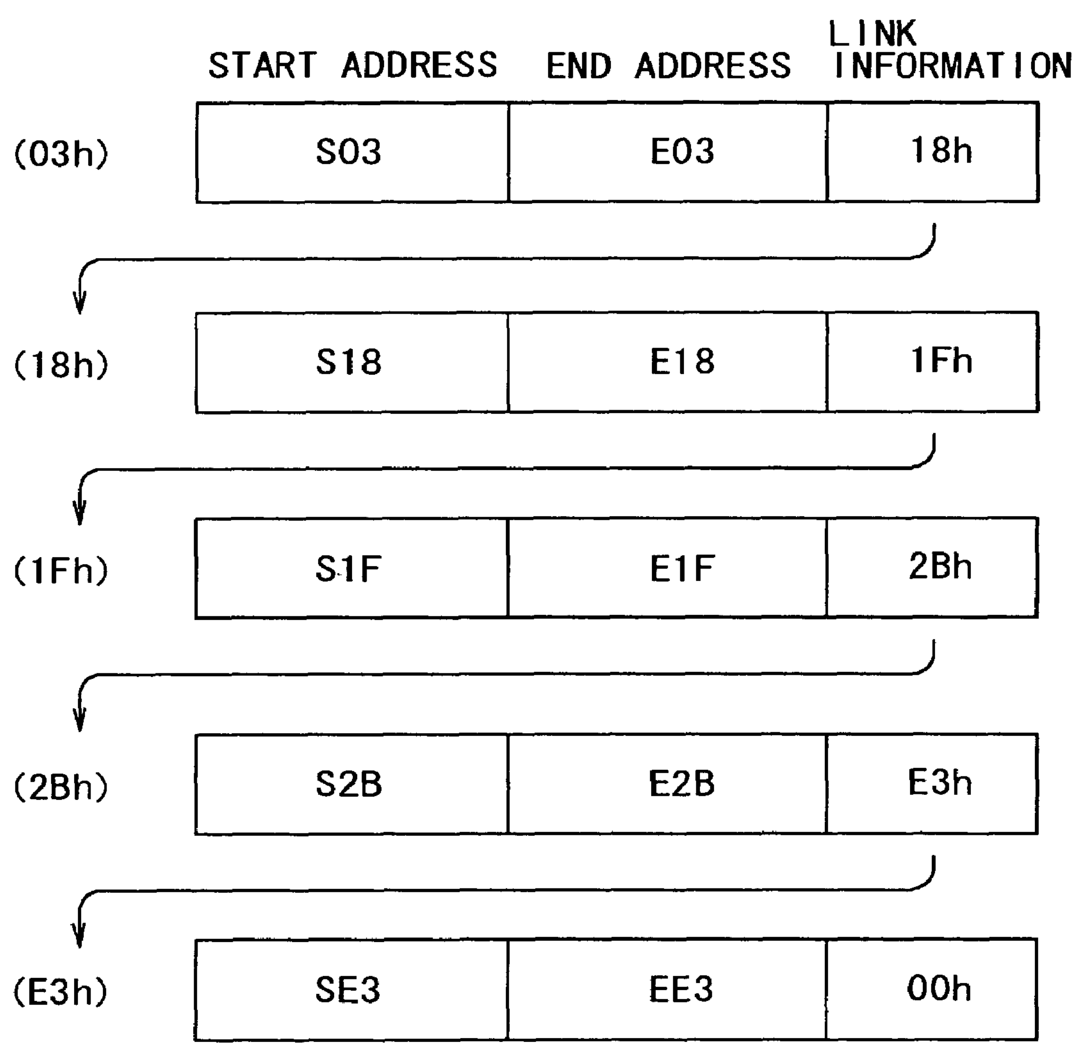

F I G. 1 2
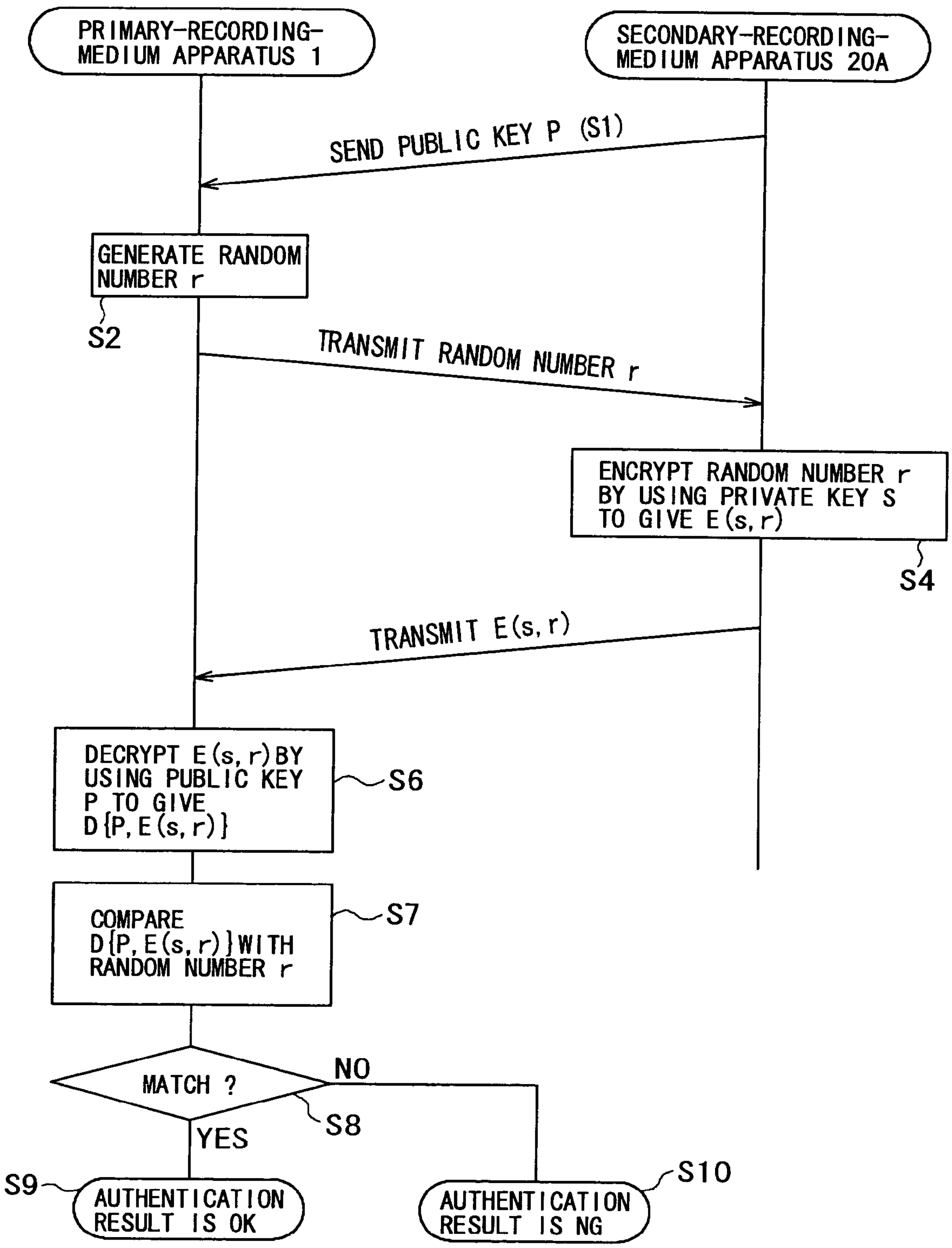

| LEAF ID = SET0 |
|---|
| KR ENCRYPTED BY USING LEAF KEY E(K000, KR) |
| K0 ENCRYPTED BY USING LEAF KEY E(K000, K0) |
| K00 ENCRYPTED BY USING LEAF KEY E(K000, K00) |
| LEAF KEY = K000 |

(1) USE LEAF KEY K000 IN DECRYPTION TO GIVE NODE K0
D{K000, E(K000, K0)}=K0

(2) USE NODE KEY K0 IN DECRYPTION TO GIVE ROOT KEY KR'
D{K0, E(K0, KR')}=KR'

(3) USE ROOT KEY KR' IN DECRYPTION TO GIVE CONTENT KEY CK
D{KR', E(KR', CK)}=CK (4) USE CONTENT KEY CK IN DECRYTION TO GIVE CONTENT DATA A3D
D{CK, E(CK, A3D)}=A3D

F I G. 1 6

| OFFSET (BYTES) | MSB 7 \| 6 \| 5 \| 4 | 3 \| 2 \| 1 \| 0 LSB |
|---|---|---|
| 00h | CTS | c TYPE:CONTRPL |
| ⋮ | ⋮ | |
| 0Ah | OPERATION CODE:CHECK-OUT | |
| 0Bh | COMMUNICATION RESULT | |
| 0Ch | RESERVED | |
| 0Dh | IDENTIFICATION CODE OF COMMUNICATION OBJECT APPARATUS | |
| 0Eh | | |
| 0Fh | TRACK NUMBER FOR CHECK-OUT CONTENT ON SECONDARY RECORDING MEDIUM | |
| 10h | | |
| 11h ⋮ 18h | DES CBC(ks, 0) | |

F I G. 1 7

| OFFSET (BYTES) | MSB 7 \| 6 \| 5 \| 4 | 3 \| 2 \| 1 \| 0 LSB |
|---|---|---|
| 00h | CTS | response:ACCEPTED |
| ⋮ | ⋮ | |
| 0Ah | OPERATION CODE:CHECK-OUT | |
| 0Bh | COMMUNICATION RESULT | |
| 0Ch | RESERVED | |
| 0Dh | IDENTIFICATION CODE OF COMMUNICATION OBJECT APPARATUS | |
| 0Eh | | |
| 0Fh | TRACK NUMBER FOR CHECK-OUT CONTENT ON SECONDARY RECORDING MEDIUM | |
| 10h | | |

FIG. 18

| OFFSET (BYTES) | MSB 7 \| 6 \| 5 \| 4 | 3 \| 2 \| 1 \| 0 LSB |
|---|---|---|
| 00h | CTS | c TYPE:CONTRPL |
| ⋮ | ⋮ | |
| 0Ah | OPERATION CODE:RECORD OBJECT | |
| 0Bh | COMMUNICATION RESULT | |
| 0Ch | RESERVED | |
| 0Dh | | |
| 0Eh | | |
| 0Fh | IDENTIFICATION CODE OF COMMUNICATION OBJECT APPARATUS | |
| 10h | | |
| 11h | TRACK NUMBER FOR CHECK-OUT CONTENT ON SECONDARY RECORDING MEDIUM | |
| 12h | | |
| 13h | CONTENT-DATA TYPE | |
| 14h | FORMAT OF CONTENT DATA IN PRIMARY RECORDING MEDIUM | |
| 15h | ATTRIBUTES OF CONTENT IN SECONDARY RECORDING MEDIUM | |
| 16h | CONTENT-DATA LENGTH | |
| 17h | | |
| 18h | | |
| 19h | | |
| 1Ah | BULK DATA LENGTH OF CONTENT DATA | |
| 1Bh | | |
| 1Ch | | |
| 1Dh | | |

FIG. 19

| OFFSET (BYTES) | MSB 7 | 6 | 5 | 4 | 3 | 2 | 1 | 0 LSB |
|---|---|---|---|---|---|---|---|---|
| 00h | CTS | | | | response:ACCEPTED | | | |
| ⋮ | ⋮ | | | | | | | |
| 0Ah | OPERATION CODE:RECORD OBJECT | | | | | | | |
| 0Bh | COMMUNICATION RESULT | | | | | | | |
| 0Ch | RESERVED | | | | | | | |
| 0Dh | | | | | | | | |
| 0Eh | | | | | | | | |
| 0Fh | IDENTIFICATION CODE OF COMMUNICATION OBJECT APPARATUS | | | | | | | |
| 10h | | | | | | | | |
| 11h | TRACK NUMBER FOR CHECK-OUT CONTENT ON SECONDARY RECORDING MEDIUM | | | | | | | |
| 12h | | | | | | | | |
| 13h | CONTENT-DATA TYPE | | | | | | | |
| 14h | FORMAT OF CONTENT DATA IN PRIMARY RECORDING MEDIUM | | | | | | | |
| 15h | ATTRIBUTES OF CONTENT IN SECONDARY RECORDING MEDIUM | | | | | | | |
| 16h | CONTENT-DATA LENGTH | | | | | | | |
| 17h | | | | | | | | |
| 18h | | | | | | | | |
| 19h | | | | | | | | |
| 1Ah | BULK DATA LENGTH OF CONTENT DATA | | | | | | | |
| 1Bh | | | | | | | | |
| 1Ch | | | | | | | | |
| 1Dh | | | | | | | | |
| 1Eh ⋮ 3Dh | SESSION DATA (32 BYTES) (CONTENT ID) | | | | | | | |

FIG. 20

| OFFSET (BYTES) | MSB 7 | 6 | 5 | 4 | 3 | 2 | 1 | 0 LSB |
|---|---|---|---|---|---|---|---|---|
| 00h | CTS | | | | c TYPE: CONTRPL | | | |
| ⋮ | ⋮ | | | | ⋮ | | | |
| 0Ah | OPERATION CODE: CHECK-IN | | | | | | | |
| 0Bh | COMMUNICATION RESULT | | | | | | | |
| 0Ch | SUB-FUNCTION | | | | | | | |
| 0Dh | IDENTIFICATION CODE OF COMMUNICATION OBJECT APPARATUS | | | | | | | |
| 0Eh | | | | | | | | |
| 0Fh | TRACK NUMBER FOR CHECK-IN CONTENT ON SECONDARY RECORDING MEDIUM | | | | | | | |
| 10h | | | | | | | | |

FIG. 21

| VALUE | SUB-FUNCTION |
|---|---|
| 00h | CONTENT ID |
| 01h | RESERVED |
| OTHERS | PREPAID-ITEM INFORMATION |

FIG. 22

| OFFSET (BYTES) | MSB 7 | 6 | 5 | 4 | 3 | 2 | 1 | LSB 0 |
|---|---|---|---|---|---|---|---|---|
| 00h | CTS | | | | response:ACCEPTED | | | |
| ⋮ | ⋮ | | | | ⋮ | | | |
| 0Ah | OPERATION CODE:CHECK-IN | | | | | | | |
| 0Bh | COMMUNICATION RESULT | | | | | | | |
| 0Ch | SUB-FUNCTION | | | | | | | |
| 0Dh | IDENTIFICATION CODE OF COMMUNICATION OBJECT APPARATUS | | | | | | | |
| 0Eh | | | | | | | | |
| 0Fh | TRACK NUMBER FOR CHECK-IN CONTENT ON SECONDARY RECORDING MEDIUM | | | | | | | |
| 10h | | | | | | | | |
| 11h | Hash MAC (CONTENT ID) | | | | | | | |
| 12h | | | | | | | | |
| 13h | | | | | | | | |
| 14h | | | | | | | | |
| 15h | | | | | | | | |
| 16h | | | | | | | | |
| 17h | | | | | | | | |
| 18h | | | | | | | | |

FIG. 23

| OFFSET (BYTES) | MSB 7 \| 6 \| 5 \| 4 | 3 \| 2 \| 1 \| 0 LSB |
|---|---|---|
| 00h | CTS | response:ACCEPTED |
| ⋮ | ⋮ | |
| 0Ah | OPERATION CODE:CHECK-IN | |
| 0Bh | COMMUNICATION RESULT | |
| 0Ch | SUB-FUNCTION | |
| 0Dh | IDENTIFICATION CODE OF COMMUNICATION OBJECT APPARATUS | |
| 0Eh | | |
| 0Fh | TRACK NUMBER FOR CHECK-IN CONTENT ON SECONDARY RECORDING MEDIUM | |
| 10h | | |
| 11h | PREPAID-ITEM INFORMATION | |
| 12h | | |
| 13h | | |
| 14h | | |
| 15h | | |
| 16h | | |
| 17h | | |
| 18h | | |

FIG. 24

| OFFSET (BYTES) | MSB 7 | 6 | 5 | 4 | 3 | 2 | 1 | 0 LSB |
|---|---|---|---|---|---|---|---|---|
| 00h | CTS | | | | c TYPE:CONTRPL | | | |
| 01h | SUB-UNIT TYPE | | | | | SUB-UNIT ID | | |
| 02h | RESERVED | | | | | | | |
| 03h | PRIORITY | | | | | | | |

FIG. 25

| OFFSET (BYTES) | MSB 7 | 6 | 5 | 4 | 3 | 2 | 1 | 0 LSB |
|---|---|---|---|---|---|---|---|---|
| 00h | CTS | | | | c TYPE:CONTROL | | | |
| 01h | SUB-UNIT TYPE | | | | | SUB-UNIT ID | | |
| 02h | RESERVED | | | | | | | |
| 03h | PRIORITY:00h | | | | | | | |

F I G. 2 8
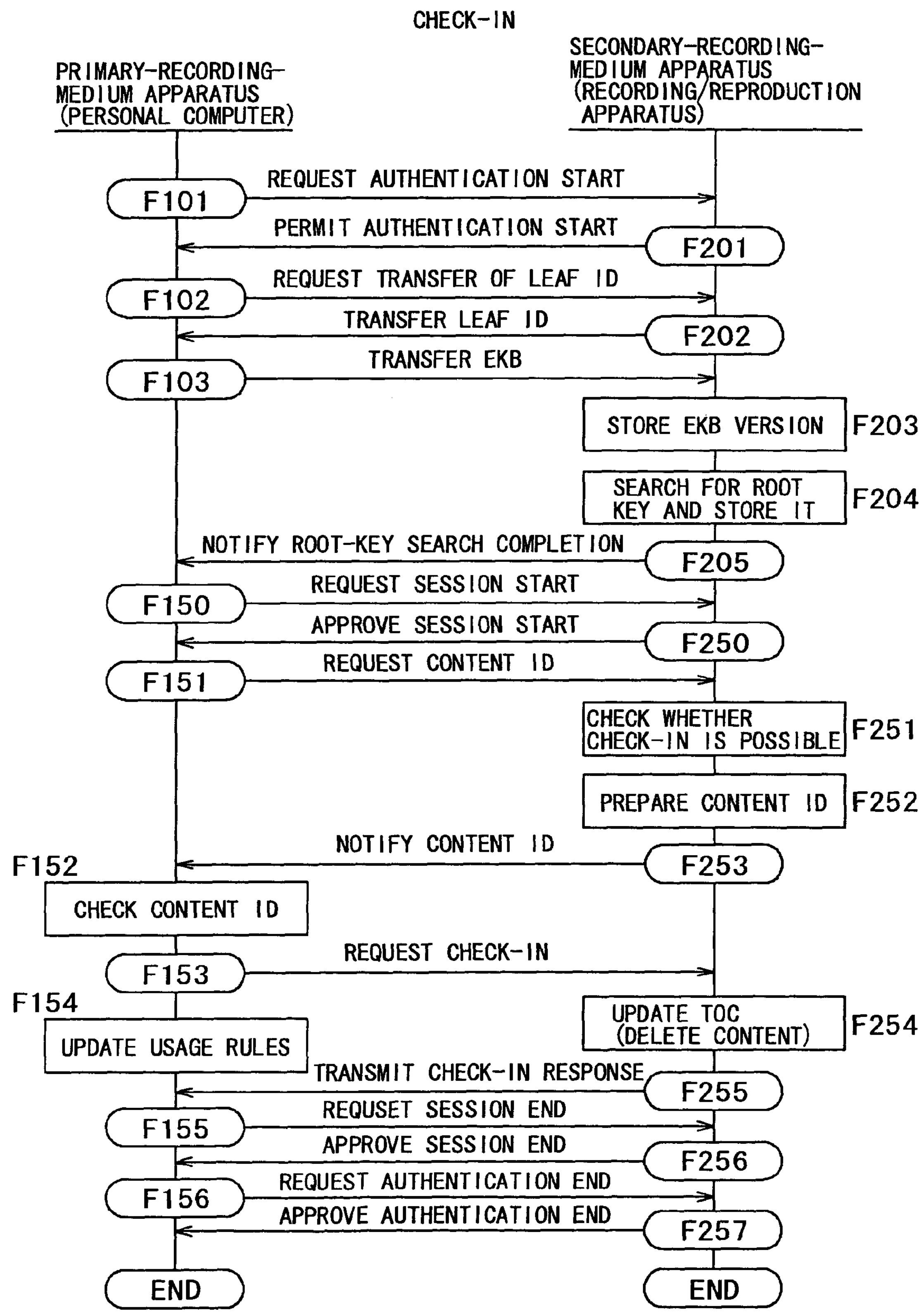

F I G. 2 9
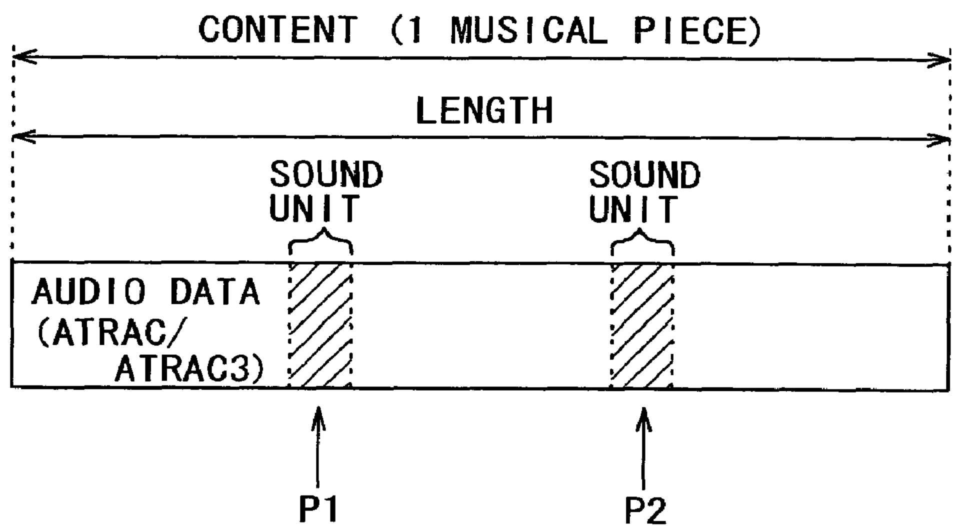
F I G. 3 0
CONTENT-ID ASSOCIATION TABLE
| CONTENT ID1 SET BY PC APPLICATION | CONTENT ID1 SET BY SECONDARY-RECOEDING-MEDIUM APPARATUS |
|---|---|
| CONTENT ID2 SET BY PC APPLICATION | CONTENT ID2 SET BY SECONDARY-RECOEDING-MEDIUM APPARATUS |
| CONTENT ID3 SET BY PC APPLICATION | CONTENT ID3 SET BY SECONDARY-RECOEDING-MEDIUM APPARATUS |

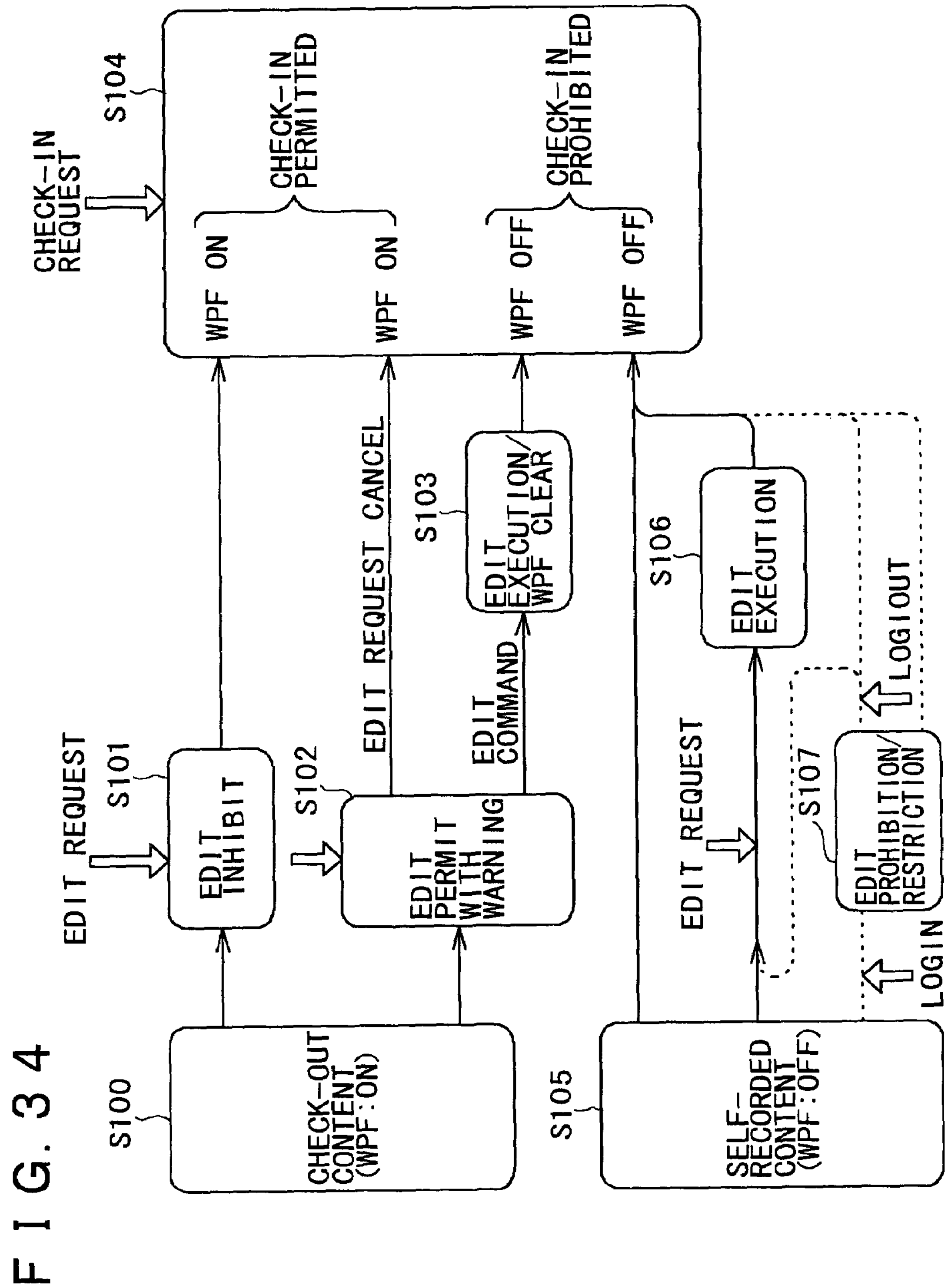
F I G. 3 4
S100
CHECK-OUT CONTENT (WPF:ON)
EDIT REQUEST
S101
EDIT INHIBIT
S102
EDIT PERMIT WITH WARNING
EDIT REQUEST CANCEL
EDIT COMMAND
S103
EDIT EXECUTION/WPF CLEAR
CHECK-IN REQUEST
S104
WPF ON
WPF ON
CHECK-IN PERMITTED
WPF OFF
WPF OFF
CHECK-IN PROHIBITED
S105
SELF-RECORDED CONTENT (WPF:OFF)
EDIT REQUEST
S106
EDIT EXECUTION
S107
EDIT PROHIBITION/RESTRICTION
LOGIN
LOGOUT

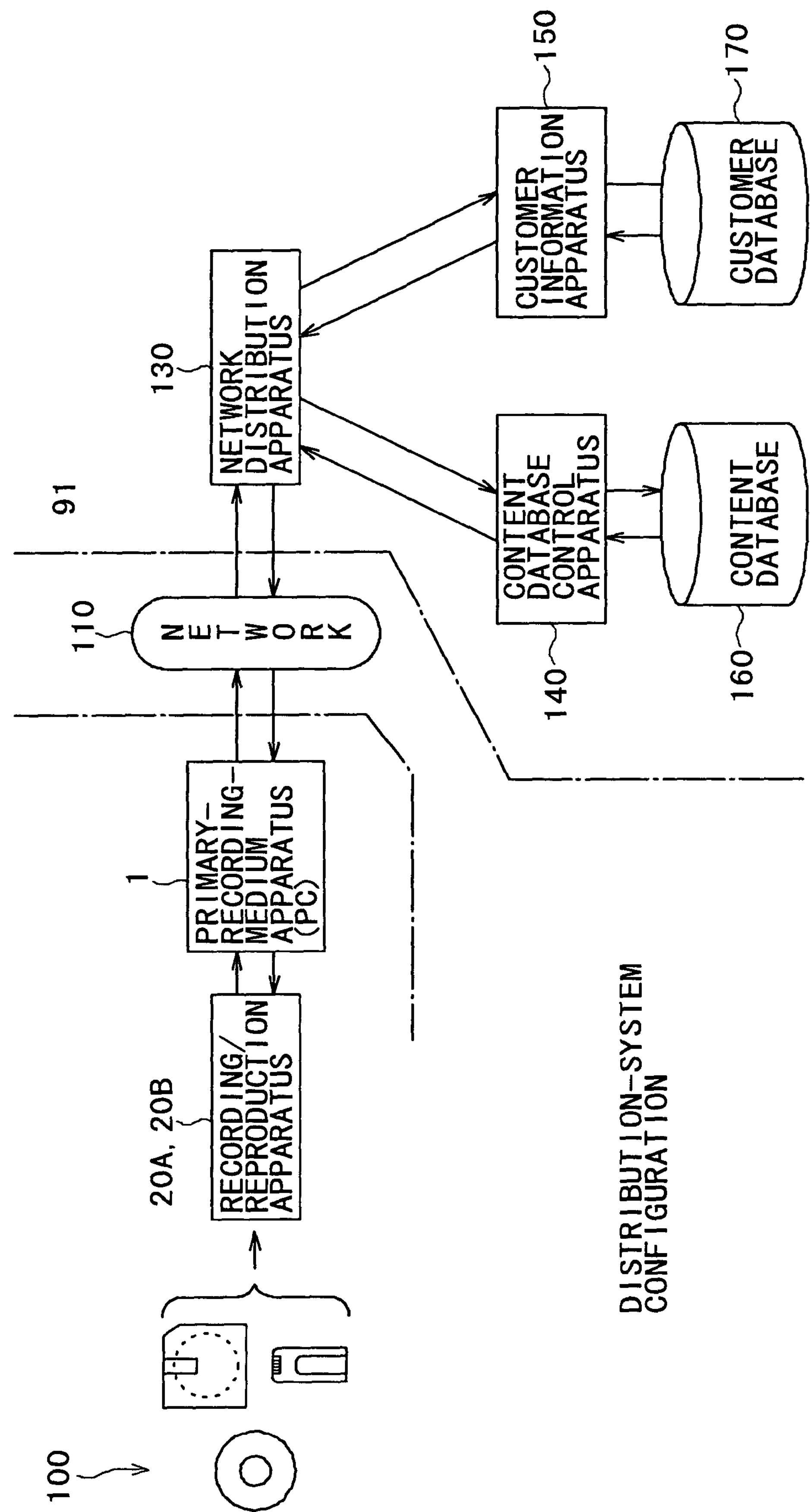
F I G. 3 6
100
20A, 20B
RECORDING/ REPRODUCTION APPARATUS
1
PRIMARY-RECORDING-MEDIUM APPARATUS (PC)
110
NETWORK
91
130
NETWORK DISTRIBUTION APPARATUS
140
CONTENT DATABASE CONTROL APPARATUS
150
CUSTOMER INFORMATION APPARATUS
160
CONTENT DATABASE
170
CUSTOMER DATABASE
DISTRIBUTION-SYSTEM CONFIGURATION

FIG. 37

CUSTOMER DATABASE

| | MEDIUM ID | BALANCE | PURCHASE HISTORY |
|---|---|---|---|
| (K1) | ID1 | 3, 700YEN | - - - - |
| (K2) | ID2 | 100YEN | - - - - |
| (K3) | ID3 | 1, 200YEN | - - - - |
| (K4) | ID4 | 5, 000YEN | - - - - |
| (K5) | ID5 | 0YEN | - - - - |
| ⋮ | ⋮ | ⋮ | ⋮ |

DATA TRANSFER SYSTEM, DATA TRANSFER APPARATUS, DATA-RECORDING APPARATUS, DATA MANAGEMENT METHOD AND IDENTIFIER GENERATION METHOD

TECHNICAL FIELD

The present invention relates to a data transfer system, a data transfer apparatus, a data-recording apparatus, a data management method and an identifier generation method that are well suitable for transferring and/or recording content data such as music.

BACKGROUND ART

In typical usage of content data such as music, the data stored in a primary recording medium such as an HDD (hard disk drive) of a personal computer is transferred to another recording medium used as a secondary recording medium so as to allow the data reproduced from the secondary recording medium to be enjoyed. It is to be noted that the content data includes musical data, video data, game data and computer software, which are provided mainly for distribution, transfer and utilization purposes.

In this case, the HDD employed in the personal computer is used for storing content data such as music reproduced from a package recording medium such as a CD-DA (Compact Disc Digital Audio) and a DVD (Digital Versatile Disc) or used for storing content data downloaded from an external musical server or the like by way of a communication network to the personal computer, which is connected to the network. Then, the user connects the personal computer to a recording apparatus for recording data onto the secondary recording medium, and copies or moves content data from the HDD to the secondary recording medium. In order to enjoy the content data, a reproduction apparatus is used to reproduce the data from the secondary recording medium.

Conceivable examples of the secondary recording medium are a memory card employing a semiconductor memory such as a flash memory, a mini disc used as a magneto-optical disc, a CD-R (CD-Recordable), a CD-RW (CD-Rewritable), a DVD-RAM (DVD Random-Access Memory), a DVD-R and a DVD-RW.

As a recording apparatus and a reproduction apparatus for the secondary recording medium, respectively, a recorder and a player adaptable to these recording mediums have been becoming very popular. The recorder and the player are designed into a variety of implementations such as a stationary recording/reproduction apparatus and a portable recording/reproduction apparatus. The user can thus record and reproduce content data by using an implementation of the recorder and the player that is a favorite with the user or matches an apparatus already owned by the user.

It is to be noted that, when considering such usage of content data, for example, protection of copyrights of the content data must be taken into account. Assume for example that the user obtains content data by using a service to distribute the content data or by purchasing a package medium containing the content data and, after storing the content data into an HDD, the user is allowed to copy the content data to secondary recording mediums without any limitation. In this case, such usage of the content data results in a condition in which the owner of the copyright is not properly protected. In order to solve this problem, there have been proposed a variety of agreements and technologies for assuring protection of copyrights in handling content data as digital data. One of the agreements is a standard called an SDMI (Secure Digital Music Initiative).

A data path prescribed in the SDMI standard will be described later. At any rate, a content stored in an HDD employed in a personal computer as a primary recording medium can be properly transferred to or recorded onto a secondary recording medium after protection of a copyright and benefits of general users are taken into consideration. The benefits include a right to privately copy the content. Examples of the content stored in the HDD include a network content and a disc content. The network content is content data distributed by an external server to the personal computer by way of typically a network to be stored in the HDD. On the other hand, a disc content is read out from a package recording medium to be stored in the HDD. As described above, examples of the package recording medium are a CD-DA and a DVD. The package recording medium is mounted on a disc drive for reproducing the disc content. Typically, the disc drive is embedded in the personal computer or connected to the personal computer. Examples of the disc drive include a CD-ROM drive.

By the way, when content data is transferred in a copy operation from a primary recording medium such as an HDD to a secondary recording medium such as a mini disc or a memory card, measures are taken to satisfy protection of both a copyright and a private copying right.

In order to satisfy such protection, data is transferred from a secondary recording medium conforming to the SDMI standard as follows.

A secondary recording medium conforming to the SDMI standard is assumed to be a recording medium including a memory card employing a semiconductor memory such as a flash memory in conformity with the SDMI standard. Such a secondary recording medium is used for storing a content in an encrypted state. In a primary recording medium like an HDD, for example, a content conforming to the SDMI standard is stored in an encrypted state so that such a content will be copied to a secondary recording medium also in the encrypted state as it is.

It is needless to say that a reproduction apparatus provided for such a secondary recording medium has a decryption function allowing content data copied to the secondary recording medium in an encrypted state to be reproduced.

In a secondary recording medium conforming to the SDMI standard, a recording format includes an area for recording a content ID used as an identifier for identifying each piece of content data.

A content ID is generated for each piece of content data stored in the primary recording medium such as an HDD employed in an apparatus for the primary recording medium and is stored along with the piece of content data. When content data is copied to a secondary recording medium, a content ID identifying the content data is also stored in the secondary recording medium.

Content IDs are used for managing content rights in primary and secondary recording mediums. A content right of a content in a primary recording medium is a right to transfer the content from the primary recording medium to a secondary recording medium in an operation to copy the content to the secondary recording medium. On the other hand, a content right of a content in a secondary recording medium is a right to reproduce the content from the secondary recording medium.

It is to be noted that, in the following description, a transfer of content data (a transfer of a right) from a primary recording medium to a secondary recording medium is referred to as a check-out. On the other hand, a transfer of content data (in actuality, a transfer of a right only) from a secondary recording medium to a primary recording medium is referred to as a check-in.

In accordance with the SDMI standard, transfer usage rules are established for check-ins and check-outs.

For example, for a piece of content data, only up to 3 check-outs from a primary recording medium to a secondary recording medium are allowed. Thus, a transfer right allows the piece of content data to be transferred up to 3 times.

In a check-out, a right is also transferred from a primary recording medium to a secondary recording medium. Thus, the transfer right in the primary recording medium now allows the piece of data to be transferred only up to 2 times. On the other hand, a reproduction right is given to the secondary recording medium.

In a check-in, on the other hand, a right is returned from a secondary recording medium to a primary recording medium. Thus, the secondary recording medium loses a reproduction right while one transferred right is restored to the primary recording medium.

Such check-outs and such check-ins are managed for each piece of content data by using a content ID for identifying the piece of content data.

In addition, in a check-out, a piece of content data and a content ID for identifying the piece of content data are recorded onto a secondary recording medium. The secondary recording medium is given a reproduction right to reproduce the piece of content data. On the other hand, the primary recording medium is considered to have transferred one content ID and lost one transfer right in accordance with the usage rules.

In a check-in, on the other hand, no content data is actually returned. Instead, the content data is merely erased from the secondary recording medium, and the content ID is returned to the primary recording medium to increment the number of transfer rights prescribed by the usage rules by one. The secondary recording medium loses the reproduction right to reproduce the content data.

As described above, content data is copied to a secondary recording medium conforming to the SDMI standard in an encrypted state to be stored into the recording medium also in an encrypted state, and content rights are managed in the event of a check-out or a check-in in order to prevent content data to be copied an unlimited number of times and to protect copyrights as well as to assure the private-copy right of the user at the same time.

It is to be noted that content data downloaded from typically an external server to an HDD serving as a primary recording medium is stored in the HDD in a state of being encrypted by using a content key CK.

In this specification, content data stored in the HDD is assumed to have been obtained as a result of compressing original content data by adoption of an ATRAC3 technique (or another compression technique) and encrypting the compressed data A3D by using the content key CK. In this specification, notation E (x, y) denotes encrypted data obtained as a result of encrypting data y by using a key x.

On the other hand, notation D {x, E (x, y)} denoted decrypted data obtained as a result of decrypting encrypted data E (x, y) by using the key x.

Thus, the content data obtained as a result of compressing original content data and encrypting the compressed data A3D by using the content key CK can be expressed by notation:

E (CK, A3D)

On the other hand, decrypted data obtained as a result of the decrypting encrypted data E (CK, A3D) by using the key CK is expressed by notation:

D {CK, E (CK, A3D)}

In addition to the encrypted content data E (CK, A3D), the HDD serving as the primary recording medium is also used for storing E (KR, CK), which is the content key CK in a state of being encrypted by using a root key KR. Thus, in the case of encrypted content data E (CK, A3D) downloaded from an external server, for example, the encrypted content key E (KR, CK) is also downloaded from the server.

In this case, in a check-out of the encrypted content data E (CK, A3D) to a secondary recording medium, the encrypted content data E (CK, A3D) and the encrypted content key E (KR, CK) need to be transferred from the HDD serving as the primary recording medium to the secondary recording medium.

The apparatus for the secondary recording medium holds the root key KR for decrypting the encrypted content key E (KR, CK) to produce the original content key CK. The content CK is then used for decrypting the encrypted content data E (CK, A3D) to produce the original content data A3D.

In accordance to the will of the copyright owner or for a variety of reasons, however, the root key KR can be changed. That is to say, a root key KR can be set for each piece of content data. In addition, there is provided a function for imposing restrictions on targets of content distribution by processing of the root key KR. This function will be described later concretely.

Thus, in some cases, data called an EKB (Enabling Key Block) is distributed. In addition, in some cases, a regular terminal for receiving transferred content data adopts a technique for confirming a root key by using an EKB. That is to say, an EKB is distributed from a server to be stored in an HDD along with encrypted content data and an encrypted content key.

Consider a case in which a mini disc (or a magneto-optical disc), which has been becoming very popular, is used as a secondary recording medium in a mini-disk recording apparatus conforming to the SDMI standard. In this case, encrypted content data E (CK, A3D) transferred to the mini disk in a check-out is stored in the mini disk in an encrypted state as it is.

Then, in a reproduction operation, the mini-disk recording apparatus conforming to the SDMI standard decrypts the encrypted content data E (CK, A3D) to produce the content data D {CK, E (CK, A3D)}=A3D, which is the content data compressed by adoption of the ATRAC3 compression technique. Then, the mini-disk recording apparatus carries out a predetermined decoding process on the compressed content data A3D to output reproduced data such as music.

In a mini disc used in an ordinary mini-disc system, which has been becoming popular too, on the other hand, data is stored not in an encrypted state. Thus, as a mini-disk reproduction apparatus, the mini-disc system naturally does not have a decryption function.

As a result, content data recorded in a mini disk by the mini-disk recording apparatus conforming to the SDMI standard cannot be reproduced by most of mini-disc players, which do not conform to the SDMI standard. That is to say, the content data recorded in a mini disk by the mini-disk recording apparatus conforming to the SDMI standard is not reproduction-compatible with the mini-disc players.

This means that correct use of an SDMI content purchased by the general user is limited and the value of the service to provide an SDMI content to the ordinary user as well as the user's degree of satisfaction with the service are hence reduced considerably.

In order to solve the problem described above, in a recording operation to copy an SDMI content to a secondary recording medium such as a mini disc mounted on a mini-disk recording apparatus not conforming to the SDMI standard, the SDMI content is decrypted so that the content can be stored in the mini disk in an unencrypted state as it is.

If such a copy operation can be carried out, however, it is possible to copy content data with ease. Such a copy operation also leaves room for possible illegal copies, resulting in a fear of impossibility to implement copyright protection, which is the original objective of the SDMI standard.

In order to solve the problem described above, as a method of transferring content data, the applicant of a patent for the present invention has proposed a content transfer technique described as follows.

In an operation to transfer content data, a data transfer apparatus serving as a primary-recording-medium apparatus authenticates a data-recording apparatus used as a secondary-recording-medium apparatus to serve as a transfer destination. If the result of the authentication is OK, the transfer of the content data is allowed on the condition that the content provider (such as the copyright owner) approves the transfer. Then, the content data is transmitted in an encrypted state through a transmission line and the encrypted content data is decrypted before being stored in a secondary recording medium. In addition, rights are managed for check-outs and check-ins.

In this way, since an operation to copy and record content data in an unencrypted state is permitted, more convenience is offered to the user without losing the function to protect a copyright.

However, such a transfer technique has the following problems.

By using a medium such as a mini disc, which has been becoming popular from the beginning, in a check-out and/or a check-in of an SDMI content, a content ID cannot be recorded on the mini disc for some reasons. The reasons include the fact that the mini disc does not have an area for recording a content ID and the fact that the contemporary mini-disc recorder does not have a function for managing content IDs.

For example, an area for recording content IDs can be newly provided in a U-TOC, which is a management area on a mini disc. When the conventional mini-disc recorder updates the U-TOC after a recording or an editing operation, however, the content IDs will be lost.

That is to say, in an attempt to offer more convenience to the user through compatibility with the conventional apparatus, content IDs cannot be managed on the mini-disc side. Because the content IDs cannot be managed, then the check-in cannot be managed.

In the secondary recording medium such as the mini disc, on the other hand, it is possible to generate a content ID to be used as an identifier of each content data from typically the content data itself.

In order to generate a content ID of data content recorded on a mini disc, however, it is necessary to seek the disc for a portion of the data content and read out the portion from the disc. Thus, there is raised a problem that it takes time to generate a content ID. In addition, even if a content ID is generated in a secondary recording medium such as the mini disc, the generated content ID may not match a content ID generated in a primary recording medium. As a result, management of content IDs is impossible.

Disclosure of Invention

It is thus an object of the present invention addressing the problems described above to properly managed transfers of content data between a primary recording medium and a secondary recording medium for recording content data in an unencrypted state in order to make processing more efficient.

In order to achieve the object described above, present invention provides a data transfer system including the data transfer apparatus and a data-recording apparatus.

The data transfer apparatus provided by the present invention includes: primary-recording-medium driving means for recording and reproducing data onto and from a primary recording medium; storage controlling means for controlling the primary-recording-medium driveing means to store content data and a generated first content identifier unique to the content data onto the primary recording medium in an encrypted state; communication means for carrying out a variety of data communications including a transfer of content data between the data transfer apparatus and an external data-recording apparatus; and transfer management means for managing a transfer right of each content data and a transfer right of particular content data already transferred to the external data-recording apparatus by using generated table data associating a first content identifier of the particular content data with the second content identifier of particular content data received from the data-recording apparatus.

The transfer management means manages a transfer right of each content data by managing the number of allowable content-data transfers to the external data-recording apparatus.

In addition, the transfer management means requests the external data-recording apparatus to transmit the second data identifier of content data stored in a secondary recording medium of the data-recording apparatus when the reproduction right of the content data owned by the secondary recording medium is lost, and updates the transfer right of the content data by collation of the received second data identifier by referring to the table data.

The data-recording apparatus provided by the present invention includes: communication means for carrying out a variety of data communications with an external data transfer apparatus, which include reception of content data from the data transfer apparatus; secondary-recording-medium driving means for recording and reproducing data onto and from a secondary recording medium; decryption means for decrypting encrypted content data received from the external data transfer apparatus to produce content data in an unencrypted state; recording controlling means for controlling the secondary-recording-medium driving means to store the encrypted content data decrypted by the decryption means onto the secondary recording medium in an unencrypted state; identifier generation means for generating a second content identifier of the content data from the content data in an unencrypted state; and identifier-transmission controlling means for controlling the communication means to transmit the second content identifier generated by the identifier generation means to the external data transfer apparatus.

The identifier generation means generates a second content identifier of content data by carrying out a process using partial data extracted from the content data at a sampling point determined on the basis of the length of the content data.

The partial data is extracted from one sampling point other than the beginning and the end of the content data or a plurality of sampling points other than the beginning and the end of the content data.

To put it in detail, when content data is received from an external data transfer apparatus, the identifier generation means extracts partial data of sampling points in advance from the content data obtained as a result of a decryption process carried out by the decryption means before the result of the decryption process is stored onto the secondary recording medium, and carries out the process using the extracted partial data to generate a second content identifier. After the processing to receive the content data from the external data transfer apparatus is completed, the identifier-transmission controlling means controls the communication means to transmit the second content identifier generated by the identifier generation means to the data transfer apparatus.

With the secondary recording medium for recording contents mounted on the data-recording apparatus, the secondary-recording-medium driving means reproduces partial data of sampling points for each of the contents recorded on the secondary recording medium and stores the partial data into a storage means in advance. When a request for a second content identifier of a particular one of the contents recorded on the secondary recording medium is received from the external data transfer apparatus, the identifier generation means generates the requested second content identifier of the particular content by carrying out a process using partial data of sampling points already stored in the storage means, and the identifier-transmission control means controls the communication means to transmit the second content identifier generated by the identifier generation means to the data transfer apparatus.

As an alternative, with the secondary recording medium for recording contents mounted on the data-recording apparatus, the secondary-recording-medium driving means reproducing partial data of sampling points for each of the contents recording on the secondary recording medium, and the identifier generation means generates a second content identifier of each of the contents by carrying out a process using partial data of sampling points, storing the second content identifiers in the storage means in advance. When a request for a second content identifier of a particular one of the contents recorded on the secondary recording medium is received from the external data transfer apparatus, the identifier-transmission controlling means controls the communication means to transmit second content identifier of the particular content already stored in the storage means to the data transfer apparatus.

A data management method provided by the present invention is used to manage rights to transfer encrypted contents stored in a primary recording medium from the primary recording medium to a secondary recording medium by executing the step of: associating each of the contents with a first content identifier generation for the content; managing each right of transferring encrypted contents and generating table data associating a first content identifier generated for any particular one of the contents with the second content identifier of particular content received from a secondary-recording-medium apparatus.

The right to transfer encrypted content data is managed by controlling the number of times the content data can be transferred to the secondary recording medium.

In addition, the secondary-recording-medium apparatus is requested to transmit a second data identifier of content data stored in the secondary recording medium of the secondary-recording-medium apparatus when the reproduction right of the content data owned by the secondary recording medium is lost, and the transfer right of the content data is updated by collation of the second data identifier by referring to the table data.

A second content identifier of content data is generated by carrying out a process using partial data extracted from the content data at a sampling point determined on the basis of the length of the content data.

The partial data is extracted from one sampling point other than the beginning and the end of the content data or a plurality of sampling points other than the beginning and the end of the content data.

To put it in detail, when encrypted content data is received and decrypted to be stored into the secondary recording medium, partial data of sampling points is extracted in advance from the content data obtained as a result of a decryption process before the result of the decryption process is stored onto the secondary recording medium, and a process using the extracted partial data is carried out to generate a second content identifier for the content data.

Partial data of sampling points is extracted for each of the contents recorded on the secondary recording medium and the partial data is stored into a storage means in advance before a request for a second content identifier of a particular one of the contents recorded on the secondary recording medium is received from an external apparatus. When such a request is received from the external apparatus, the requested second content identifier is generated by carrying out a process using partial data of sampling points already stored in the storage means, and transmitted to the external apparatus.

As an alternative, partial data of sampling points for each of the contents recorded on the secondary recording medium is reproduced, and a second content identifier is generated for each of the contents by carrying out a process using the partial data of the sampling points, being stored in the storage means in advance before a request for a second content identifier of a particular one of the contents recorded on the secondary recording medium is received from an external apparatus. When such a request is received from the external apparatus, the second content identifier of the particular content already stored in the storage means is transmitted to the external apparatus.

As described above, in accordance with the present invention, changes in right that accompany a check-out and a check-in of content data between a data transfer apparatus and a data-recording apparatus are managed properly by using first and second content identifiers (content IDs). In addition, the data-recording apparatus also generates a second content identifier with a higher degree of efficiency.

BRIEF DESCRIPTION OF DRAWINGS

FIGS. 2A and 2B are each an explanatory diagram showing an EKB of the encryption technique adopted by the embodiment;

FIG. 3 is an explanatory diagram showing the structure of the EKB of the encryption technique adopted by the embodiment;

FIG. 4 is a block diagram showing the structure of a data transfer system implemented by the embodiment;

FIG. 5 is an explanatory diagram showing typical data paths of an SDMI content according to the embodiment;

FIG. 6 is a block diagram showing a primary-recording-medium apparatus provided by the embodiment;

FIG. 7 is a block diagram showing a secondary-recording-medium apparatus provided by the embodiment;

FIG. 10 is an explanatory diagram showing U-TOC (user table of contents) sector 0 of a mini-disk system;

FIG. 11 is an explanatory diagram showing linking in U-TOC sector 0 of a mini-disk system;

FIG. 12 shows a flowchart representing an authentication process according to the embodiment;

FIG. 16 is an explanatory diagram showing a check-out control command used in the embodiment;

FIG. 17 is an explanatory diagram showing a check-out response command used in the embodiment;

FIG. 18 is an explanatory diagram showing a record-object control command used in the embodiment;

FIG. 19 is an explanatory diagram showing a record-object response command used in the embodiment;

FIG. 20 is an explanatory diagram showing a checkin control command used in the embodiment;

FIG. 21 is an explanatory diagram showing sub-functions of the check-in control command used in the embodiment;

FIG. 22 is an explanatory diagram showing a check-in response command used in the embodiment;

FIG. 23 is an explanatory diagram showing a check-in response command used in the embodiment;

FIG. 24 is an explanatory diagram showing an inclusive log-in control command used in the embodiment;

FIG. 25 is an explanatory diagram showing an inclusive log-out control command used in the embodiment;

FIG. 28 shows a flowchart representing check-in operations carried out by the embodiment;

FIG. 29 is an explanatory diagram showing generation of a content ID in the embodiment;

FIG. 30 shows a table associating content IDs in the embodiment;

FIG. 34 is an explanatory diagram showing operations based on a write protect flag in the embodiment;

FIG. 36 is an explanatory diagram showing an accounting management system provided by the embodiment;

FIG. 37 is an explanatory diagram showing a customer database provided by the embodiment.

BEST MODE FOR CARRYING OUT THE INVENTION

A preferred embodiment of the present invention is explained in paragraphs arranged in the following order.

1: Tree Structure of Encryption Keys and EKB
2: System Configuration
3: Data Paths of SDMI Contents
4: Typical Configuration of Data Transfer Apparatus (Primary-Recording-Medium Apparatus or PC)
5: Typical Configuration of Data-Recording Apparatus (Secondary-Recording-Medium Apparatus or Recording/Reproduction Apparatus)
6: Management Technique of Mini Disc
7: Authentication Process
8: Content Encryption Technique
9: Variety of Commands
10: Content Check-Outs/Check-Ins
11: Generation and Management Techniques of Content IDs
12: Content-ID Generation at Check-out and before Check-in
13: Content Write protect flag
14: Accounting-Information Process 1: Tree Structure of Encryption Keys and EKB First of all, before the transfer system implemented by an embodiment of the present invention is explained concretely, an organization of encryption keys used in distribution of contents is described.

To begin with, the following description explains an encryption-key ownership scheme for devices and a data distribution scheme, which are adopted when encrypted data is distributed from a content distributor to the devices each serving as a content recipient, by referring to FIGS. 1, 2A, 2B and 3.

Figure 1:
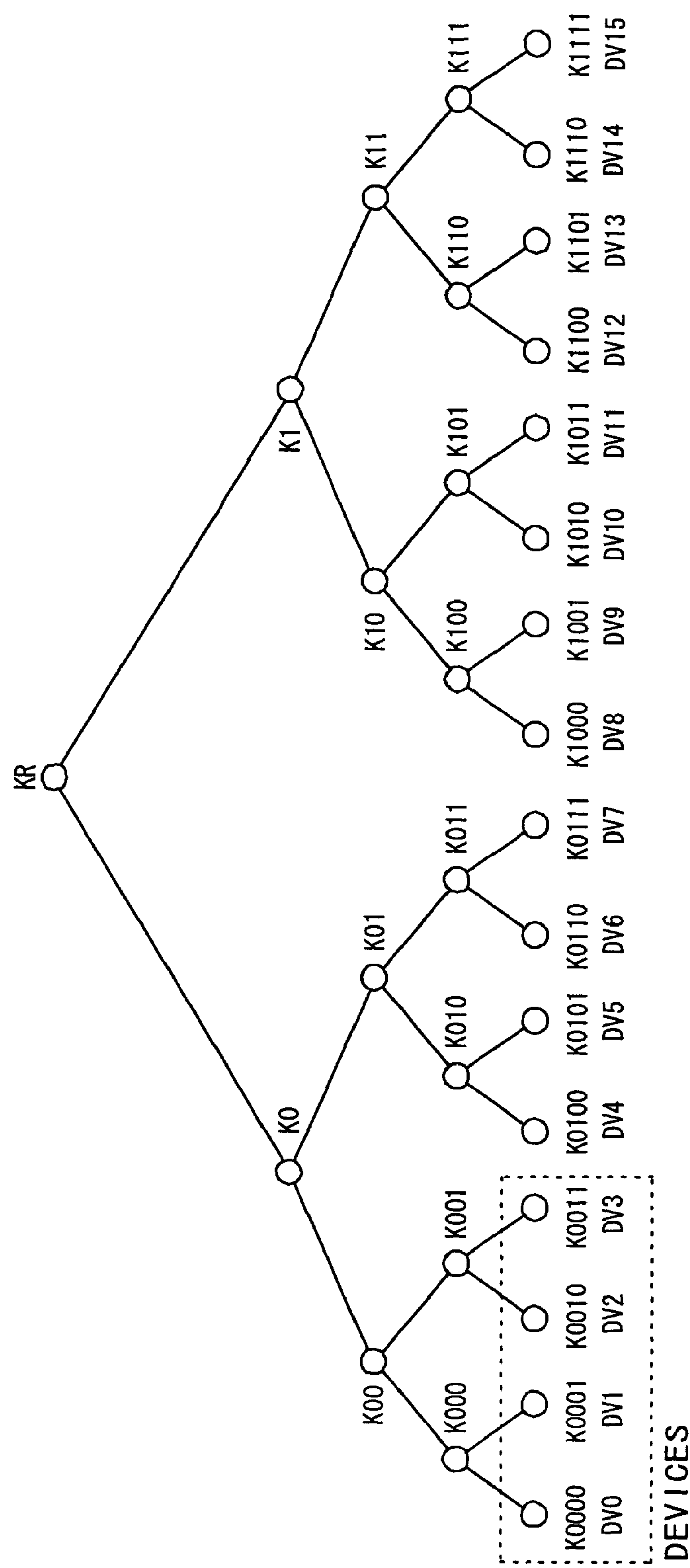
FIG. 1 is an explanatory diagram showing a tree structure of an encryption technique adopted by an embodiment of the present invention.

FIG. 1 is an explanatory diagram showing a tree structure of encryption keys. Reference notations DV0 to DV15 at the bottom layer of the hierarchical tree structure shown in FIG. 1 each denote a device on the content-recipient side. Thus, each leaf of the hierarchical tree structure corresponds to such a device.

Each of the devices DV0 to DV15 is given a set of keys at a manufacturing time, at a shipping time or thereafter. Stored in a memory employed in each of the devices, the set of keys given to a device comprises a leaf key assigned to a leaf representing the device in the hierarchical tree structure shown in FIG. 1 and node keys each assigned to a node between the leaf and the root in the hierarchical tree structure. Keys included in this key set are referred to as DNKs (Device Node Keys), examples of which are explained as follows.

K0000 to K1111 at the bottom layer of the hierarchical tree structure shown in FIG. 1 are leaf keys given to the devices DV0 to DV15 respectively. KR is the root key assigned to the root on the top of the hierarchical tree structure. K0 to K111 are node keys assigned to nodes on a second hierarchical layer from the bottom layer. In the following description, the node keys may mean node keys including root key KR assigned to the root.

In the hierarchical tree structure shown in FIG. 1, DNKs given to device DV0 include a leaf key K0000, node keys K000, K00 and K0 as well as a root key KR. The node keys K000, K00 and K0 and the root key KR, which are included in the DNKs, are each held by device DV0 in a state of being encrypted by using the leaf key K0000.

By the same token, DNKs given to device DV5 include a leaf key K0101, node keys K010, K01 and K0 as well as the root key KR. In the same way, DNKs given to device DV15 include a leaf key K1111, node keys K111, K11 and K1 and the root key KR.

It is to be noted that, while only 16 devices DV0 to DV15 are shown in the tree structure shown in FIG. 1 and the tree structure is designed as a balanced right-left symmetrical structure having four hierarchical layers, the tree structure may include more devices and has a configuration with a layer count varying from portion to portion.

In addition, a variety of information-processing apparatus (the aforementioned devices) included in the tree structure shown in FIG. 1 have a variety of recording mediums. The information-processing apparatus are devices of a variety of types. The devices have recording mediums such as a DVD, a CD, an MD and a flash memory, which are either embedded in the devices or can be mounted on and dismounted from the devices with a high degree of freedom. In addition, a variety of application services may be rendered for the information-processing apparatus. The tree structure shown in FIG. 1 is used for distributing contents and keys to the devices carrying out a variety of applications.

In a system wherein these various information-processing apparatus (or devices) and application exist, let a group be set to include devices DV0, DV1, DV2 and DV3 using the same recording medium. In the tree structure shown in FIG. 1, the device group is enclosed by a dashed line. Assume for example that, for all the devices, a content provider encrypts a content to be transmitted to the devices pertaining to the group enclosed by the dashed line to be used as a content common to the devices. In this case, the content provider also transmits contents keys to the devices to be used by the devices as keys common to the devices. Other processing in the data transfer system includes transmission of encrypted payment data of content fees from the devices to the content provider, a financial settlement institution or another enterprise. The enterprise such as the content provider or the financial settlement institution carries out processing to transmit collectively data to the devices enclosed by the dashed line, namely, DV0, DV1, DV2 and DV3. The enterprise exchanges data with the devices, which form the aforementioned group. A plurality of such groups exists in the tree structure shown in FIG. 1. The enterprise such as the content provider or the financial settlement institution, which exchanges data with the devices, functions as a message-data distribution means.

It is to be noted that that node keys and leaf keys can also be managed by a single key management center in an integrated manner. As an alternative, the keys can also be managed by the message-data distribution means, which exchanges various kinds of data with groups cited above, in group units. As mentioned above, the message-data distribution means is an enterprise such as a content provider or a financial settlement institution. A node key and/or a leaf key are renewed when one of them has been leaked. Processing to renew keys is carried out by a key management center, a provider, a financial settlement institution or another enterprise.

As is obvious from FIG. 1, in this tree structure, the three devices, namely, DV0, DV1, DV2 and DV3, which are included in the group, have common keys: node keys K00 and K0 and the root key KR. By assigning these node and root keys to the devices DV0, DV1, DV2 and DV3 in the group as keys common to the devices, a common content key can be provided to only the devices.

By setting the shared node key K00 itself as a content key, for example, a content key common to the devices DV0, DV1, DV2 and DV3 can be set for only the devices without transmitting a new key. As an alternative, a new content key CK is encrypted by using the node key K00 to produce an encrypted key E (K00, CK), which is then distributed to the devices DV0, DV1, DV2 and DV3 by way of a network, or by using a recording medium for recording the encrypted key and supplying the medium to the devices. In this way, only the devices DV0, DV1, DV2 and DV3 are capable of decrypting the encrypted key E (K00, CK) by using the node key K00 shared thereby as a common key to produce the content key CK.

Assume that it is discovered at a time t that keys K0011, K00, K00, K0 and KR, which are owned by the device DV3, have been analyzed by a hacker and hence exposed to the hacker. In this case, it is necessary to detach the device DV3 from the system or, specifically, the group consisting of the devices DV0, DV1, DV2 and DV3, in order to protect data exchanged with the system thereafter.

In addition, it is also necessary to renew the keys K0, K00, K0 and KR to keys K(t)001, K(t)00, K(t)0 and K(t)R respectively and to transmit the renewed keys K(t)001, K(t)00, K(t)0 and K(t)R to the devices DV0, DV1 and DV2. It is to be noted that notation K(t)aaa denotes a renewed key of a key Kaaa of a t generation.

It is needless to say that, in a distribution of a content, node keys and the root key KR may also be renewed in some cases for a variety of reasons including a desire of the copyright owner and a state of transmission to the system.

Thus, when a key is renewed, it is necessary to transmit the renewed key to regular devices owning the pre-renew key.

Next, processing to distribute renewed keys is explained. Updated keys are organized and transmitted by using a table like one shown in FIG. 2A. The table is transmitted to a device by way of a network, or by storing the table in a recording medium and providing the medium to the device. The table contains a block data called an EKB (Enabling Key Block). If the device DV3 is detached from the system as described above, for example, the EKB is supplied to the devices DV0, DV1 and DV2.

It is to be noted that the EKB contains encrypted keys obtained as results of encrypting new keys to be distributed to some devices at leaves of a tree structure like the one shown in FIG. 1. The EKB is also referred to as a KRB (Key Renewal Block).

The block data of the EKB shown in FIG. 2A comprises encrypted renewed node keys that can be decrypted by devices needing the renewed node keys. The typical EKBs shown in FIGS. 2A and 2B are each block data created for the purpose of distributing renewed node keys of the t generation to the devices DV0, DV1 and DV2 in the tree structure shown in FIG. 1.

Assume that the keys K0011, K001, K00, K0 and KR have been illegally exposed to unauthorized person. In this case, the devices DV0 and DV1 require renewed keys K(t)00, K(t)0 and K(t)R whereas the device DV2 requires renewed keys K(t)001, K(t)00, K(t)0 and K(t)R.

As shown in FIG. 2A, the EKB includes a plurality of encrypted renewed keys. An encrypted renewed key at the bottom of the EKB is E (K0010, K(t)001), which is a result of encrypting a renewed key K(t)001 by using the leaf key K0010 owned by the device DV2. Thus, the device DV2 is capable of decrypting the encrypted renewed key E (K0010, K(t)001) by using the leaf key owned by the device itself to get the renewed node key K(t)001.

In addition, an encrypted renewed key E (K(t)001, K(t)00) on the second line from the bottom of the EKB shown in FIG. 2A can be decrypted by using the renewed node key K(t)001 to get a renewed node key K(t)00. Then, an encrypted renewed key E (K(t)00, K(t)0) on the second line from the top of the EKB can be decrypted by using the renewed node key K(t)00 to get a renewed node key K(t)0. Finally, an encrypted renewed key E (K(t)0, K(t)R) on the top line of the EKB can be decrypted by using the renewed node key K(t)0 to get a renewed root key K(t)R.

As for the devices DV0 and DV1, the leaf keys K0000 and K0001 as well as the node key K000 are not renewed. Thus, only the renewed keys K(t)00, K(t)0 and K(t)R are needed.

Therefore, in the case of the devices DV0 and DV1, an encrypted renewed key E (K000, K(t)00) on the third line from the top of the EKB shown in FIG. 2A can be decrypted by using the renewed node key K(t)000 to get a renewed node key K(t)00. Then, an encrypted renewed key E (K(t)00, K(t)0) on the second line from the top of the EKB can be decrypted by using the renewed node key K(t)00 to get a renewed node key K(t)0.Finally, an encrypted renewed key E (K(t)0, K(t)R) on the top line of the EKB can be decrypted by using the renewed node key K(t)0 to get a renewed root key K(t)R.

As described above, the devices DV0, DV1 and DV2 are capable of obtaining the renewed root key K(t)R. It is to be noted that indexes included in the EKB shown in FIG. 2A are each an absolute address of a leaf or node key used as a decryption key for decrypting an encrypted key on the same line as the index.

As another example, assume that the renewed root key K(t)R and the renewed node key K(t)0 on the high hierarchical layer of the tree structure shown in FIG. 1 are not required, and only the node key K00 needs to be renewed. In this case, the EKB shown in FIG. 2B can be used for distributing a renewed node key K(t)00 to the devices DV0, DV1 and DV2.

The EKB shown in FIG. 2B can be used typically for distributing a new content key common to devices pertaining to a specific group.

To put it concretely, the devices DV0, DV1, DV2 and DV3 pertaining to the group enclosed by the dashed line in FIG. 3 share a recording medium and need a new common content key CK (t). In this case, encrypted data E (K (t)00, CK (t)) and the EKB shown in FIG. 2B are transmitted to the devices DV0, DV1, DV2 and DV3. The encrypted data E (K (t)00, CK (t)) is a result of encrypting the new common content key CK (t) by using a renewed node key K(t)00, which is a result of renewing the node key K00 common to the devices DV0, DV1, DV2 and DV3.

By distributing only the encrypted data E (K (t)00, CK (t)) and the EKB, no data can be decrypted by other devices such as the device DV4 pertaining to other groups.

The devices DV0, DV1 and DV2 process the EKB shown in FIG. 2B in the same way as the processing of the EKB shown in FIG. 2A to get the renewed node key K (t)00 which is used for decrypting the encrypted data E (K (t)00, CK (t)) to obtain the new common content key CK (t) of the t generation.

As described above, keys are organized to form a tree structure, and keys are renewed to be distributed to devices by using EKBs like the ones explained earlier.

By using such a key organization, the root key and node keys can be renewed with ease for a variety of reasons and a content in a normal state can be distributed in a flexible manner.

FIG. 3 is a diagram showing a typical format of an EKB. The number of node keys has a length of 4 bytes. A node-key depth also has a size of 4 bytes. The node-key depth is the number of hierarchical layers in the hierarchical tree for a device serving as a destination of the distribution of the EKB.

An EKB version also has a size of 4 bytes. It is to be noted that an EKB version has a function identifying a most recent EKB and a function indicating a relation with a content. A reserved field is an available area.

A field starting from an offset of 16 bytes is a field for storing the EKB's actual data having a size of 16 Mbyte. The actual data is an encrypted node key or a plurality of encrypted node keys. These encrypted node keys are the encrypted keys explained earlier by referring to FIGS. 2A and 2B.

In addition, the format includes an encrypted EKB version and an electronic signature. The electronic signature is put by an EKB-issuing office issuing the EKB. Examples of the EKB-issuing office are a key management center, a content provider and a financial settlement institution. A device receiving an EKB verifies that the EKB-issuing office issuing the EKB is valid by authentication of the signature.

2: System Configuration

The following description explains the embodiment of the present invention adopting the key organization described above.

FIG. 4 is a diagram showing a typical system configuration. A primary-recording-medium apparatus 1 corresponds to the data transfer apparatus provided by the present invention. On the other hand, a secondary-recording-medium apparatus 20A corresponds to the data-recording apparatus provided by the present invention. The primary-recording-medium apparatus 1 and the secondary-recording-medium apparatus 20A form a data transfer system.

The primary-recording-medium apparatus 1 is implemented by typically a personal computer.

For the sake of convenience, in the following explanation, by a personal computer, the primary-recording-medium apparatus 1 is meant. However, the primary-recording-medium apparatus 1 is not necessarily a personal computer.

In order to carry out operations of the data transfer apparatus provided by the present invention, the personal computer functioning as the primary-recording-medium apparatus 1 executes software for implementing accumulation and transfers of SDMI content data, which are initiated in the personal computer 1.

An HDD 5 embedded in or externally added to the personal computer 1 serves as the primary recording medium (and a primary-recording-medium drive means). It is to be noted that, while the HDD5 is used as the primary recording medium in the explanation of the embodiment, a recording medium functioning as the primary recording medium is not necessarily an HDD. The primary recording medium can be one of a variety of conceivable recording mediums such as an optical disc, a magneto-optical disc, a semiconductor memory embedded in the primary-recording-medium apparatus 1 and a portable semiconductor memory such as a memory card.

The primary-recording-medium apparatus 1 is capable of communicating with a content server 91 through a communication network 110. Content data such as music can be downloaded from the content server 91 to the primary-recording-medium apparatus 1. It is needless to say that a plurality of content servers 91 may be connected to the communication network 110. The user of the primary-recording-medium apparatus 1 can receive a service to download various kinds of data from any arbitrary one of the content servers 91.

Content data downloaded from the content server 91 to the personal computer 1 can be content data conforming to the SDMI standard or content data not conforming to the SDMI standard.

A transmission line forming the communication network 110 is a wire or radio public communication line. As an alternative, a transmission line forming the communication network 110 can be a dedicated line connecting the personal computer 1 to the content server 91. To put it concretely, the communication network 110 can be the Internet, a satellite communication network, an optical fiber network or any other communication line.

The HDD 5 of the personal computer 1 can be an embedded or externally connected disc drive for driving a packet medium 90 such as a CD-DA or a DVD, from which content data such as music is reproduced. In the following description, the packet medium 90 is also referred to as a disk 90 or a removable recording medium 90.

The personal computer 1 is connected to a secondary-recording-medium apparatus 20A or 20B, to which content data stored in the HDD5 can be transferred. The secondary-recording-medium apparatus 20A or 20B is a recording apparatus or a recording/reproduction apparatus for recording data onto a secondary recording medium. Thus, content data received from the personal computer 1 can be recorded onto the secondary recording medium in a copy operation.

There are a variety of conceivable examples of the secondary-recording-medium apparatus 20A or 20B. In the following description, however, the secondary-recording-medium apparatus 20B is a recording apparatus conforming to the SDMI standard.

In the secondary-recording-medium apparatus 20B conforming to the SDMI standard, the secondary recording medium is assumed to be a memory card conforming to the SDMI standard. Such a memory card employs a semiconductor memory such as a flash memory. Thus, the secondary-recording-medium apparatus 20B is a recording/reproduction apparatus for recording and reproducing data onto and from a memory card conforming to the SDMI standard. In this case, an SDMI content is recorded on the secondary recording medium in an encrypted state.

There is created an information management format including a content ID stored in the secondary recording medium conforming to the SDMI standard. The content ID is used as an identifier for identifying an SDMI content. When content data is stored in the HDD 5 of the personal computer 1, a content ID is generated by an application for the content data and stored in the HDD 5 along with the content data. In addition, check-outs and check-ins are managed by using content IDs. It is assumed that, when content data is recorded onto the secondary recording medium conforming to the SDMI standard, the content ID of the content data can also be recorded onto the secondary recording medium along with the content data.

On the other hand, the secondary-recording-medium apparatus 20A is a data-recording apparatus not conforming to the SDMI standard. Details of the secondary-recording-medium apparatus 20A will be described later. The secondary recording medium of the secondary-recording-medium apparatus 20A is used for storing an SDMI content, which requires protection of its copyright, in an unencrypted state. An example of this secondary-recording-medium apparatus 20A is a mini disc. Thus, an example of the secondary-recording-medium apparatus 20A is a mini-disc recording/reproduction apparatus. In the following description, the secondary-recording-medium apparatus 20A is also referred to simply as a recording/reproduction apparatus 20A in some cases.

In this case, in order not to lose a function to protect a copyright even if an SDMI content is recorded in an unencrypted state, successful authentication to be described later is taken as a condition for an operation to copy the SDMI content.

A secondary recording medium of the secondary-recording-medium apparatus 20A is a conventional medium, which has been becoming popular. An example of the secondary recording medium is a mini disc. However, the secondary recording medium of the secondary-recording-medium apparatus 20A does not include an area for storing a content ID. For this reason, a special management technique is adopted for content IDs as will be described later.

It is to be noted that a medium, which data is recorded onto and reproduced from by the secondary-recording-medium apparatus 20A, is not limited to a mini disc. Other secondary recording mediums of the secondary-recording-medium apparatus 20A conceivably include a memory card employing a semiconductor memory such as a flash memory, a mini disc functioning as a magneto-optical disc, a CD-R (CD Recordable), a CD-RW (CD Rewritabe), a DVD-RAM, a DVD-R and a DVD-RW. Thus, the secondary-recording-medium apparatus 20A can be any recording apparatus as long as the recording apparatus is capable of recording data onto any one of these recording mediums.

The personal computer 1 is connected to the secondary-recording-medium apparatus 20A or 20B by line conforming to a transmission standard such as the USB (Universal Serial Bus) or IEEE-1394 standard. It is needless to say that another kind of transmission line can also be used as long as the other transmission line is capable of transmitting content data or the like. Examples of the other transmission line are a wire transmission line and a radio transmission line.

3: Data Paths of SDMI Contents

Assume for example a system like one shown in FIG. 4. In this case, data paths prescribed by the SDMI standard are shown in FIG. 5.

It is to be noted that a musical content goes through the data path in processing carried out by the personal computer 1, which is provided with the HDD 5 as the primary recording medium, to store the musical content onto the HDD 5 or to transfer the content to an external apparatus such as the secondary-recording-medium apparatus 20A or 20B. In other words, the data paths are implemented by software executed by the personal computer 1 to carry out processing to store the musical content onto the HDD 5 or to transfer the content to the external apparatus.

Procedures and processing to store a musical content onto the HDD 5 or to transfer the content to an external apparatus through the data paths shown in FIG. 5 are denoted by reference notations DP1 to DP9. In the following description, reference notations DP1 to DP9 are used to refer to their respective procedures.

In a procedure DP1, content data (network content) distributed by the external content server 91 to the personal computer 1 by way of the communication network 110 shown in FIG. 4 is examined to form a judgment as to whether or not the data is a content requiring protection of its copyright in conformity with the SDMI standard.

A network content distributed by the external content server 91 to the secondary-recording-medium apparatus 20A or 20B can be a content conforming to the SDMI standard (referred to as an SDMI-conforming content) or a content having nothing to do with the SDMI standard (referred to as a non-SDMI content).

An SDMI-conforming content has been encrypted by using a content key CK in a key encryption process such as a DES process. Typically, the pre-encryption data of an SDMI-conforming content is encoded data A3D compressed by using a compression technique such as ATRAC3. In this case, the encrypted SDMI-conforming content is expressed by reference notation E (CK, A3D).

If the distributed network content is an SDMI-conforming content, the data path continues from the procedure DP1 to a procedure DP2, in which the network content is stored as an SDMI content in the HDD 5 serving as the primary recording device.

In this case, the content data is written into the HDD 5 in the distributed state E (CK, A3D) as it is. As an alternative, the content data is once decrypted before being encrypted again by using another content key CK' to generate encrypted data E (CK', A3D) to be stored onto the HDD 5. That is to say, the content key is changed from CK to CK'.

If the distributed network content is a non-SDMI content, on the other hand, the data path continues from the procedure DP1 to a procedure DP3, in which a watermark-check process is carried out. The watermark-check process is a screening process based on a watermark.

Also in the procedure DP3, a watermark-check process is carried out on a disc content without executing the procedure DP1. A disc content is a content read out from a package medium mounted on a drive embedded in the personal computer 1 or mounted on a disc drive connected to the personal computer 1. An example of the embedded drive is a ROM drive. Examples of the package medium include a CD-DA and a DVD.

That is to say, for a disc content, which is content data not conforming to the SDMI standard, a watermark-check process is carried out.

If the disc content does not pass the watermark-check process, the data path continues from the procedure DP3 to a procedure DP5 in which the disc content is determined to be a content that cannot be copied in the data paths. A variety of conceivable concrete handlings can be implemented through the design of software. For example, such a disc content is stored into the HDD 5 but treated like content data that cannot be transferred for the purpose of copying or moving the data to another medium. As an alternative conceivable handling, such a disc content is not stored in the HDD 5 in the content processing conforming to the SDMI standard.

If the content passes the watermark-check process, that is, if an electronic watermark exists and a copy control bit is confirmed to indicate that a copy operation is permitted, on the other hand, the content is determined to be content data that can be copied legally. In this case, the data path continues to a procedure DP4 to form a judgment as to whether or not the content is to be handled in conformity with the SDMI standard. Whether or not a content is to be handled as data conforming to the SDMI standard is dependent on the software design, a user setting or the like.

If the content is not to be handled in conformity with the SDMI standard, the data path continues to a procedure DP6 in which the content is treated as a non-SDMI content and excluded from the content-data path conforming to the SDMI standard. For example, a transfer of the content to a recording apparatus not conforming to the SDMI standard is enabled.

If the content is to be handled in conformity with the SDMI standard, on the other hand, the data path continues from the procedure DP4 to the procedure DP2 in which the content data is encrypted and stored into the HDD 5 as an SDMI content. To be more specific, the content data is stored into the HDD 5 typically in an E (CK, A3D) or E (CK', A3D) state.

In accordance with the data paths described above, an SDMI network content or an SDMI disc content is stored into the HDD 5, which is used as a primary recording medium. An SDMI network content is a content, which is received from the communication network 110 and to be handled in conformity with the SDMI standard. On the other hand, an SDMI disc content is a content, which is read out from a disc such as a CD-DA or another medium and to be handled in conformity with the SDMI standard.

In addition, for an SDMI content, a content ID unique to the SDMI content is generated and stored into the HDD 5 along with the SDMI content. The content ID is used in usage-rule management, which is executed for each SDMI content as will be described later.

In accordance with a predetermined rule, an SDMI content stored in the HDD 5 is transferred to the secondary-recording-medium apparatus 20B conforming to the SDMI standard so that the content can be copied to a secondary recording medium also conforming to the SDMI standard. As described above, an SDMI content can be an SDMI network content or an SDMI disc content. In addition, in the case of this embodiment, besides the secondary-recording-medium apparatus 20B conforming to the SDMI standard, the SDMI content stored in the HDD 5 can also be transferred to the secondary-recording-medium apparatus 20A not conforming to the SDMI standard under a predetermined condition.

First of all, assume that the personal computer 1 employing the HDD 5 is connected to the secondary-recording-medium apparatus 20B conforming to the SDMI standard. In this case, an SDMI content stored in the HDD 5 is transferred to the secondary-recording-medium apparatus 20B as follows.

In the case of an SDMI disc content, a usage rule for transferring the content is determined in advance. In a procedure DP8, the transfer of the SDMI disc content according to the usage rule to the secondary-recording-medium apparatus 20B conforming to the SDMI standard for the purpose of copying the content to the secondary-recording-medium apparatus 20B is recognized.

It is to be noted that these data paths are paths of a check-out or an operation to transfer a content from the HDD 5 serving as a primary recording medium to a secondary recording medium such as a memory card mounted on the secondary-recording-medium apparatus 20B conforming to the SDMI standard or the secondary-recording-medium apparatus 20A conforming to the SDMI standard to copy the content to be reproduced by the secondary-recording-medium apparatus 20B or 20A. An operation opposite to a check-out is a check-in, which is an operation to transfer or move a content from the secondary recording medium back to the primary recording medium. It is worth noting that, in such a move operation to transfer a content from the secondary recording medium back to the primary recording medium, the content data is erased from the secondary recording medium.

As a usage rule of a transfer of an SDMI disc content, an upper limit is imposed on the number of allowable check-outs. For example, up to three check-outs are permitted for a piece of content data. Thus, a content can be copied to up to three secondary recording mediums conforming to the SDMI standard in check-out operations. When a content is moved back from a secondary recording medium to the primary recording medium in a check-in, the number of check-outs carried out so far for the content data is decremented by one. Thus, even after a content has been copied to three secondary recording mediums conforming to the SDMI standard, the content can be copied again to a secondary recording medium conforming to the SDMI standard provided that the content has been moved from one of the three secondary recording mediums in a check-in back to the primary recording medium. That is to say, content data is permitted to exist in up to three secondary recording mediums conforming to the SDMI standard.

Also in the case of an SDMI network content, a usage rule for transferring the content is determined in advance. In a procedure DP7, the transfer of the SDMI network content according to the usage rule to the secondary-recording-medium apparatus 20B conforming to the SDMI standard for the purpose of copying the content to the secondary-recording-medium apparatus 20B is recognized.

As a usage rule of a transfer of an SDMI network content, an upper limit is imposed on the number of allowable check-outs as is the case with an SDMI disc content. The upper limit can be the same as or different from the upper limit set for an SDMI disc content. For example, an upper limit of one imposed on the number of allowable check-outs is conceivable. In this case, each piece of content data can be copied only to one secondary recording medium conforming to the SDMI standard. If the content data is moved back from the secondary recording medium to the primary recording medium in a check-in, the content data can be copied again to a secondary recording medium conforming to the SDMI standard.

An SDMI content copied in accordance with these usage rules from a primary recording medium to a secondary recording medium conforming to the SDMI standard in a check-out is transferred through a transmission line in an encrypted state. To be more specific, the SDMI content is transferred through a transmission line in an E (CK, A3D) or E (CK', A3D) state.

Then, the SDMI content transferred in an encrypted state is received by the secondary-recording-medium apparatus 20B conforming to the SDMI standard to be copied to the secondary recording medium in the encrypted state as it is.

In an operation carried out by the secondary-recording-medium apparatus 20B conforming to the SDMI standard to reproduce the SDMI content copied and recorded to the secondary recording medium, the content is read out from the secondary recording medium and decrypted to reproduce the content. To put it in detail, the content data recorded in the secondary recording medium in the E (CK, A3D) or E (CK', A3D) state is decrypted by using the content key CK or CK' to generate respectively a content D {CK, E (CK, A3D)}=A3D or D {CK', E (CK', A3D)}=A3D, which is the original unencrypted content compressed by using the ATRAC3 compression technique. The original unencrypted compressed content A3D is subjected to processing such as a decompression process opposite to the ATRAC3 compression process to carry out demodulation processing to produce output audio data such as music.

As described above, a copyright for content data conforming to the SDMI standard can be properly protected by the encrypted state of the content data along the data paths for a check-out of the content data to the secondary-recording-medium apparatus 20B conforming to the SDMI standard and the encrypted state of the content data in the secondary recording medium as well as properly protected by copy management executed by checking the usage rules set for content transfers.

If the secondary-recording-medium apparatus 20A is connected to the personal computer 1, on the other hand, the following processing is carried out.

It is to be noted that, as described above, unlike the secondary-recording-medium apparatus 20B conforming to the SDMI standard, the secondary-recording-medium apparatus 20A records a content onto a secondary recording medium such as a mini disc in an unencrypted state. Since a content is recorded onto a mini disc in an unencrypted state, the content data copied to and recorded on the mini disc can be can be reproduced by an ordinary mini-disc reproduction apparatus, which has been becoming popular in general so that more convenience can be offered to the user.

Since a content is recorded onto a mini disc in an unencrypted state, however, a problem is raised in the protection of the copyright for the content. In order to solve this problem, it is necessary to satisfy predetermined conditions for transferring content data to the secondary-recording-medium apparatus 20A.

In order to transfer an SDMI network content to the secondary-recording-medium apparatus 20A and record the content onto a secondary recording medium in an unencrypted state in a copy operation, it is necessary to satisfy the following three transfer conditions for the copy operation:

(1): The secondary-recording-medium apparatus 20A shall pass an authentication process, giving an OK authentication result.

(2): The copyright owner shall recognize the copy operation to transfer the content data to the secondary-recording-medium apparatus 20A and record the data onto the secondary recording medium.

(3): The transfer of the content data shall abide by usage rules set for check-outs and check-ins.

Nevertheless, it is not possible to carry out a copy operation to transfer the content data to an apparatus other than the secondary-recording-medium apparatus 20B conforming to the SDMI standard in an unrestricted manner even if above transfer conditions (1) (2) and (3) are satisfied. In this way, the function to protect a copyright is preserved. In addition, the function to protect a copyright works due to the fact that content data is transferred through a transmission line in an encrypted state and it is not until the content data is received by the secondary-recording-medium apparatus 20A that the data is decrypted by the secondary-recording-medium apparatus 20A.

In a procedure DP9, above transfer conditions (1), (2) and (3) are checked before an SDMI network content is transferred to the secondary-recording-medium apparatus 20A.

To put it in detail, the secondary-recording-medium apparatus 20A is subjected to a predetermined authentication process. In addition, flag information or the like included in the content data is examined to verify the copyright owner's intention as to whether or not the copy operation is allowed. Furthermore, the check-out and check-in usage rules are implemented.

An SDMI network content copied to the secondary-recording-medium apparatus 20A under the conditions described above is transmitted through a transmission line in an encrypted state as it is. To be more specific, the SDMI network content is transmitted through the transmission line in an E (CK, A3D) or E (CK', A3D) state.

The encrypted SDMI network content is received by the secondary-recording-medium apparatus 20A having a configuration shown in FIG. 7 and then decrypted by a decryption processing unit 28 to generate the original data A3D compressed by using the ATRAC3 compression technique. Then, the encrypted content data A3D is subjected to an encoding process carried out by an EFM/ACIRC encoder/decoder 24 included in the configuration shown in FIG. 7 before being supplied to a recording/reproduction unit 25 for recording the data onto a mini disc 100.

Thus, in an operation to reproduce the SDMI content copied to and recorded on the mini disc 100, the secondary-recording-medium apparatus 20A needs to carry out the same decoding processes as an ordinary mini-disc system on data read out from the mini disc 100. The decoding processes include an EFM demodulation process, an ACIRC error correction process and a decompression process adopting a decompression technique as a counterpart of the ATRAC compression technique.

It means that the copied content data recorded on the mini disc 100 can be reproduced normally by an ordinary mini-disc reproduction apparatus when the mini disc 100 is mounted on the apparatus. That is to say, the user can enjoy the SDMI network content copied to and recorded on the mini disc 100 by reproduction of the content by means of an ordinary mini-disc reproduction apparatus not conforming to the SDMI standard.

It is to be noted that, if the transfer of a content is not permitted in accordance with results of checking usage rules in the procedures DP7, DP8 and DP9 in the data paths shown in FIG. 5, the content is of course not transferred to the secondary-recording-medium apparatus 20A or 20B.

4: Typical Configuration of Data Transfer Apparatus (Primary-Recording-Medium Apparatus or PC)

FIG. 6 is a block diagram showing the configuration of a primary-recording-medium apparatus 1 functioning as a data transfer apparatus. The following description explains a personal computer used as the data transfer apparatus. By building special-purpose hardware with a configuration for executing the same functions as the primary-recording-medium apparatus 1, however, it is also possible to create an apparatus specially used for data transfers.

In the case of this embodiment, software programs to be executed for carrying out functions of the data transfer apparatus are installed on the personal computer 1 to implement a primary-recording-medium apparatus as the data transfer apparatus. It is to be noted that, in this specification, a personal computer or a computer has a broad meaning of the so-called general-purpose computer.

A software program can be stored in advance in a recording medium embedded in the computer. Examples of the embedded recording medium are the HDD 5 and a ROM 3.

As an alternative, a software program can be stored temporarily or permanently in a removable recording medium 90 such as a floppy disc, a CD-ROM (Compact Disc Read-Only Memory), an MO (Magneto Optical) disc, a DVD (Digital Versatile Disc), a magnetic disc and a semiconductor memory. A program stored in the removable recording medium 90 is presented to the user as the so-called package software.

It is to be noted that, in addition to the installation of a program from the removable recording medium 90 into the computer, a program can also be downloaded into the computer from a download site via an artificial satellite for digital satellite broadcasting by radio communication, or via a network such as a LAN (Local Area Network) or the Internet by wire communication. In the computer, the downloaded program is received by a communication unit 8 to be installed in the embedded HDD 5.

The computer 1 shown in FIG. 6 includes an embedded CPU (Central Processing Unit) 2. The CPU 2 is connected to an input/output interface 10 by a bus 12. The CPU 2 executes a program stored in a ROM (Read-Only Memory) 3 in advance in accordance with a command entered to the CPU 2 via the input/output interface 10 by the user by operating an input unit 7 comprising a keyboard, a mouse and a mike. As an alternative, the CPU 2 loads a program from the HDD 5 into the RAM (Random-Access Memory) 4 for execution. The program is stored in the HDD 5 from the beginning, received by a communication unit 8 from a satellite or a network and installed in the HDD 5 or read out from the removable recording medium 90 such as an optical disc mounted on a drive 9 and installed in the HDD 5. By executing such a program, the CPU 2 carries out processing of a data transfer apparatus for an SDMI content.

The CPU 2, as required, outputs a result of the processing to an output unit 6 composed of a LCD (Liquid Crystal Display), speakers and so on, or the communication unit 8 for transmission by way of the input/output interface 10, or records the result into the HDD 5.

In this case, the communication unit 8 is capable of communicating with a variety of servers through the communication network 110 shown in FIG. 4. To be more specific, the computer 1 is capable of downloading a network content such as a musical content from an external content server 91. The downloaded network content is subjected to processing for a content conforming to the SDMI standard or processing not conforming to the SDMI standard along the data paths described above. The downloaded network content completing the processing for a content conforming to the SDMI standard is stored as an SDMI content into the HDD 5. The SDMI content stored in the HDD 5 is a content to be transferred to the secondary-recording-medium apparatus 20B conforming to the SDMI standard or the secondary-recording-medium apparatus 20A (the recording/reproduction apparatus) 20A passing an authentication test.

A connection unit 11 is a member connected between the secondary-recording-medium apparatus 20A and the secondary-recording-medium apparatus 20B so that data can be communicated between the primary-recording apparatus 1 and the secondary-recording-medium apparatus 20A or the secondary-recording-medium apparatus 20B. Conceivable examples of the connection unit 11 are a USB interface and an IEEE-1394 interface. It is needless to say that a wire interface conforming to other standards and a radio interface using an infrared ray or a radio wave can be used as the connection unit 11.

It is to be noted that the various kinds of processing for implementing the data paths described earlier by referring to FIG. 5 do not have to be sequential processing along the time axis, but the processing for implementing the data paths may include pieces of processing to be carried out concurrently or individually. Examples of the processing to be carried out concurrently or individually are concurrent processing and object oriented processing.

A program can be carried out by a single computer or a plurality of computers in the so-called distributed processing. In addition, a program can be transferred to a remote computer to be executed thereby.

5: Typical Configuration of Data-Recording Apparatus (Secondary-Recording-Medium Apparatus or Recording/reproduction Apparatus)

FIG. 7 is a block diagram showing a typical configuration of the secondary-recording-medium apparatus 20A. In this configuration, the apparatus 20A is, for example, configured as mini disc recorder. Accordingly, a secondary recording medium 100 is a typical mini disc or a magneto-optical disc. The secondary recording medium 100 is also referred to hereafter as the mini disc 100.

It is to be noted that FIG. 7 shows the configuration of the secondary-recording-medium apparatus 20A including only a system for processing data to be recorded onto or reproduced from the mini disc used as the mini disc 100 and a system processing data transferred from the primary-recording-medium apparatus 1. Since other systems in mini disc 100, such as the driving system, the servo system and the playback output system are similar to their respective counterparts employed in the ordinary mini-disc recording/reproduction apparatus, their detailed diagrams are omitted.

In the secondary-recording-medium apparatus 20A, an MD control unit (CPU) 21 serves as a controller for controlling operations to record and reproduce data onto and from the mini disc 100. To put it concretely, the MD control unit 21 controls a rotation driving mechanism, a spindle servo, a focus servo, a tracking servo, a thread servo, operations to apply a laser beam and a magnetic field to an optical head and a magnetic head respectively and processing to encode data to be recorded and decode reproduced data.

A recording/reproduction unit 25 includes an optical head, a magnetic head, a disc-rotation-driving system and a servo system. In actuality, the recording/reproduction unit 25 serves as a member for recording and reproducing data onto and from the mini disc 100.

An EFM/ACIRC encoder/decoder 24 encodes data to be recorded onto the mini disc 100 and decodes data reproduced from the mini disc 100. As is generally known, in the case of a mini-disc system, data to be recorded is subjected to an EFM modulation process and an encoding process for ACIRC error correction codes. The EFM/ACIRC encoder/decoder 24 carries out an ACIRC encoding process and an EFM encoding process on data to be recorded before supplying the data to the recording/reproduction unit 25.

In a reproduction operation, the EFM/ACIRC encoder/decoder 24 carries out decoding processes on an RF signal representing data read out from the mini disc 100 and supplied to the EFM/ACIRC encoder/decoder 24 by the recording/reproduction unit 25. The decoding processes include binary conversion processing, EFM demodulation processing and error correction processing adopting the ACIRC technique.

A buffer memory 30 serves as a buffer for buffering data to be recorded onto the mini disc 100 and data reproduced from the mini disc 100. That is to say, the buffer memory 30 has a buffering function commonly known as a shock-proof function.

In an operation to record data, data compressed and encoded by using the ATRAC/ATRAC3 technique is stored temporarily in the buffer memory 30. The data is then read out in predetermined data units intermittently from the buffer memory 30 and supplied to the EFM/ACIRC encoder/decoder 24 to be recorded onto the mini disc 100.

In an operation to reproduce data, data is read out from the mini disc 100 and decoded by the EFM/ACIRC encoder/decoder 24. The decoded data is stored temporarily in the buffer memory 30. The stored data is then read out continuously from the buffer memory 30 and supplied to a codec 23 for carrying out a decompression/decoding process.

The codec 23 is a member for carrying out compression processing and decompression processing based on respectively encoding and decoding processes adopting the ATRAC/ATRAC3 technique.

Data to be recorded onto the mini disc 100 is compressed by using the ATRAC/ATRAC 3 technique before being subjected to the encoding process. Thus, when the secondary-recording-medium apparatus 20A receives data not completing compression and encoding processes, the codec 23 carries out the compression and encoding processes by adopting the ATRAC or ATRAC3 technique on the data to be recorded, and supplies the compressed data to the EFM/ACIRC encoder/decoder 24. An example of the data not completing compression and encoding processes is PCM audio data.

Data read out from the mini disc 100 by the recording/reproduction unit 25 and decoded by the EFM/ACIRC encoder/decoder 24 in a reproduction operation is a data in a state of being compressed and encoded by adoption of the ATRAC/ATRAC3 technique. The data is supplied to the codec 23 by way of the buffer memory 30. The codec 23 decompresses the data by using a decompression technique as a counterpart of the ATRAC/ATRAC3 technique to generate 16-bit quantized digital audio data having a frequency of 44.1 KHz. The digital audio data is subjected to processing including a D/A conversion process, an analog signal process and an amplification process in an output circuit not shown in the figure to generate a speaker output signal representing reproduced music or the like.

As an alternative, the reproduced signal is output to another apparatus as digital audio data.

The configuration described above includes components of a recording/reproduction apparatus of the ordinary mini-disk system. However, the secondary-recording-medium apparatus 20A implemented by the embodiment has additional members employed in a personal computer to serve as the primary-recording-medium apparatus 1. To be more specific, used for carrying processing such as processes to receive content data transmitted by a data transfer apparatus and decode the data, the members include a communication unit 26, a DMA 27, a decryption processing unit 28, a cache memory 29, a flow control unit 31 and a system control unit 32.

The system control unit 32 (CPU) is a member for controlling the whole secondary-recording-medium apparatus 20A.

Typically, the system control unit 32 controls processing such as issuance of a request for generation of data and a communication for authentication between the personal computer 1 and the secondary-recording-medium apparatus 20A, processing to exchange a variety of commands with the personal computer 1 and processing of content data received from the personal computer 1. In addition, in accordance with the various kinds of control, a command is given to an MD control unit 21 and operations to record and reproduce content data onto and from the mini disc 100 as well as operations to read out and update management information are controlled.

Not shown in the figure, an operation unit and a display unit are provided as a user interface. The system control unit 32 controls processing to monitor operations carried out by the user on the operation unit, processing carried out in accordance with the operations and display processing of the display unit.

Connected to the connection unit 11 of the personal computer 1 shown in FIG. 6, the communication unit 26 is a member for exchanging data with the personal computer 1. The communication unit 26 processes signals conforming to a communication technique as the USB or IEEE-1394 technique.

Data received by the communication unit 26 from the personal computer 1 includes a variety of commands and an SDMI content.

An SDMI content received by the communication unit 26 is stored in a cache memory 29 by control executed by a DMA (Direct Memory Access) 27. It is to be noted that such a content can of course be stored in the cache memory 29 under control executed by the CPU 32 in place of the DMA 27.

The decryption processing unit 28 is a member for carrying out counterpart processing of the process to encrypt an SDMI content. That is to say, the decryption processing unit 28 decrypts content data stored in the cache memory 29. The unencrypted content data is then stored in another area of the cache memory 29.

Since the content data has been encrypted by using a content key CK or CK', information usable for recognizing at least the content key CK or CK' is stored. As will be described later concretely, the DNKs (Device Node Keys) explained earlier by referring to FIG. 1 are stored. The recording/reproduction unit 25 corresponds to a device DVx shown in FIG. 1. DNKs stored in the DVx include a leaf key as well as node keys and a root key, which have been encrypted by using the leaf key. The content key CK can be recognized by using such DNKs or, in some cases, an EKB received as described earlier.

Thus, DNKs are stored information that can be used for recognizing a content key CK for an SDMI content. By using the content key CK, the decryption processing unit 28 is capable of decrypting an encrypted SDMI content received in an encrypted state. The encrypted SDMI content is E (CK, A3D). The result of the decryption is D {CK, E (CK, A3D)}=A3D, which is data compressed by using the ATRAC3 technique. The data compressed by using the ATRAC3 technique is encoded by the EFM/ACIRC encoder/decoder 24 before being stored by the recording/reproduction unit 25 onto the mini disc 100.

It is to be noted that the SDMI content is not always data compressed by using the ATRAC3 technique. For example, linear PCM data encrypted by a content key is conceivable. Thus, there is also a method of inputting transferred content in the E (CK, PCM). In this case, as a matter of course, the decryption processing unit decrypts the encrypted content in the E (CK, PCM) to generate D {CK, E (CK, PCM)}=PCM, which is decrypted linear PCM data. In this case, the PCM data is compressed by the codec 23 by using the ATRAC3 technique before being encoded by the EFM/ACIRC encoder/decoder 24 and recorded onto the mini disc 100 by the recording/reproduction unit 25.

A key may be stored in the decryption processing unit 28 in some cases to be used in an authentication process. In a typical authentication process to be described later, the secondary-recording-medium apparatus 20A uses a stored public key P and a stored private key S. In this case, the public key P and the private key S are both stored in the decryption processing unit 28. The private key S is also used in an encryption process.

In addition, the decryption processing unit 28 includes an embedded hash engine for carrying out the so-called hash-function processing in order to generate a content ID.

It is to be noted that generation of the content ID will be described later.

The decrypted encrypted SDMI content data is transferred from the cache memory 29 to the flow control unit 31. Examples of the decrypted encrypted SDMI content are data compressed by the ATRAC3 technique and PCM data.

The flow control unit 31 is a member for transferring the decrypted encrypted SDMI content data to an MD control unit 21 serving as a recording process system for recording the data onto the mini disc 100. The recording process system includes the codec 23, the EFM/ACIRC encoder/decoder 24, the recording/reproduction unit 25 and the buffer memory 30.

The flow control unit 31 transfers the decrypted encrypted SDMI content upon a request (XARQ) made by the MD control unit 21. The flow control unit 31 adjusts timings of reception of content data, decryption processing and processing to record data onto the mini disc 100.

A bus line 22 is a communication line allowing various kinds of data to be exchanged among the MD control unit (CPU) 21, the codec 23, the buffer memory 30, the EFM/ACIRC encoder/decoder 24, the flow control unit 31, the DMA 27, the cache memory 29, the communication unit 26, the decryption processing unit 28 and the system control unit 32.

In the above configuration, as SDMI content data transmitted by the personal computer 1, data in the E (CK, A3D) state or data in the E (CK, PCM) state is decrypted and encoded by the EFM/ACIRC encoder/decoder 24 by using the ATRAC3 technique before being recorded by the recording/reproduction unit 25 onto the mini disc 100.

By the way, in a check-in and a check-out of content data between the personal computer 1 and the primary-recording-medium apparatus 20A and in other communication sessions, a variety of commands are also transmitted.

These commands are received by the communication unit 26 and passed on to the system control unit 32. The system control unit 32 carries out various kinds of processing in accordance with these commands, and transmits a response to each of the commands to the personal computer 1.

6: Management Technique of Mini Disc

The following description explains data to be recorded onto the mini disc 100 and management information.

In a digital recording/reproduction system such as a mini-disk system, a TOC (Table of Contents) is recorded on a recording medium as management information for controlling operations to record and reproduce data onto and from the medium such as a disc. The recording/reproduction apparatus reads out the TOC information from the recording medium and saves the information in a memory in advance. In recording and reproduction operations, the TOC information is referred to obtain a write or read position so as to allow an access operation for the recording or reproduction operation to be carried out.

In the case of a mini disc, the TOC information includes a P-TOC (pre-mastered TOC) and a U-TOC (a user TOC). The P-TOC is unchangeable information recorded as pits. The U-TOC is information recorded by adopting a magneto-optical technique. The U-TOC is changed to accompany operations such as processing to record and delete musical data. To put it in detail, when musical data is recorded or deleted, the U-TOC's copy stored in a memory is first of all updated and the updated U-TOC copy is then stored in a U-TOC area with a predetermined timing.

It is to be noted that, by using the U-TOC, content data such as audio data recorded onto the disc is managed in units each called a track. Typically, a track corresponds to a piece of music.

First of all, a data unit called a cluster is explained as data stored in the mini disc 100. In the mini-disc system, as recorded data, a data stream is created for each unit called the cluster. The format of the cluster used as the unit of a recording operation is shown in FIG. 8.

Figure 8:
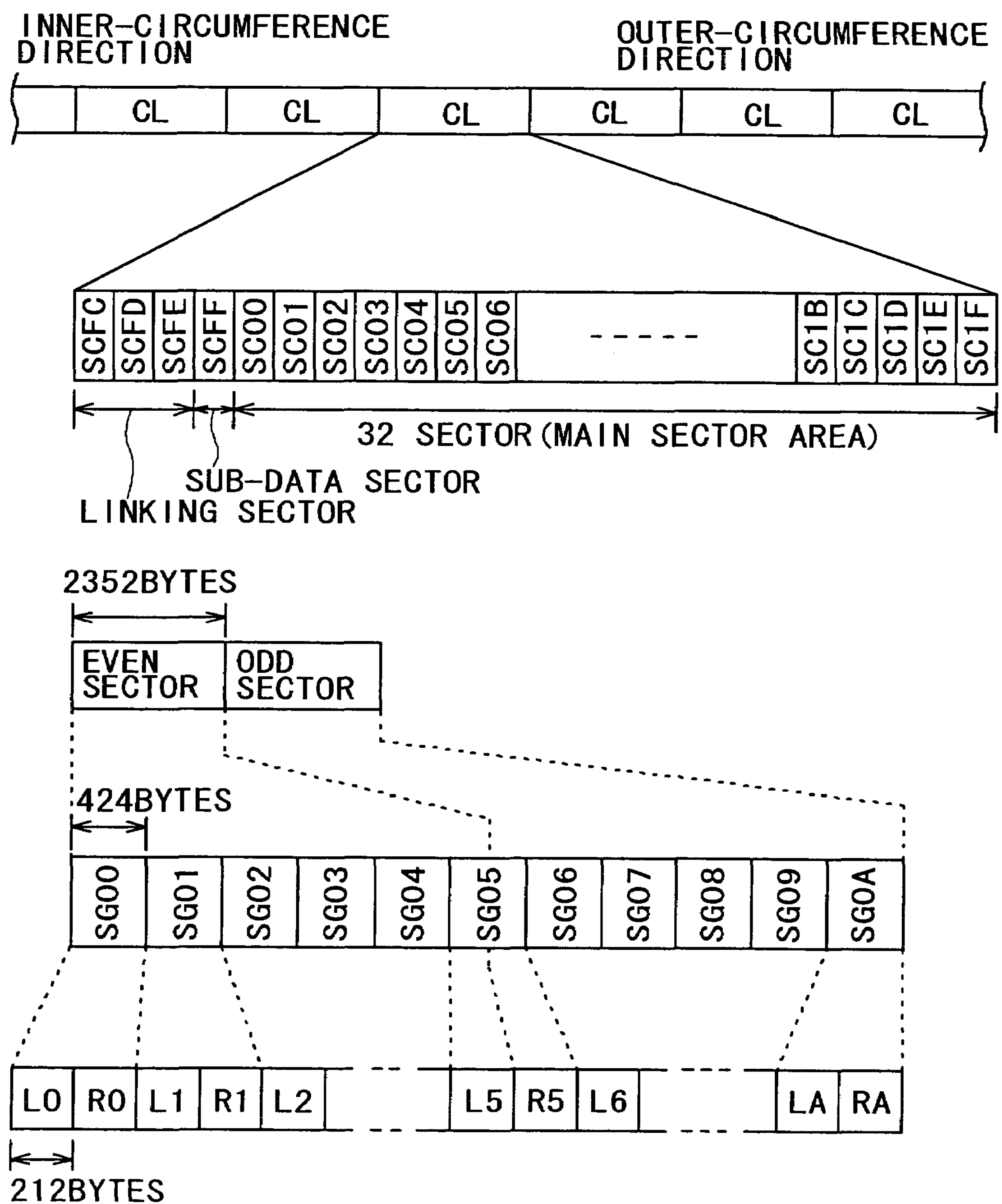
FIG. 8 is an explanatory diagram showing a cluster format of a mini-disk system.

A recorded track in the mini-disk system is a continuous sequence of clusters CL shown in FIG. 8. A cluster is a minimum unit used in a recording operation.

A cluster comprises three sector-linking sectors SCFC to SCFE, a sub-data sector SFCC and 32 main sectors SC00 to SC1F. Thus, a cluster comprises a total of 36 sectors.

A sector is a data unit having a size of 2,352 bytes.

The sector-linking sectors SCFC to SCFE are used as a relaxation area and an adjustment area for a variety of operations. The relaxation area is a break between two consecutive recording operations. The sub-data sector SCFF is used for recording information set as sub-data.

The 32 main sectors SC00 to SC1F are used for recording various kinds of data such as the TOC data and audio data.

A sector is further divided finely into units called sound groups. To be more specific, two sectors are divided into 11 sound groups.

That is to say, as shown in the figure, two consecutive sectors, namely, an even-numbered sector such as a sector SC00 and an odd-numbered sector such as a sector SC01, include sound groups SG00 to SG0A. Each sound group has a size of 424 bytes for storing audio data with an amount corresponding to 11.61 msec.

Data is recorded in one sound group SG, being split into L and R channels. For example, data recorded in the sound group SG00 comprises data L0 for the L channel and data R0 for the R channel. On the other hand, data recorded in the sound group SG01 comprises data L1 for the L channel and data R1 for the R channel.

It is to be noted that 212 bytes used as a data area for the L or R channel are referred to as a sound frame.

FIG. 9 is diagrams showing the area structure of the mini disc 100.

Figure 9A:
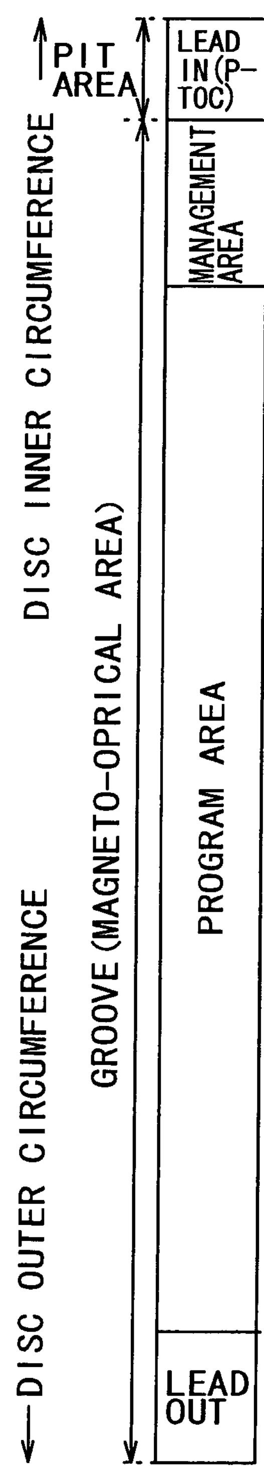
FIG. 9 is an explanatory diagram showing an area structure of a mini disk.

To be more specific, FIG. 9A is a diagram showing areas stretched from the disc innermost circumference side to the disc outermost circumference side. The mini disc 100 used as a magneto-optical disc has a pit area on the innermost circumference side. The pit area is a reproduction-only area used for storing data as emboss pits. In this pit area, the P-TOC is recorded.

Circumferences on the outer side of the pit area are a magneto-optical recording/reproduction area. In this area, grooves are created as guide grooves of recording tracks.

A segment from cluster 0 to cluster 49 on the innermost circumference side of the magneto-optical area is used as a management area. Cluster 50 to cluster 2,251 are a program area used for storing each piece of musical data as a track. An area on the outer side of the program area is used as a lead-out area.

Figure 9B:
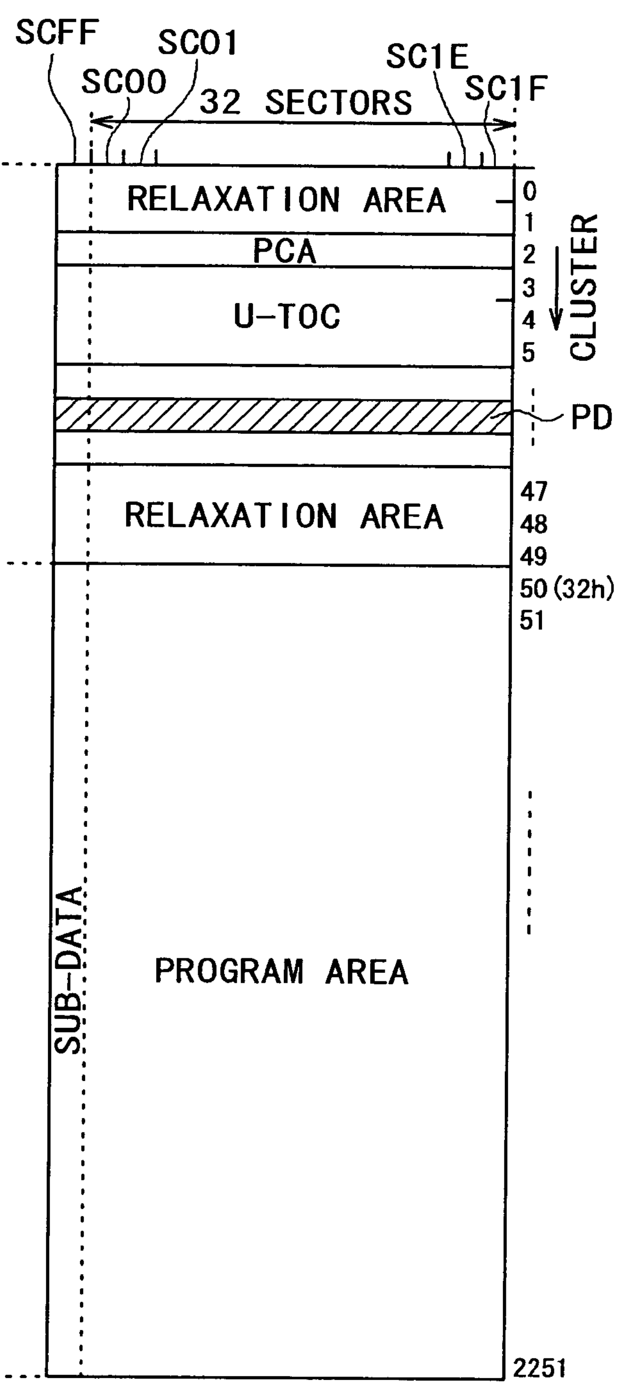

On the other hand, FIG. 9B is a diagram showing details of the management area. In the management area, a horizontal line represents sectors and lines arranged vertically each represent a cluster.

In the management area, clusters 0 and 1 serve as an area of relaxation with the pit area. Cluster 2 is used as a power calibration area (PCA) for adjusting the output power of a laser beam.

Clusters 3, 4 and 5 are used for recording a U-TOC, the contents of which will be described later in detail. A data format of the 32 main sectors SC00 to SC1F in one sector are prescribed, and management information is included in each of the sectors. That is to say, sectors of the U-TOC are prescribed so that the address of each track recorded in the program area and the address of a free area as well as information such as the name of each track and recording times can be recorded in the U-TOC. There are three identical clusters each including sectors used as the U-TOC sectors. These identical clusters are clusters 3, 4 and 5.

Clusters 47, 48 and 49 are an area of relaxation with the program area.

It is to be noted that a hatched portion PD is an area in which prepaid information to be described later is set.

In the program area starting at cluster 50 or cluster 32h if expressed in the hexadecimal format, 32 main sectors SC00 to SC1F in each cluster are used for storing audio data such as music in a compressed form known as the ATRAC form. Each recorded track or content data and free areas are managed by using the U-TOC. It is to be noted that the sector SCFF in each cluster in the program area can be used for recording information serving as sub-data as described earlier.

The sectors of the U-TOC are explained by referring to FIG. 10.

It is to be noted that, as explained earlier by referring to FIG. 9, the P-TOC is read-only information created in a pit area on the innermost circumference side of the disc 90. The P-TOC is used for managing locations in areas such as a recordable user area, a lead-out area and a U-TOC area. It is worth noting that, in a reproduction-only optical disc where all data has been recorded in a pit form, the P-TOC can also be used for managing pieces of music recorded in a manner like a ROM. In this case, the U-TOC is not created. No detailed description of the P-TOC is given.

FIG. 10 is an explanatory diagram showing the format of U-TOC sector 0.

Sectors 0 to 32 can be used as U-TOC sectors. In a cluster described above, U-TOC sectors are main sectors SC00 to SC1F.

In the sectors described above, sectors 1 and 4 are for characteristic information, and sector 2 is an area for storing the date of recording. The detail description of these sectors 1, 2 and 4 are omitted.

U-TOC sector 0 is a data area for recording management information for managing free areas in which content data (or tracks) such as recorded pieces of music and new content data can be recorded.

In an operation to record a piece of music onto the mini disc 100, for example, the MD control unit 21 searches U-TOC sector 0 for a free area on the disc, and writes the piece of music into the area. In a reproduction operation, on the other hand, the MD control unit 21 searches U-TOC sector 0 for an area for recording a piece of music to be reproduced, and makes an access to the area to read out the piece of music.

At the start positions of a data area having a size of 2,352 bytes (=4 bytes×588) in U-TOC sector 0 shown in FIG. 10, a string of pieces of 1-byte data is recorded as a synchronization pattern. Each piece of 1-byte data consists of a string of all zeros or all ones.

The synchronization pattern is followed by an address with a length of 3 bytes. The first 2 bytes, namely Cluster H and Cluster L, are a cluster address. The third byte is a sector address (Sector). The 3 bytes are followed by a byte (MODE) for storing a mode. The synchronization pattern and the 4 bytes form the header. The 3-byte address is the address of the sector itself.

It is to be noted that the configuration of the header including the synchronization pattern and the address applies not only to U-TOC sector 0, but also to a P-TOC sector and sectors in the program area. The address of a sector itself and a synchronization pattern are recorded in the header to each sector.

Predetermined following byte positions are used for recording data such as a manufacturer code, a model code, the number of the first track (First TNO), the number of the last track (Last TNO), the disc serial number and the disc ID.

An area following the disc ID is a pointer portion for storing a variety of pointers, namely, P-DFA, P-EMPTY, P-FRA and P-TNO1 to P-TNO255. These pointers each point to a part descriptor in a table to be described later. A part descriptor is a descriptor of an area (or a part) for storing a track such as a piece of music recorded by the user or a descriptor of a free area.

The table associated with the pointers P-DFA to P-TNO255 is a 255-part-descriptor table comprising 255 part descriptors 01h to FFh. A part descriptor includes the start address of a part (or an area), the end address of the part and the mode of the part (a track mode). If a specific part is continued to another part, the descriptor of the specific part also includes a link information indicating the part descriptor of the other part. By the same token, the part descriptor of the other part includes the start address of the other part, the end address of the other part and the mode of the other part.

It is to be noted that a part is a portion of track for recording the data in track, which is continuous along the time axis, in a physically continuous state.

The start and end addresses are a part or each of a plurality of parts composing a track or a piece of music.

These addresses are each recorded in a shortened form, indicating the location of a cluster, a sector or a sound group.

Even if data of a piece of music (a track) is recorded in a physically discontinuous manner, that is, recorded over a plurality of parts, a recording/reproduction apparatus of this type is capable of reproducing the piece of music by making accesses to the parts sequentially, one part after another, without causing a reproduction problem. Thus, data such as a piece of music recorded by the user is stored by being split over a plurality of parts for the purpose of using a recordable area with a high degree of efficiency.

For the above reason, a part descriptor includes link information. As described above, if a specific part is continued to another part, the descriptor of the specific part also includes a link information indicating the part descriptor of the other part. The link information indicating the part descriptor is a number assigned to the part descriptor of the other part. The number is in the range 01h to FFh.

That is to say, in the table portion of U-TOC sector 0, each part descriptor describes a part. If a piece of music is recorded over 3 parts, for example, the part descriptor of the first part includes a link information to the part descriptor of the second part and the part descriptor of the second part includes a link information to the part descriptor of the third part. In this way, the locations of parts are managed.

It is to be noted that the actual byte location (in U-TOC sector 0) of a part descriptor pointed to by a link information is expressed numerically by the following equation:

Actual location=304+link information×8 (=the size of a part descriptor expressed in terms of bytes).

The contents of a part described by a part descriptor (of the table portion in U-TOC sector 0) with a number in the range 01h to FFh are determined by which of the pointers P-DFA, P-EMPTY, P-FPA and P-TNO1 to P-TNO255 is associated with the part descriptor as follows.

The pointer P-DFA refers to a defective area on the magneto-optical disc 90. That is to say, the pointer P-DFA points to a part descriptor describing a defective area (or a defective track part) caused by an injury or the like or points to the first one of a plurality of part descriptors describing such a defective area or such a defective track part. To be more specific, if a defective part exists, the pointer P-DFA has a value in the range 01h to FFh. This value is a number assigned to a part descriptor including the start and end addresses of the defective part. If another defective part exists, the part descriptor includes a link information to another part descriptor describing the other defective part. If no more defective part exists, the link information in the other part descriptor is set at 00h pointing to no part descriptor.

The pointer P-EMPTY points to an unused part descriptor or the first one of a plurality of unused part descriptors. To be more specific, the pointer P-EMPTY has a value in the range 01h to FFh. This value is a number assigned to an unused part descriptor or the first one of a plurality of unused part descriptors.

If a plurality of unused part descriptors exists, the first one pointed to by the pointer P-EMPTY includes a link information pointing to the second one, which includes a link pointing to the third one and so on. In this way, all unused part descriptors are put on a linked list.

The pointer P-FRA refers to a free area (including deleted area) on the magneto-optical disc 90. A free area is an area into which data can be recorded or from which data has been deleted. That is to say, the pointer P-FRA points to a part descriptor describing a free area (or a free track part) or points to the first one of a plurality of part descriptors describing such a free area or such a free track part. To be more specific, if a free area exists, the pointer P-FRA has a value in the range 01h to FFh. This value is a number assigned to a part descriptor including the start and end addresses of the free area. If such another free areas exist, that is, if a plurality of part descriptor exists, according to a link information, the part descriptor assign to another part descriptor sequentially to the part descriptor which link information is set at 00h.

FIG. 11 is an explanatory diagram showing a model of management of parts each available as a free area. Assume that part descriptors having numbers 03h, 18h, 1Fh, 2Bh and E3h are each designated as a part descriptor describing a free area. In this case, the pointer P-FRA is set at 03h pointing to the first part descriptor. The link in the first part descriptor is set at 18h pointing to the second descriptor whereas the link in the second part descriptor is set at 1Fh pointing to the third descriptor and so on. Finally, the link in the fifth part descriptor is set at 00h pointing to no part descriptor. It is to be noted that defective areas and unused parts descriptors can be managed in the same way.

The pointers P-TNO1 to P-TNO255 each refer to a track such as a piece of music on the magneto-optical disc 90. The track has been recorded on the magneto-optical disc 90 by the user. For example, the pointer P-TNO1 points to a part descriptor describing a first track or points to one of a plurality of part descriptors, which describes the first track's leading part on the time axis.

Assume for example that the first track is a piece of music not divided into a plurality of parts on the disc, that is, the track is recorded as a single part. In this case, the pointer P-TNO1 is set at a number pointing to a part descriptor describing the start and end addresses of an area for recording the first track.

As another example, assume that a second track is a piece of music divided into a plurality of parts on the disc, that is, the track is recorded as a plurality of discrete parts. In this case, the pointer P-TNO2 is set at a number pointing to the first one of part descriptors each describing the start and end addresses of an area for recording one of the parts of the second track. The part descriptors are put on a linked list described above in the chronological order of the parts. To put it concretely, the pointer P-TNO2 is set at a number pointing to the first part descriptor describing the first part on the time axis. The link in the first part descriptor is set at a number pointing to the second descriptor describing the second part on the time axis whereas the link in the second part descriptor is set at a number pointing to the third descriptor describing the third part on the time axis and so on. Finally, the link in the last part descriptor is set at 00h pointing to no part descriptor. As a result, the part descriptors are put on a linked list like the one shown in FIG. 11.

As described above, data of the second piece of music is recorded on parts described by part descriptors arranged in the chronological order of the parts. So, in an operation to reproduce the second piece of music or an operation to update on the area of the second piece of music by using data of U-TOC sector 0, it is possible to read out continuous musical data from the discrete parts and carry out a recording operation by utilizing the recording area with a high degree of efficiency.

By the way, a track mode with a size of 1-byte is also recorded in each part descriptor. The track mode describes attributes of a track described by the part descriptor.

Let d1 (MSB) to d8 (LSB) be 8 bits composing the byte of the track mode. In this case, the track mode is defined as follows:

d1 - - - 0: Write permitted
1: Write protected (Overwriting and editing are prohibited)

d2 - - - 0: A copyright exists.
1: No copyright exists.

d3 - - - 0: Original
1: first or later generation d4 - - - 0: Audio data
1: Undefined d5 and d6 - - - 01: Normal audio
Others: undefined d7 - - - 0: Monophonic
1: Stereo d8 - - - 0: Emphasis off
1: Emphasis on As described above, for the rewritable magneto-optical disc 90, disc areas are managed by using the P-TOC. On the other hand, other areas such as recordable user areas for storing pieces of music and free areas are managed by using the U-TOC.

It is thus obvious that, by providing the U-TOC with such a configuration, for tracks recorded on the mini disc 100, division of a track into a plurality of parts, linking of a part to another part and track editing including deletion can be carried out by merely updating the U-TOC.

In the secondary-recording-medium recording/reproduction apparatus 20A, when the mini disc 100 is mounted on the recording/reproduction unit 25, first of all, the MD control unit 21 reads out TOC information from the mini disc 100 and stores the information in a specific area in the buffer memory 30. Thereafter, the TOC information in the buffer memory 30 is referred to in recording, reproduction and editing operations carried out on the mini disc 100.

It is to be noted that, in operations to record content data (or a track) onto the mini disc 100 and edit a track already recorded on the mini disc 100, the U-TOC sectors are updated by updating the U-TOC information already stored in the buffer memory 30.

Then, at a predetermined point of time, the updated U-TOC information stored in the buffer memory 30 is written back onto the mini disc 100 to update the U-TOC on the mini disc 100.

7: Authentication Process

As a condition for a check-out to transfer content data to the secondary-recording-medium recording/reproduction apparatus 20A and record the data into the mini disc 100 thereon in an unencrypted state as described earlier in the explanation of the SDMI data paths, the result of an authentication process carried out by the personal computer 1 for the secondary-recording-medium recording/reproduction apparatus 20A shall be OK. The authentication process is processing to verify that the secondary-recording-medium recording/reproduction apparatus 20A is a valid apparatus permitted to carry out an operation to record the content data in an unencrypted state.

The authentication process is carried out for a recording/reproduction apparatus connected to the connection unit 11 of the personal computer 1 besides the secondary-recording-medium recording/reproduction apparatus 20B conforming to the SDMI standard. It is to be noted that the connected secondary-recording-medium recording/reproduction apparatus 20B supposed to conform to the SDMI standard is also subjected to a process to confirm that the connected secondary-recording-medium recording/reproduction apparatus 20B is a secondary-recording-medium recording/reproduction apparatus 20B truly conforming to the SDMI standard. If the connected secondary-recording-medium recording/reproduction apparatus 20B supposed to conform to the SDMI standard is not confirmed as a secondary-recording-medium recording/reproduction apparatus 20B truly conforming to the SDMI standard, the authentication process described below is carried out to verify that the connected secondary-recording-medium recording/reproduction apparatus 20B is a valid secondary-recording-medium recording/reproduction apparatus 20A.

The authentication process provided by the embodiment is carried out by adoption of an authentication technique based on unsymmetrical encryption or public-key encryption. In the unsymmetrical encryption process, an encryption key is different from a decryption key. Let reference notation Db denote data before the encryption process, reference notation Ke denote the encryption key, reference notation Kd denote the decryption key and reference notation C denote encrypted data obtained as a result of the encryption process. In this case, the encryption process is expressed by reference notation C=E (Ke, Db) and a decryption process of decrypting the encrypted data C to obtain the pre-encryption data Db is denoted by reference notation Db=D (Kd, C).

Here, the encryption key Ke and the decryption key Kd are referred to as a pair of keys. One of the keys is disclosed as a public key whereas the other key is kept in a predetermined member as a private key.

In the authentication process described below, the public key, which is one of the encryption key Ke and the decryption key Kd, is denoted by reference notation P whereas the other decryption key used as the private key is denoted by reference notation S. For the case described above, in the secondary-recording-medium recording/reproduction apparatus 20A, the decryption processing unit 28 or the system control unit 32 is holding the encryption key Ke and the decryption key Kd as a public key P and a private key S.

The authentication process is typically started by a command transmitted by the CPU 2 of the personal computer 1 serving as the primary-recording-medium apparatus to the system control unit 32 of the recording/reproduction apparatus serving as the secondary-recording-medium recording/reproduction apparatus 20A to make a request for an authentication process. Then, in accordance with the command, processing like one shown in FIG. 12 is carried out between the CPU 2 of the personal computer 1 serving as the primary-recording-medium apparatus and the system control unit 32 of the recording/reproduction apparatus serving as the secondary-recording-medium recording/reproduction apparatus 20A.

The authentication process is started with a processing S1 in which the system control unit 32 of the secondary-recording-medium recording/reproduction apparatus 20A transmits the public key P held by the decryption processing unit 28 to the personal computer 1 by way of the communication unit 26. It is to be noted that the public key P is a key known by the primary-recording-medium apparatus 1. Thus, if the secondary-recording-medium recording/reproduction apparatus 20A and the primary-recording-medium apparatus 1 recognize the same key as the public key P, the processing 1 does not have to be carried out.

When the CPU 2 of the primary-recording-medium apparatus 1 receives the public key P, the authentication process is continued to processing S2 to generate a random number r. Then, in the next processing S3, the random number r is transmitted to the secondary-recording-medium recording/reproduction apparatus 20A.

Then, in processing S4, the system control unit 32 of the secondary-recording-medium recording/reproduction apparatus 20A encrypts the random number r by using the private key S held by the decryption processing unit 28 to generate encrypted data E (S, r). Subsequently, in processing S5, the encrypted data E (S, r) is transmitted to the primary-recording-medium apparatus 1.

Then, in processing S6, by using the public key P, the CPU 2 of the primary-recording-medium apparatus 1 decrypts the encrypted data E (S, r) received from the secondary-recording-medium recording/reproduction apparatus 20A. The processing S6 is thus a decryption process expressed by D {P, E (S, r)}.

Subsequently, in processing S7, the random number r generated in the processing S2 is compared with the decryption result D {P, E (S, r)} obtained in the processing S6.

In next processing S8, the result of the comparison is examined. If the public key P and the private key S are a correct pair of keys, the result of the comparison should show that the decryption result D {P, E (S, r)} is equal to the random number r.

Thus, a comparison result indicating that the decryption result D {P, E (S, r)} matches the random number r confirms that the secondary-recording-medium recording/reproduction apparatus 20A holds a correct private key S for the public key P. In this case, the authentication process goes on from the processing S8 to processing S9 in which the secondary-recording-medium recording/reproduction apparatus 20A is authenticated as a valid connection partner.

If the comparison result indicates that the decryption result D {P, E (S, r)} does not match the random number r, on the other hand, the authentication process goes on from the processing S8 to processing S10 in which the secondary-recording-medium apparatus is determined to be not a valid connection partner, generating an NG authentication result. A valid connection partner is an apparatus allowed to receive an SDMI content.

If the result of the authentication process described above indicates that the connected apparatus is a valid secondary-recording-medium recording/reproduction apparatus 20A, on the other hand, the primary-recording-medium apparatus 1 recognizes that one of conditions for allowing a transfer of an SDMI content to the connected apparatus is satisfied.

8: Content Encryption Technique

The secondary-recording-medium recording/reproduction apparatus 20A and the secondary-recording-medium recording/reproduction apparatus 20B in the data transfer system provided by the embodiment each correspond to a device at the bottom of the tree structure shown in FIG. 1. The following description explains a typical implementation of the encryption structure like the one shown in FIG. 1 in the data transfer system.

Figure 13:
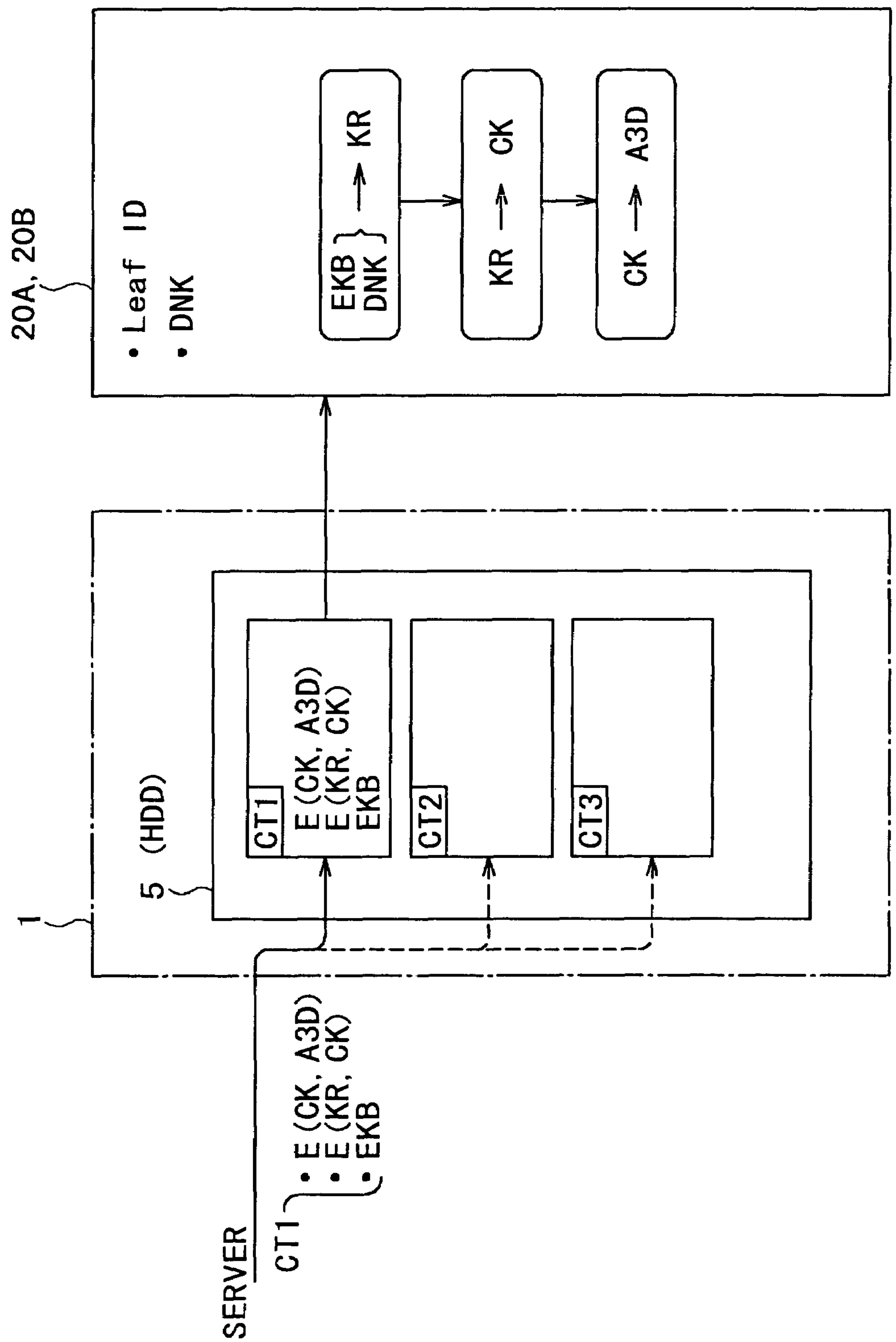
FIG. 13 is an explanatory diagram showing distributed content data to be transferred and a process to encrypt the data.

FIG. 13 is an explanatory diagram showing a flow of content data and keys.

When content data CT1 is distributed from the external content server 91 shown in FIG. 4 to the personal computer 1, in actuality, a transmission unit for the content data CT1 includes E (CK, A3D), E (KR, CK) and an EKB. The transmission unit is distributed to the personal computer 1 to be stored in the HDD 5.

E (CK, A3D) is a result of encryption of content data A3D by using a content key CK. The content data A3D is data compressed by the ATRAC3 technique. Thus, E (CK, A3D) is the piece of music to be actually distributed.

E (KR, CK) is a result of encryption of the content key CK by using the root key KR. The content key CK is a key for decrypting the encrypted content data E and the root key is a key explained earlier by referring to FIG. 1.

The EKB is an enabling key block explained earlier by referring to FIGS. 1 to 3. As is obvious from the description of this embodiment, the EKB is information used for updating the root key KR.

According to a distribution of one content data, pieces of content data CT1, CT2 and so on are each distributed, and each stored in the HDD 5 as a set.

Content data is transferred from the personal computer 1 to the secondary-recording-medium recording/reproduction apparatus 20A or the secondary-recording-medium recording/reproduction apparatus 20B also as a set comprising E (CK, A3D), E (KR, CK) and an EKB in accordance with a predetermined procedure.

As described above, the secondary-recording-medium recording/reproduction apparatus 20A and 20B each correspond to a device (or a terminal) explained earlier by referring to FIG. 1 are each assigned a unique leaf ID and are stored with DNKs (Device Node Keys).

When the secondary-recording-medium recording/reproduction apparatus 20A or 20B receives a content-data set from the personal computer 1, the content data is decrypted before being stored in the secondary recording medium, or the content data is stored in the secondary recording medium as it is. In the case of the secondary-recording-medium recording/reproduction apparatus 20B conforming to the SDMI standard, the encrypted content data is decrypted when the content data is reproduced. In the case of the secondary-recording-medium recording/reproduction apparatus 20A not conforming to the SDMI standard, on the other hand, the encrypted content data is decrypted when the content data is recorded onto the secondary recording medium.

As shown in FIG. 13, in processing to decrypt the encrypted content data, first of all, a decryption process is carried out by using the stored DNKs and the received EKB to generate a root key KR. Then, the root key KR obtained as a result of the decryption process is used to decrypt E (KR, CK) to generate the content key CK. Then, the content key CK obtained as a result of the process to decrypt E (KR, CK) is used to decrypt E (CK, A3D) to generate the content data A3D.

Figures 14A, 14B:
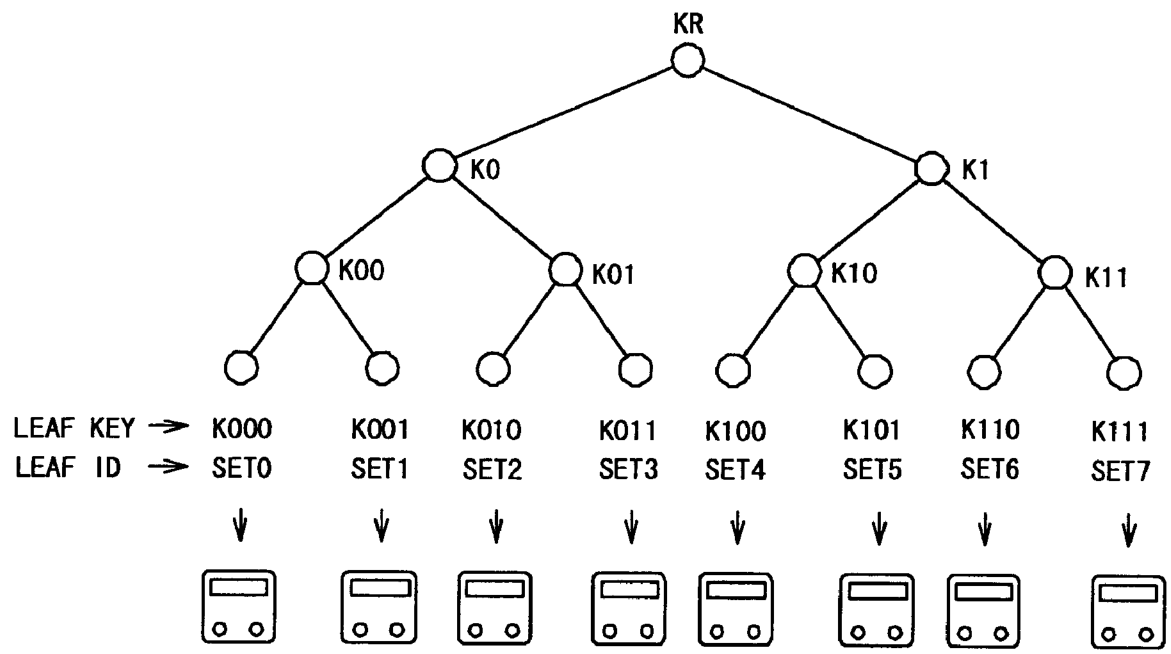
FIGS. 14A and 14B are explanatory diagrams showing a typical encryption technique adopted by the embodiment and DNKs (device node keys) used in the technique.
Figure 15:
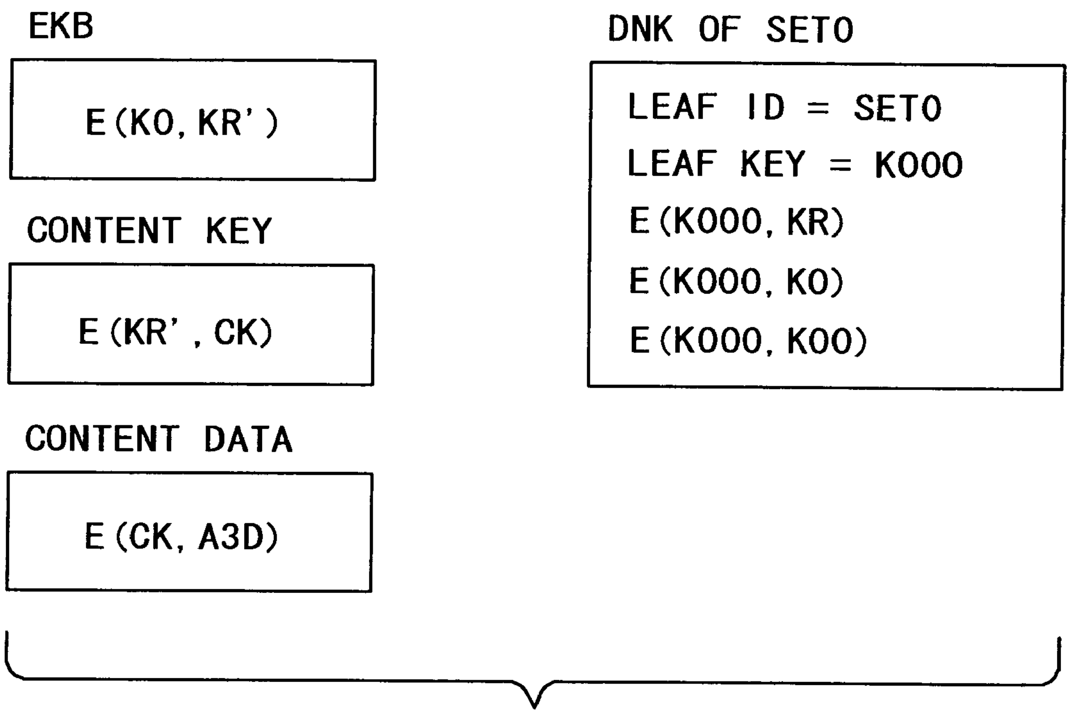
FIG. 15 is an explanatory diagram showing a procedure adopted by the embodiment to decrypt content data.

For the secondary-recording-medium recording/reproduction apparatus 20A, the DNKs and a procedure for decrypting the encrypted content data are explained concretely by referring to FIGS. 14A and 14B as well as FIG. 15.

Assume a key tree structure shown in FIG. 14A. A leaf ID of SET0 and a leaf key of K000 are assigned to the secondary-recording-medium recording/reproduction apparatus 20A. In this case, the DNKs stored in the secondary-recording-medium recording/reproduction apparatus 20A have pieces of information shown in FIG. 14B.

In the first place, the DNKs include the leaf ID SET0. The DNKs also include the leaf key K000.

In the second place, the other pieces of information included in the DNKs are information on node keys on a path between the leaf key K000 and the root key KR in the key structure shown in FIG. 14A. That is to say, the other pieces of information are information on node keys K00 and K0 as well as the root key KR itself. To put it in detail, the other pieces of information are the node keys K00 and K0 as well as the root key KR, which have been encrypted by using the leaf key K000. As shown in FIG. 14B, the encrypted node keys K00 and K0 as well as the encrypted root key KR are listed as follows:

E (K000, K00)

E (K000, K0) and

E (K000, KR)

By using the information included in the stored DNKs, the secondary-recording-medium recording/reproduction apparatus 20A decrypts the encrypted content key E (KR, CK) and the encrypted content data E (CK, A3D), which are received from the personal computer 1.

To put it in detail, the secondary-recording-medium recording/reproduction apparatus 20A first decrypts E (K000, KR) by using the leaf key K000 to produce D {K000, E (K000, KR)}, which is the root key KR.

Then, the root key KR is used to decrypt the encrypted content key E (KR, CK) to produce D {KR, E (KR, CK)}, which is the content key CK.

Finally, the decrypted content key CK is used to decrypt the encrypted content data E (CK, A3D) to produce D {CK, E (CK, A3D)}, which is the content data A3D.

As described earlier, however, the root key KR and the node keys are not fixed all the time. For a variety of reasons, they are changed. In the case of a data transfer system in which the content key CK is transmitted in a state of being encrypted by using the root key KR as described above, the root key may be changed for each content data.

For example, a music distribution enterprise changes the root key KR from content to content in order to strengthen protection of copyrights in some cases. Since the root key KR is variable, an EKB is also transmitted at the same time as described earlier so that an authorized device is capable of obtaining the changed root key KR.

Assume that, for encrypted content data E (CK, A3D), a content key E (KR', CK) encrypted by a changed root key KR' and an EKB are received as shown in FIG. 15. The EKB includes E (K0, KR'), which is the updated root key KR' encrypted by a node key K0.

It is to be noted that the updated root key KR' encrypted by a node key K0 can be decrypted only by devices owning the node key K0. In the tree structure shown in FIG. 14A, only devices with leaf IDs SET0 to SET3 are capable of obtaining the updated root key KR'. If only the devices having leaf IDs SET0 and SET1 need to know the updated root key KR', the EKB needs to include E (K00, KR'), which is the updated root key KR' encrypted by using a nod key K00.

As explained earlier by referring to FIG. 14B, the DNKs stored in the secondary-recording-medium recording/reproduction apparatus 20A include E (K000, K00) and E (K000, K0), which are respectively the node keys K00 and K0 encrypted by using the leaf key K000. The DNKs also include E (K000, KR), which is the root key KR encrypted by using the leaf key K000.

In this state, a procedure to obtain the original content data A3D is shown in FIG. 15. The procedure is consisted of steps (1) to (4) as follows:

Step (1): Since the received EKB is the encrypted updated root key E (K0, KR'), the node key K0 is first obtained from the DNKs. That is to say, the encrypted node key E (K000, K0) is decrypted by using the leaf key K000 to produce D {K000, E (K000, K0)}, which is the node key KO.

Step (2): Next, the node key K0 is used for decrypting the encrypted updated root key E (K0, KR') included in the EKB to produce D {K0, E (K0, KR')}, which is the updated root key KR'.

Step (3): The updated root key KR' obtained as a result of the decryption process of the step (2) is used for decrypting the encrypted content key E (KR', CK) to produce D {KR', E (KR', CK)}, which is the content key CK.

Step (4): The content key CK obtained as a result of the decryption process of the step (3) is used for decrypting the encrypted content data E (CK, A3D) to produce D {CK, E (CK, A3D)}, which is the content data A3D.

In accordance with the procedure described above, the secondary-recording medium recording/reproduction apparatus 20A is capable of decrypting the encrypted content data and storing the content data onto the mini disc 100.

In the case of the recording/reproduction apparatus 20B, on the other hand, in an operation to reproduce content data recorded on the secondary recording medium in an encrypted state, the procedure described above is executed to decrypt the encrypted content data to generate reproduced music or the like.

9: Variety of Commands

In a communication session for carrying out a check-out, a check-in or a variety of other operations, various control commands are issued by the personal computer 1 serving as a primary-recording-medium apparatus to the recording/reproduction apparatus 20A or 20B serving as a secondary-recording-medium apparatus, and response commands are transmitted from the secondary-recording-medium recording/reproduction apparatus 20A or 20B to the personal computer 1 in response to the control commands.

The following description explains only commands directly relevant to characteristic operations of the present embodiment to be described later.

FIG. 16 is an explanatory diagram showing the format of a check-out control command and FIG. 17 is an explanatory diagram showing the format of a check-out response command. The check-out control command has a size of 25 bytes and the check-out response command has a size of 17 bytes.

The check-out control command is a command issued by the personal computer 1 to the secondary-recording-medium recording/reproduction apparatus 20A or 20B in order to put content data transferred to a secondary recording medium in a communication session for a check-out in a state of being actually reproducible from the secondary recording medium, that is, in order to grant a reproduction right to the secondary recording medium.

In response to the check-out control command, on the other hand, the secondary-recording-medium recording/reproduction apparatus 20A or 20B transmits a check-out response command to the personal computer 1 after carrying out a predetermined process according to the check-out control command.

As shown in FIG. 16, the check-out control command includes information bits such as 'Check-out' as an operation code, a communication result, a list ID (an identification code of the communication object apparatus), an object position number (the track number for a check-out content on the secondary recording medium) and an encrypted session key DES CBC (Ks, 0).

As shown in FIG. 17, on the other hand, the check-out response command includes information bits such as 'Check-out' as an operation code, a communication result, a list ID (an identification code of the communication object apparatus) and an object position number (a track number for the check-out content on the secondary recording medium).

FIG. 18 is an explanatory diagram showing the format of a record-object control command having a size of 30 bytes and FIG. 19 is an explanatory diagram showing the format of a record-object response command having a size of 62 bytes.

The record-object control command is a command issued by the personal computer 1 to the secondary-recording-medium recording/reproduction apparatus 20A or 20B for, among others, the purpose of notifying the secondary-recording-medium recording/reproduction apparatus 20A or 20B of information on content data in a transfer of the actual data during typically a check-out communication session.

In response to the control command, on the other hand, the secondary-recording-medium recording/reproduction apparatus 20A or 20B transmits a check-out response command to the personal computer 1 after carrying out a predetermined process related to the information on the content data and other information.

As will be described later, the secondary-recording-medium recording/reproduction apparatus 20A generates a content ID from a portion of content data received from the personal computer 1. The record-object response command can also be used to report a generated content ID to the personal computer 1.

As shown in FIG. 18, the format of the record-object control command includes 'Record object' as an operation code. In addition, the format also includes information bits such as a communication result, a destination list ID (an identification code of the communication object apparatus), a new object position number (a track number for a check-out content on the secondary recording medium), a content-data type, a download format track attribute (the format of the content data in the primary recording medium), a track mode (the attributes of the content in the secondary recording medium), a content-data size (a content-data length) and a bulk data size (a bulk data length of the content data).

The download format track attribute (the format of the content data in the primary recording medium) is a compression technique of content data to be transmitted from the HDD 5 and information of its bit rate as well as content data's compression technique, which is adopted when the content data is output to a transmission line, and its bit rate.

The track mode (the attributes of a content in the secondary recording medium) is a specification information of a compression technique, which is to be adopted when the content is recorded onto the mini disk 100 and other attributes such as an attribute specifying monophonic or stereo. The specified compression technique is typically either ATRAC, ATRAC3 at 132 kbps or ATRAC3 at 66 kbps.

Much like the record-object control command, as shown in FIG. 19, the format of the record-object response command includes 'Record object' as an operation code. In addition, the format also includes information bits such as a communication result, a destination list ID (an identification code of the communication object apparatus), a new object position number (a track number for a check-out content on the secondary recording medium), a content type (a type of content-data), a download format track attribute (the format of the content data in primary recording medium), a track mode (the attributes of the content in the secondary recording medium), a content size (a content-data length) and a bulk data size (a bulk data length of the content data).

In the case of the response command, the format also includes a session-data field with a size of 32 bytes. This field is used as an area for reporting the content ID generated by the secondary-recording-medium recording/reproduction apparatus 20A to the personal computer 1.

Details of a content ID will be described later.

FIG. 20 is an explanatory diagram showing the format of a check-in control command and FIG. 22 is an explanatory diagram showing the format of a check-in response command. The check-in control command has a size of 17 bytes and the check-in response command has a size of 25 bytes.

The check-in control command is a command issued by the personal computer 1 to the secondary-recording-medium recording/reproduction apparatus 20A or 20B for checking in content data from a secondary recording medium, that is, for revoking a right to reproduce the content data from the secondary recording medium, during a communication session. However, the check-in control command may be issued by the personal computer 1 for obtaining information peculiar to a secondary recording medium in some cases rather than the purpose of checking in content data.

In response to the check-in control command, on the other hand, the secondary-recording-medium recording/reproduction apparatus 20A or 20B transmits a check-in response command to the personal computer 1 after carrying out a predetermined process according to the check-in control command.

The check-in control command shown in FIG. 20 has information bits including 'Check-in' as an operation code, a communication result, a sub-function, a list ID (an identification code of the communication object apparatus) and an object position number (a track number for a check-in content on the secondary recording medium).

Sub-functions of the check-in command are defined as shown in FIG. 21. The definitions describe processing requested by the check-in command.

A sub-function value of 00h indicates that the check-in control command makes a request for a content ID. The check-in control command is thus a command making a request for an actual check-in to return a reproduction right granted to the secondary recording medium.

A sub-function value of 01h is reserved. However, this value can be used in a command during an actual check-in process.

A check-in control command having another sub-function value makes a request for peculiar information such as prepaid-item information recorded on the secondary recording medium. Thus, a check-in control command having another sub-function value merely requests that prepaid-item information be read out and does not make a request for a check-in or the return of the reproduction right.

It is to be noted that a sub-function value can be defined for a request for information peculiar to a secondary recording medium besides the prepaid-item information. Examples of the peculiar information are information on the user and information on the state of utilization.

On the other hand, the check-in response command shown in FIG. 22 has information bits including 'Check-in' as an operation code, a communication result, a sub-function, a list ID (an identification code of the communication object apparatus) and an object position number (a track number for the check-in content on the secondary recording medium).

In addition, the check-in response command also includes an 8-byte hash MAC field for reporting a content ID generated by carrying out HASH function processing to the personal computer 1.

It is to be noted that the content ID is reported to the personal computer 1 by being included in the last 8 bytes of the check-in response command if the value of the sub-function in the check-in control command is set at 00h, that is, if an actual check-in is carried out.

If the sub-function in the check-in control command is set at a value making a request for prepaid-item information, on the other hand, the requested prepaid-item information is transmitted to the personal computer 1 by being included in the last 8 bytes of the check-in response command.

FIG. 24 is an explanatory diagram showing the format of an inclusive log-in control command and FIG. 25 is an explanatory diagram showing the format of an inclusive log-out control command.

These commands are commands for personal computer 1 to execute exclusive control to the secondary-recording-medium recording/reproduction apparatus 20A.

The exclusive log-in control command includes a sub-unit type and a sub-unit ID, which indicate a control-object apparatus, as well as a priority value for indicating the control level.

It is to be noted that the exclusive log-out control command is a command given to the secondary-recording-medium recording/reproduction apparatus 20A to terminate the state of the exclusive control. In this case, the priority value is set at 00h and the exclusive log-out control command is a command indicating a control level of a free state.

The exclusive log-in control command prevents or restricts the secondary-recording-medium recording/reproduction apparatus 20A from carrying out operations such as processing to delete data from the mini disc 100 used as a secondary recording medium, edit data on the mini disc 100, dismount the mini disc 100 from the secondary-recording-medium recording/reproduction apparatus 20A and control the power supply.

That is to say, the exclusive log-in control command puts the secondary-recording-medium recording/reproduction apparatus 20A in a state wherein the operations described above are carried out by the apparatus 20A only at a request made by the personal computer 1. The priority value included in the exclusive log-in control command indicates various states of prohibition and restriction of the operations. For example, the operations of the secondary-recording-medium recording/reproduction apparatus 20A are controlled at the following levels:

Control level 4: The operations are prohibited completely unless there is a command from the personal computer 1 to make a request for any of the operations.

Control level 3: Operations to control the power supply, eject the secondary recording medium, divide a track, link tracks and delete a track are prohibited completely unless there is a command from the personal computer 1 to make a request for any of the operations.

Control level 2: Operations to divide a track, link tracks and delete a track are prohibited completely unless there is a command from the personal computer 1 to make a request for any of the operations.

Control level 1: Operations to edit or delete a track other than a check-out content are permitted.

Control level 0: No restrictions are imposed on the operations.

It is needless to say that the above control levels are typical. In actuality, a larger number of various control levels is conceivable.

10: Content Check-Outs/Check-Ins

The following description explains processing carried out by the personal computer 1 and the secondary-recording-medium recording/reproduction apparatus 20A to transfer content data from the HDD 5 of the personal computer 1 to the secondary-recording-medium recording/reproduction apparatus 20A in a check-out and to return the content data checked out to the secondary-recording-medium recording/reproduction apparatus 20A back to the HDD 5 in a check-in.

In actuality, a plurality of check-outs and check-ins of content data is carried out in a communication session. It is to be noted, however, that only flows in one check-out of content data and one check-in of the content data are described for the sake of explanation simplicity.

Figure 26:
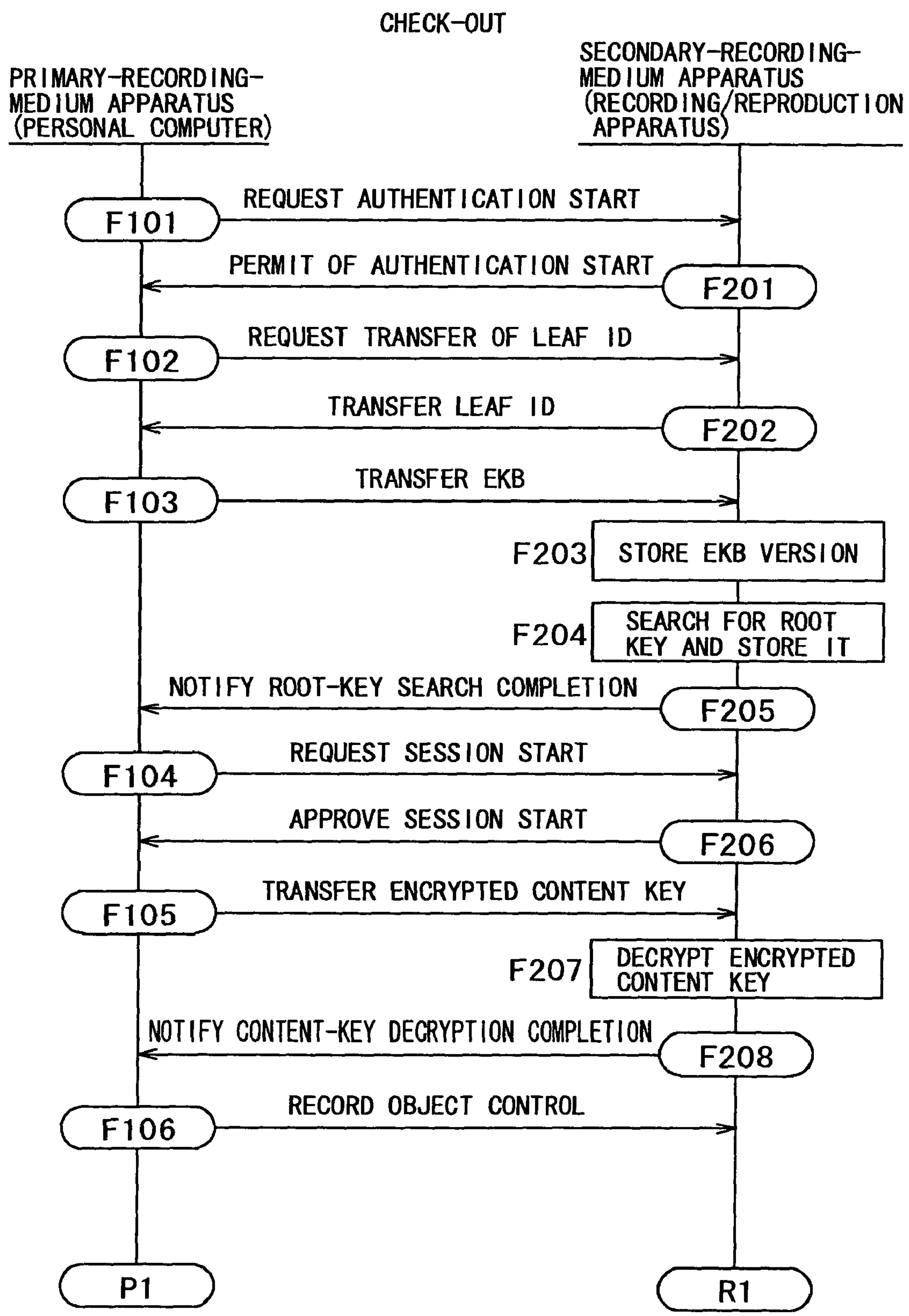
FIG. 26 shows a flowchart representing check-out operations carried out by the embodiment.
Figure 27:
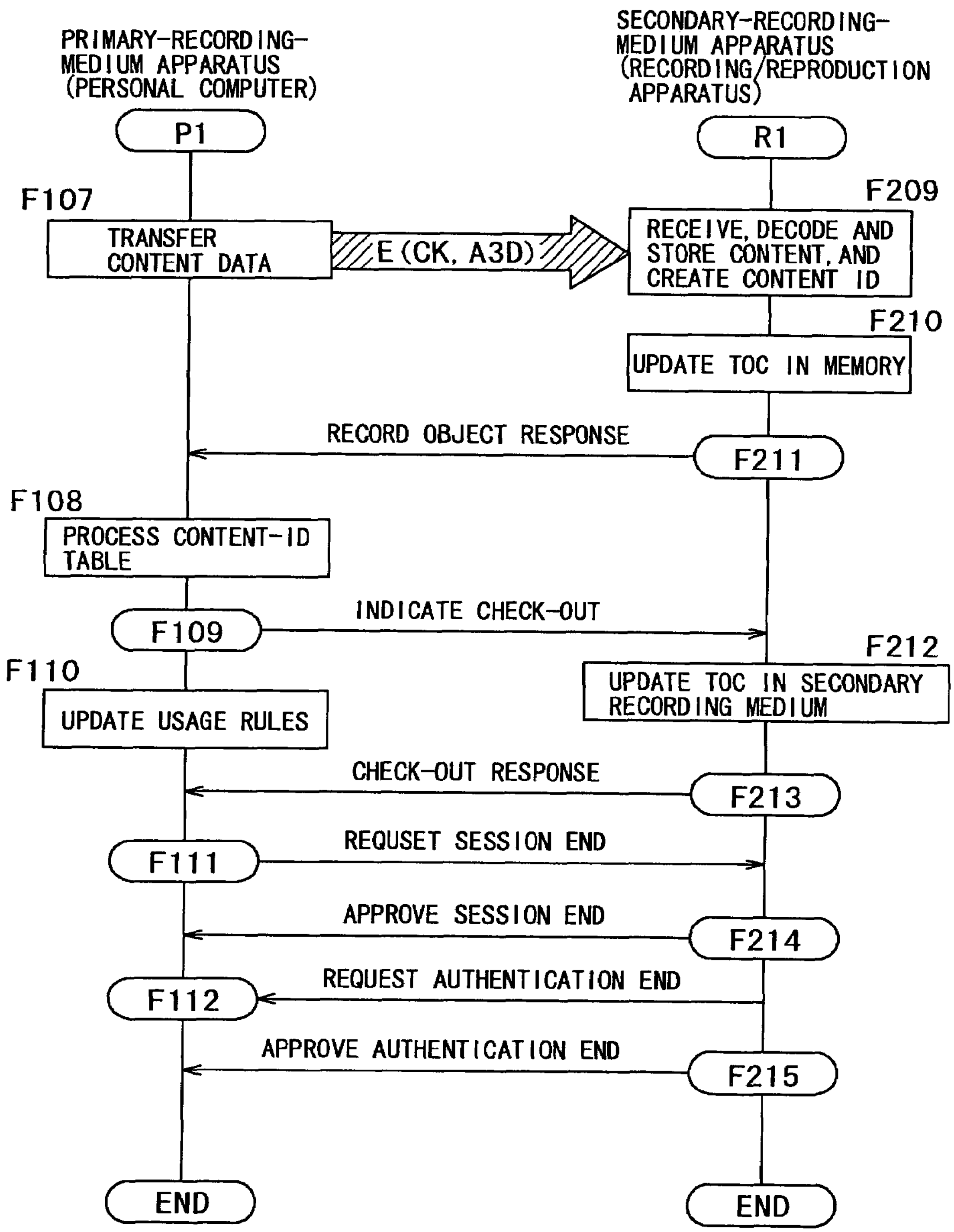
FIG. 27 shows a continuation flowchart representing check-out operations carried out by the embodiment.

FIGS. 26 and 27 are a diagram showing processing of a check-out. In the processing shown in FIGS. 26 and 27, controlling process executed by the CPU 2 employed in the personal computer 1 comprises steps F101 to F112. On the other hand, controlling process executed by components such as the system control unit 32 and the decryption processing unit 28, which are employed in the secondary-recording-medium recording/reproduction apparatus 20A, comprises steps F201 to F215.

It is to be noted that a communication session is implemented by executing a variety of control commands and issuing responses to the control commands.

The check-out of content data stored in the HDD 5 begins with a step F101 shown in FIG. 26. At the step F101, the CPU 2 issues a request for the start of an authentication process to the secondary-recording-medium recording/reproduction apparatus 20A. That is to say, an authentication-start control command is transmitted to the secondary-recording-medium recording/reproduction apparatus 20A.

In response to the authentication-start control command, the secondary-recording-medium recording/reproduction apparatus 20A informs the personal computer 1 of an approval of the start of the authentication process at a step F201. That is to say, an authentication-start response command is transmitted to the personal computer 1.

Then, at a step F102, the personal computer 1 makes a request for a leaf ID. At this request, the secondary-recording-medium recording/reproduction apparatus 20A transmits a leaf ID stored at a step F202.

It is to be noted that the personal computer 1 examines the leaf ID of the secondary-recording-medium recording/reproduction apparatus 20A connected to the personal computer 1 in this way in order to determine whether or not the apparatus 20A is an apparatus having a valid leaf ID.

Then, at a step F103, the personal computer 1 transmits an EKB for content data, which is to be transferred hereafter, to the secondary-recording-medium recording/reproduction apparatus 20A.

When the secondary-recording-medium recording/reproduction apparatus 20A receives the EKB, first of all, at a step F203, the apparatus 20A stores the version number of the EKB (refer to FIG. 3). Then, at the next step F204, the secondary-recording-medium recording/reproduction apparatus 20A uses the received EKB and the stored DNKs for executing the steps (1) and (2) of the procedure shown in FIG. 15 to obtain a root key KR for the content data, and stores the root key KR.

Subsequently, at the next step F205, the secondary-recording-medium recording/reproduction apparatus 20A informs the personal computer 1 that the root key KR has been obtained.

Informed that the processing to obtain the root key KR has been completed, at a step F104, the personal computer 1 issues a control command making a request for a start of the actual check-out session to the secondary-recording-medium recording/reproduction apparatus 20A. At this request, the apparatus 20A transmits a response command indicating an approval of the request for a start of the actual check-out session at a step F206.

It is to be noted that this response command is issued in response to the control command by carrying out the authentication processing explained earlier by referring to FIG. 12.

As described earlier, in the authentication processing shown in FIG. 12, the secondary-recording-medium recording/reproduction apparatus 20A not conforming to the SDMI standard is authenticated to determine whether or not the secondary-recording-medium recording/reproduction apparatus 20A is an apparatus allowed to decrypt the encrypted content data and store the content data onto the secondary recording medium in an unencrypted state. If the result of the authentication process is NG, the check-out session is of course aborted. The abortion of the check-out session is not shown in FIG. 26 though.

Next, at a step F105, the personal computer 1 transmits an encrypted content key E (KR, CK), which is related to the content data to be transmitted thereafter, to the secondary-recording-medium recording/reproduction apparatus 20A.

Receiving the encrypted content key E (KR, CK), the secondary-recording-medium recording/reproduction apparatus 20A executes the step (3) of the procedure shown in FIG. 15 at a step F207. At the step (3), the stored root key KR is used for decrypting the encrypted content key E (KR, CK) to produce the content key CK. Then, at the next step F208, the personal computer 1 is informed that the decryption process to produce the content key CK has been completed.

At a step F106, the personal computer 1 transmits a record-object control command shown in FIG. 18 to the secondary-recording-medium recording/reproduction apparatus 20A to provide information on a content to be checked out hereafter to the secondary-recording-medium recording/reproduction apparatus 20A.

It is to be noted that the secondary-recording-medium recording/reproduction apparatus 20A transmits a response command to the personal computer 1. This response command is not the response command shown in FIG. 19, but a response command shown in none of the figures and explained in none of the descriptions. This response command has a size of 25 bytes.

From the notice transmitted at the step F208 to indicate completion of the decryption process to obtain the content key CK and from the response command transmitted in response to the record-object control command, the personal computer 1 recognizes that preparations for reception and decryption of content data have been completed at the secondary-recording-medium recording/reproduction apparatus 20A. Thus, the flow of the check-out goes on to P1 representing a step F107 shown in FIG. 27. At this step, the content data is transferred to the personal computer 1. To be more specific, content data E (CK, A3D) encrypted by the content key CK is transmitted.

On the other hand, the flow of the check-out in the secondary-recording-medium recording/reproduction apparatus 20A goes on to R1 representing a step F209 shown in FIG. 27. At this step, the encrypted content data E (CK, A3D) is received. Then, the step (4) of the procedure shown in FIG. 15 is executed to decrypt the encrypted content data E (CK, A3D) by using the content key CK and to store the content data A3D obtained as a result of the decryption process onto the mini disk 100. Furthermore, a content ID is generated from the unencrypted content data. A process to generate a content ID will be described in detail later.

When the processes to transfer a piece of content data such as a piece of music from the personal computer 1 to the secondary-recording-medium recording/reproduction apparatus 20A and to record the content data onto the mini disk 100 are completed, it is necessary to update the U-TOC on the mini disk 100 right away.

As described earlier, the U-TOC recorded on the inner circumference portion of the mini disk 100 is used for managing the start and end addresses of each track such as each piece of music and other information. In an operation to reproduce a track, the track's addresses on the mini disk 100 are obtained from the U-TOC.

In this embodiment, however, at the point of time the process to record the content data onto the mini disk 100 is completed, only the U-TOC stored in the buffer memory 30 is updated at a step F210. That is to say, the U-TOC on the mini disk 100 is not updated right away.

When the process to update the U-TOC in the buffer memory 30 is completed, a record-object response command explained earlier by referring to FIG. 19 is transmitted to the personal computer 1 at the next step F211.

At this point of time, the processing to write the piece of content data is completed and the content ID generated for the content data at the step F209 is reported to the personal computer 1 by being included in the record-object response command.

At a step F108, the personal computer 1 carries out processing on a content-ID table in accordance with the notice of the content ID. As will be described later, the processing is processing to associate a content ID generated by the personal computer 1 and appended to the content data stored in the HDD 5 with the content ID generated by the secondary-recording-medium recording/reproduction apparatus 20A at the step F209.

Next, at a step F109, the personal computer 1 transmits a check-out control command shown in FIG. 17 to the secondary-recording-medium recording/reproduction apparatus 20A.

At the next step F110, the personal computer 1 updates the usage rule for the content data because of the check-out of the content data. To be more specific, a content right is changed by decrementing the number of allowable check-outs for the content data by one.

At a step F212, the secondary-recording-medium recording/reproduction apparatus 20A carries out processing of an actual check-out requested by the check-out control command. To be more specific, the U-TOC on the mini disk 100 is updated to put the recorded content data in a reproducible state. In this way, a right to reproduce content data is given to the secondary recording medium.

It is to be noted that, at that time, in the track mode of content data in U-TOC sector 0, the bit d1 has been set at 1 to put the content data in a write-protected state.

When the processing to update the U-TOC for the check-out is completed, at a step F213, a check-out response command is transmitted to the personal computer 1 to inform the personal computer 1 that the processing to update the U-TOC for the check-out has been completed.

At this point of time, the check-out or the transfer of a content right is completed.

In response to the completion of check-out, at a step F111, the personal computer 1 transmits a control command requesting an end of the session to the secondary-recording-medium recording/reproduction apparatus 20A. At a step F214, the apparatus 20A transmits a response command approving the end of the session to the personal computer 1.

At a step F112, the personal computer 1 transmits a control command to end the authentication state to the secondary-recording-medium recording/reproduction apparatus 20A. In response to this control command, the apparatus 20A transmits a response command to approve the end of the authentication state to the personal computer 1 at a step F215.

At this point of time, a sequence of communications for implementing the check-out is ended.

It is to be noted that, if a plurality of contents having a common root key are checked out by carrying out the communications described above, it is necessary only to repeat the steps F105 to F108 and the steps F207 to F211 for each of the second and subsequent contents.

If successive contents with different EKB versions must be transferred continuously, an EKB also needs to be transferred along with each of the contents.

Next, the check-in processing is explained by referring to FIG. 28.

In the processing shown in FIG. 28, control executed by the CPU 2 employed in the personal computer 1 comprises steps F101 to F156. On the other hand, control executed by components such as the system control unit 32 and the decryption processing unit 28, which are employed in the secondary-recording-medium recording/reproduction apparatus 20A, comprises steps F201 to F257.

Also in this case, a communication session is implemented by using a variety of control commands and a variety of response commands generated in response to the control commands.

Also in the case of a check-in, processing including the start of an authentication process, a transfer of an EKB and a search for a root key is carried out in the same way as the check-out described above. To be more specific, pieces of processing varied out at steps F101 to F103 and F201 to F205 are the same as their counterparts shown in FIG. 26, making it unnecessary to repeat their explanation.

At a step F150, the personal computer 1 transmits a control command making a request for the start of a check-in session to the secondary-recording-medium recording/reproduction apparatus 20A. In response to this control command, the secondary-recording-medium recording/reproduction apparatus 20A transmits a response command at a step F250. It is to be noted that, also in this case, the authentication processing explained earlier by referring to FIG. 12 is carried out.

If the result of the authentication processing carried out on the secondary-recording-medium recording/reproduction apparatus 20A is OK, the requested check-in session is started. In this case, the personal computer 1 makes a request for the ID of content data to be checked in at a step F151. For example, the personal computer 1 transmits a track number (of the content data to be checked in) on the mini disc 100 to the secondary-recording-medium recording/reproduction apparatus 20A, making a request for the content ID.

At this request, first of all, at a step F251, the secondary-recording-medium recording/reproduction apparatus 20A forms a judgment as to whether or not the specified content data or the specified track is content data that can be checked in. The judgment can be formed by examining the write protect flag or the d1 bit of the track mode recorded in the U-TOC for the track. This will be described later.

Content data is determined to be content data that can be checked in if the content data has been recorded on the mini disc 100 as a result of a check-out and has not been edited on the mini disc 100.

If the content data can be checked in, at a step F252, the ID of the content data is prepared. To put it concretely, a content ID is computed at this point of time, or an already computed and recorded content ID is read out. A technique for generating a content ID will be described later. Then, at the next step F253, the content ID is transmitted to the personal computer 1.

It is to be noted that, if the content data to be checked in is not content data that can be checked in, on the other hand, the personal computer 1 is informed of the fact, and an error-handling process is carried out thereafter.

At a step F152, the personal computer 1 collates the content ID received from the secondary-recording-medium recording/reproduction apparatus 20A. To be more specific, the content ID received from the secondary-recording-medium recording/reproduction apparatus 20A is compared with a saved content ID, which was generated by the secondary-recording-medium recording/reproduction apparatus 20A and transmitted to the personal computer 1 in a check-out. The saved ID was then stored in the personal computer 1 as table data associated with a content ID generated by the personal computer 1. The content IDs are compared with each other in order to assure that the content data to be checked in is the correct content data.

If the result of the collation is OK, at a step F153, an actual check-in is requested. If the result of the collation is NG, on the other hand, error processing is carried out.

A check-in is requested at the step F153 by issuing a check-in control command shown in FIG. 20. In the check-in control command, the value of the sub-function is set at 00h to indicate an actual check-in as shown in FIG. 21. The list ID is set at a value specifying the secondary-recording-medium recording/reproduction apparatus 20A. The object position number is set at a value specifying the track number of the check-in content on the mini disc 100.

At the next step F154, a usage rule for the content data is updated in accordance with the check-in control command. To be more specific, the number of permitted transfers is incremented by one.

At a step F254, the secondary-recording-medium recording/reproduction apparatus 20A updates the U-TOC data. To put it in detail, the contents of U-TOC sector 0 are updated to delete the track used as a check-in object from the mini disc 100. That is to say, the track is put in an irreproducible state or a state of losing a reproduction right.

Then, at the next step F255, the check-in response command shown in FIG. 22 is transmitted.

At this point of time, the check-in or the operation to return the content right is completed.

Upon completion of the check-in, at a step F155, the personal computer 1 transmits a control command making a request for an end of the session to the secondary-recording-medium recording/reproduction apparatus 20A. In response to this control command, the apparatus 20A transmits a response command approving the end of the session to the personal computer 1 at a step F256.

At a step F156, the personal computer 1 transmits a control command making a request for an end of the authentication state to the secondary-recording-medium recording/reproduction apparatus 20A. In response to this control command, the apparatus 20A transmits a response command approving the end of the authentication state to the personal computer 1 at a step F257.

At this point of time, the sequence of communications for the check-in is ended.

It is to be noted that, if a plurality of contents must be checked in by carrying out the communications described above, the operation to verify the content ID and the operation to request the check-in, that is, the steps F151 to F154 and F251 to F255, need to be repeated for each of the contents.

11: Generation and Management Techniques of Content IDs

Usage rules followed in check-ins and check-outs are managed by using content IDs for each content.

As described before, in a secondary recording medium conforming to the SDMI standard, a format allowing content IDs to be recorded is adopted. Thus, in a check-out or a check-in, both the personal computer 1 and the secondary-recording-medium recording/reproduction apparatus 20B conforming to the SDMI format are capable of identifying content data used as an object of the check-out or the check-in by using a content ID provided for the content data.

However, the secondary-recording-medium recording/reproduction apparatus 20A for a secondary recording medium such as the mini disc 100, which has been becoming popular for the past years, is not capable of identifying content data by using a content ID provided for the content data. This is because, as a result of a check-out, content data is recorded on the mini disc 100 including no area for storing a content ID. Even if such an area is newly prescribed in the U-TOC or the like and a content ID is recorded on the mini disc 100, the content ID will be inadvertently erased in an operation carried out by a mini-disc recorder of the old type to update the U-TOC. Thus, content IDs cannot be managed in the mini disc 100.

If content IDs cannot be managed in the secondary recording medium, a check-out is possible even though a check-in is impossible because content data cannot be collated in the check-in process.

In order to solve this problem, the secondary-recording-medium recording/reproduction apparatus 20A is provided with a function for generating a content ID from the content data itself. In addition, in the personal computer 1 is provided with table data used for comparing a first content ID generated by the personal computer 1 with a second content ID generated by the secondary-recording-medium recording/reproduction apparatus 20A.

First of all, a technique adopted by the secondary-recording-medium recording/reproduction apparatus 20A to generate a content ID is explained.

For generation of a content ID of content data, there is provided a means for carrying out a CBC_MAC process by sampling particular data in a content-data stream in addition to track information and a content size representing the length of the content data.

FIG. 29 is an explanatory diagram showing a model representing the entire content data such as music. This content data is a data stream in a state of being compressed by adoption of the ATRAC or ATRAC3 technique. The content data has been transmitted by the personal computer 1 in a check-out in an encrypted state, and decrypted to produce the data stream.

Assume for example that points P1 and P2 are set as sampling points for the content data, and data of sound units each represented a hatched rectangle at the sampling points P1 and P2 is extracted. Data of a sound unit has a typical length of 424 bytes. The data of a sound unit thus corresponds to the sound unit explained earlier by referring to FIG. 8. However, the data of a sound unit does not have to correspond to the sound unit explained earlier.

A content ID is then generated by using the sampled part of the actual content data.

The start and the end of a content should be avoided as a location at which a sampling point is set since it is quite within the bounds of possibility that the start and the end of a content are each a silent location. In addition, by setting sampling points at 2 locations as is the case with the sampling points P1 and P2 described above, the probability of extracting unique data can be increased. From unique data, it is possible to generate a content ID having a sufficiently effective function as a content descriptor. It is needless to say that sampling points can be set at 3 or more locations. Moreover, a sampling point at one location other than the start and the end of a content is not insufficient.

Furthermore, if the sampling points P1 and P2 are set at locations determined in accordance with the data size, that is, the length of content data, instead of being set at locations selected at random, for particular content data, the same content ID is obtained without regard to the number of times the calculation of a content ID is repeated. That is to say, if the content data itself is recorded on the secondary recording medium, the content ID does not required to be stored on it, because the same content ID can be generated by corresponding the sampling points regardless of number of times. This phenomenon makes it unnecessary to record such a content ID on the mini disc 100 used as a secondary recording medium.

To put it concretely, the sampling points P1 and P2 are set at locations at distances of ⅓ and ⅔ of the data length or the data size from the end of the content. Of course, the locations are not limited to the locations at distances of ⅓ and ⅔ of the data length from the end of the content. For example, the locations can be set at distances of the data length's any fractions such as ½, ¼, ¾, ⅕, ⅖, ⅗, ⅘, ⅙, ⅚ and so on of the data length from the end of the content.

A technique to find a content ID from content data by using a hash function is expressed by using Eq. (1) as follows:

$$\text{Content ID}=\text{CBC\_MAC (Key hash, IV, Stream (P1)//Stream (P2)} \quad (1)$$

where Key hash is intrinsic key data having a size of 8 bytes, Stream (P1) is data of a sound group at the sampling point P1, Stream (P2) is data of a sound group at the sampling point P2, notation//denotes an operator of concatenation.

Thus, notation Stream (P1)//Stream (P2) represents a concatenation of the data of the sound unit at the sampling point P1 and the data of the sound group at the sampling point P2. The concatenated data has a length of 424×2 bytes.

Notation IV is an initial value of a CBC mode having a length of 8 bytes, and is expressed by Eq. (2) in terms of a content length (Length) with a size of 4 bytes and 1-byte track information (TrackModeByte) as follows:

$$\text{IV}=\{\text{Length//TrackModeByte//32 bits padded with zero}\} \quad (2)$$

In this case, the 4-byte content size and the 1-byte track mode included in the record-object control command shown in FIG. 18 can be used as the content length (Length) with a size of 4 bytes and 1 byte track information (Track Mode) in Eq. (2).

Such a content ID is generated by a HASH engine mounted typically on the decryption processing unit 28 of the secondary-recording-medium recording/reproduction apparatus 20A. The initial value IV computed by using Eq. (2) is substituted into Eq. (1) for the term IV. The secondary-recording-medium recording/reproduction apparatus 20A is capable of computing the initial value IV from information included in the record-object control command received at the step F106 of the check-out session shown in FIG. 26.

In addition, prior to a transfer of content data, the length of the content data can be identified from the content length or the content size included in the record-object control command. Thus, the distances of ⅓ and ⅔ of the content length for locations of the sampling points P1 and P2 can also be determined prior to a transfer of the content data.

Therefore, after pieces of data of the sound groups at the sampling points P1 and P2 are extracted following the start of the actual transfer of the content data, a content ID can be computed by using Eq. (1).

For content data recorded on the mini disc 100, the size of the content data can of course be found from the data of U-TOC sector 0. Thus, the locations of the sampling points P1 and P2 can be determined.

In addition, a track mode included in the record-object control command transmitted in a check-out is recorded as a track mode in U-TOC sector 0 so that the initial value IV can be found from data of U-TOC sector 0 by using Eq. (2).

Thus, for content data recorded on the mini disc 100, a content ID can be found at any point of time.

For example, the secondary-recording-medium recording/reproduction apparatus 20A is capable of generating a content ID of its own for content data used as an object of a check-out as described above.

Unless the content ID generated by the secondary-recording-medium recording/reproduction apparatus 20A is associated with a content ID generated by the personal computer 1 and stored in the HDD 5, however, the content ID generated by the apparatus 20A cannot be utilized properly.

The content ID stored in the HDD 5 as described above is generated for content data by an application running on the personal computer 1. The content ID found in advance by this application comprises information unique to the apparatus (the personal computer 1) having a primary recording medium such as the HDD 5, time information stored in the HDD 5 and a random number. An example of the information unique to the personal computer 1 is an ID unique to the application installed in the personal computer 1.

A second content ID generated by the secondary-recording-medium recording/reproduction apparatus 20A is associated by the personal computer 1 with a first content ID generated by the personal computer 1 as described above in table data shown in FIG. 30.

It is to be noted that the table data represents associations unique to the apparatus using a primary recording medium such as the HDD 5.

At the step F211 of a check-out session shown in FIG. 27, a record-object response command is used by the secondary-recording-medium recording/reproduction apparatus 20A to inform the personal computer 1 of the second content ID generated by the secondary-recording-medium recording/reproduction apparatus 20A. Then, the personal computer 1 carries out processing on the table data shown in FIG. 28 at the step F108. In this processing, an element of the table data shown in FIG. 30 is created for the content data transferred in the check-out. The element associates the first content ID generated by the personal computer 1 for the content data with the second content ID generated by the secondary-recording-medium recording/reproduction apparatus 20A for the same content data.

The typical table data shown in FIG. 30 consists of three elements, namely, first, second and third elements, each associating a first content ID with a second content ID.

In management of the table data stored in the HDD 5 by the personal computer 1, the table data is updated for each check-out and each check-in. By managing the table data in this way, content data checked out to the mini disc 100 can be managed by using its content ID. Thus, check-outs and check-ins can be managed.

As described above, the mini disc 100 does not include an area for storing content IDs. However, the secondary-recording-medium recording/reproduction apparatus 20A is capable of finding a content ID for content data stored in the mini disc 100.

Thus, when it is desired to check in content data back to the personal computer 1, the personal computer 1 requests that the secondary-recording-medium recording/reproduction apparatus 20A transmit the second content ID of the content data. The personal computer 1 then confirms that the second content ID received from the secondary-recording-medium recording/reproduction apparatus 20A matches the second content stored as an element of the table data shown in FIG. 30. The second content stored as an element of the table data was received from the secondary-recording-medium recording/reproduction apparatus 20A in the check-out of the content data. If the second content ID received from the secondary-recording-medium recording/reproduction apparatus 20A matches the second content stored as an element of the table data, the personal computer 1 carries out a check-in process for the content data identified by the first content ID associated with the second content ID.

The above description explains the meanings of the pieces of processing carried out at the steps F151, F152, F252 and F253 shown in FIG. 28.

By adoption of such a content-ID management technique, even for a secondary recording medium not conforming to the SDMI standard as is the case with the mini disc 100, it is possible to execute management of check-outs and check-ins, that is, management of content rights, in the data transfer system.

12: Content-ID Generation at Check-out and before Check-in

Normally, the secondary-recording-medium recording/reproduction apparatus 20A needs to generate a content ID in a check-out and prior to a check-in. In the former case, the content ID is transmitted to the personal computer 1 by using a record-object response command and recorded by the personal computer 1 in the table data shown in FIG. 30. In the latter case, the content ID is created at a request made by the personal computer 1.

The secondary-recording-medium recording/reproduction apparatus 20A generates a content ID for content data by using pieces of content data partially extracted from sampling points P1 and P2 in the content data.

Thus, in the case of the generation of a content ID for content data in a check-out, for example, there is normally a conceivable procedure wherein after the content data received from the personal computer 1 is stored in the mini disc 100, pieces of partial data are extracted from the sampling points P1 and P2 in the content data and, then, the secondary-recording-medium recording/reproduction apparatus 20A generates a content ID for the content data by using the extracted pieces of partial data.

Also when a request for a content ID for a check-in is received from the personal computer 1, there is normally conceived a procedure wherein after the content data received from the personal computer 1 is stored in the mini disc 100, the secondary-recording-medium recording/reproduction apparatus 20A extracts pieces of partial data from the sampling points P1 and P2 in the content data and, then, generates a content ID for the content data by using the extracted pieces of partial data at this request.

By adoption of this procedure, however, it is necessary to make an access to the mini disc 100 and read out partial data from the mini disc 100 also during a check-out session. Thus, it takes time to generate a content ID due to the access and the operations to read out the partial data. As a result, the total communication time for the check-out is lengthened.

In the case of a content ID generated for a check-in at a request made by the personal computer 1 as described above, it is also necessary to make an access to the mini disc 100 and read out partial data from the mini disc 100. Thus, it also takes time to generate a content ID due to the access and the operations to read out the partial data. As a result, the total communication time for the check-in is lengthened.

In order to solve the problems described above, a content ID is computed in accordance with a procedure described below so as to make processing efficient and shorten the communication time.

Figure 31:
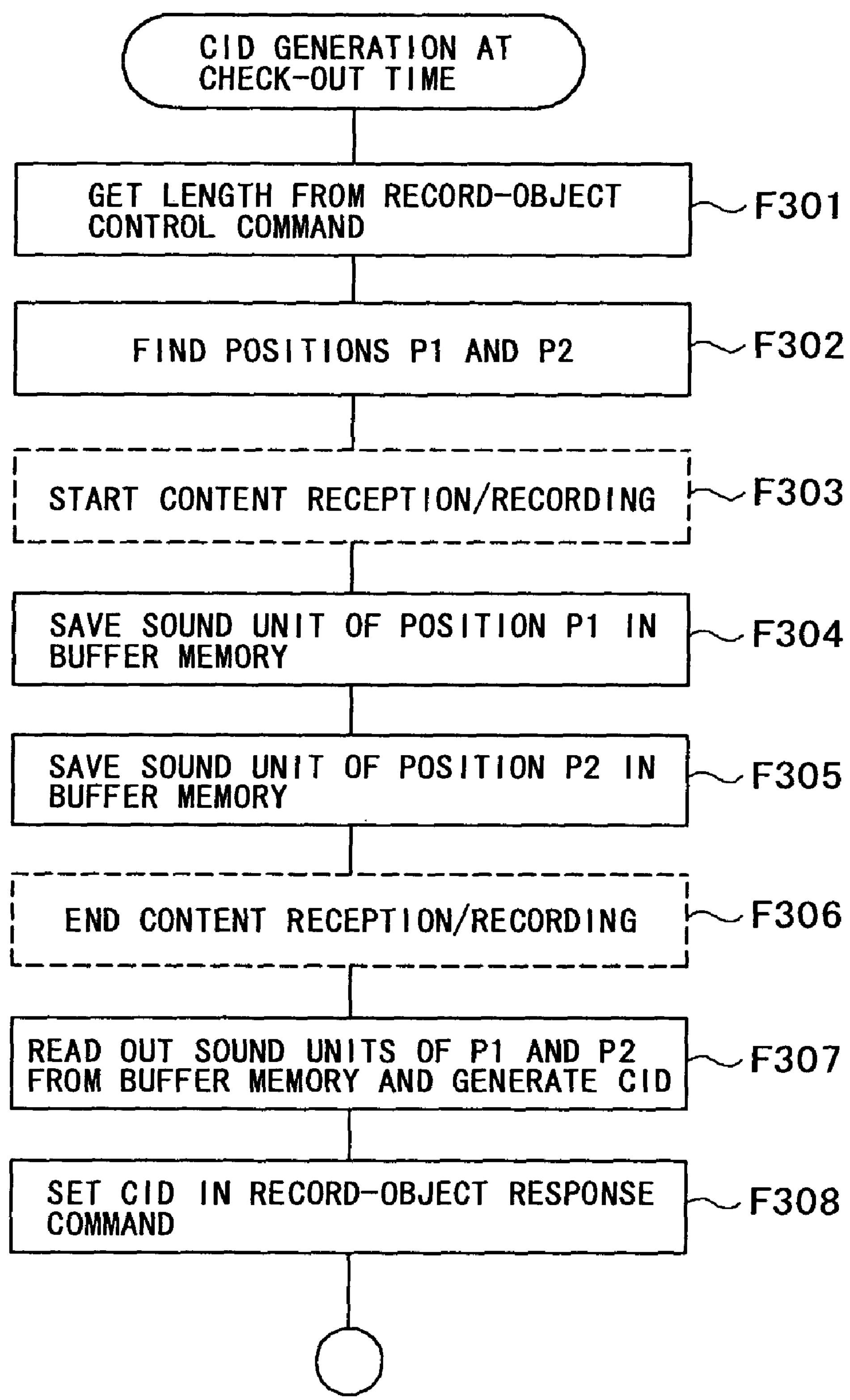
FIG. 31 shows a flowchart representing a process to generate a content ID for a check-out in the embodiment.

FIG. 31 shows a flowchart representing a process to generate a content ID(CID) in a check-out session. This process is the process carried out by the system control unit 32 and the decryption processing unit 28 at the step F209 of the flowchart shown in FIG. 27.

At the step F106 of the flowchart shown in FIG. 26, a record-object control command is received from the personal computer 1 prior to reception of content data. Receiving the record-object control command, the secondary-recording-medium recording/reproduction apparatus 20A carries out processing to generate a content ID by execution of the flowchart shown in FIG. 31 at the step F209 of the flowchart shown in FIG. 27. The flowchart shown in FIG. 31 begins with a step F301 at which a data size representing the length of the content data to be received from the personal computer 1 is fetched from the record-object control command.

Then, at the next step F302, locations of the sampling points P1 and P2 in the content data stream are calculated from the length of the content data.

Subsequently, at the next step F303, the secondary-recording-medium recording/reproduction apparatus 20A reveals the start of a process to receive the content data from the personal computer 1. To put it in detail, as explained earlier by referring to the block diagram of FIG. 7, in the process to receive the content data, the content data is received and decrypted into an unencrypted state before being stored in the buffer memory 30 in the ATRAC3 data state. The content data in the ATRAC3 data state is further modulated by the EFM/ACIRC encoder/decoder 24 before being recorded onto the mini disc 100 by the recording/reproduction unit 25.

In the process to receive, decrypt, buffer, encode and record the content data, data at the sampling point P1 needs to be monitored in order to carry out processing to find a content ID. Thus, at the next step F304, as data of a sound unit at the sampling point P1 is detected in, for example, the buffer memory 30, and the data of the sound unit at the sampling point P1 is transferred to an area also in the buffer memory 30. The area to which the data of the sound unit is transferred is different from the area for storing the content data itself.

By the same token, data at the sampling point P2 also needs to be monitored in order to carry out the processing to find a content ID. Then, at the next step F305, as data of a sound unit at the sampling point P2 is detected in, for example, the buffer memory 30, the data of the sound unit at the sampling point P2 is transferred to an area also in the buffer memory 30. The area to which the data of the sound unit is transferred is different from the area for storing the content data itself.

Subsequently, at the next step F306, the secondary-recording-medium recording/reproduction apparatus 20A reveals that the process to receive, decrypt, buffer, encode and record the content data has been completed.

After the operation to record the content data onto the mini disc 100 is completed, the flow of the procedure goes on to a step F307 at which a hash engine employed in the decryption processing unit 28 reads out the data of the sampling points P1 and P2 from the buffer memory 30 to be used in generation of a content ID by carrying out processing according to Eqs. (1) and (2).

Then, at the next step F308, the content ID is set in a record-object response command.

The record-object response command is transmitted to the personal computer 1 at a step F211 of the flowchart shown in FIG. 27.

As is obvious from the above description, in this typical process, the data of the sampling points P1 and P2 is extracted and stored in the buffer memory 30 in advance before the content data itself is recorded onto the mini disc 100. Thus, it is not necessary to put the mini disc 100 in a reproduction state, seek the mini disc 100 for the data of the sampling points P1 and P2 and read out the data. As a result, the processing to find the content ID can be made extremely efficient so that it is possible to shorten the check-out session time.

Figures 32A, 32B:
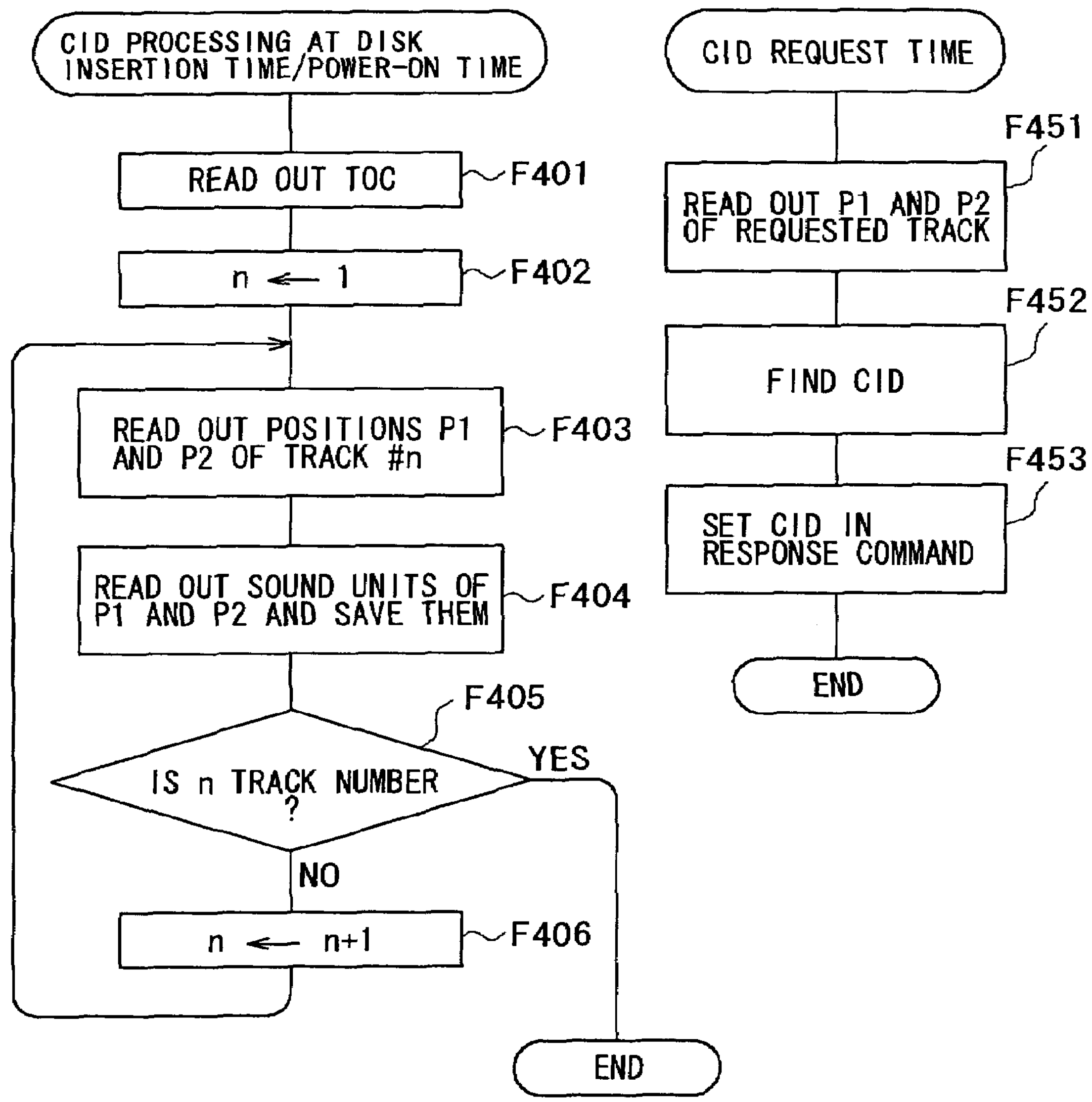
FIGS. 32A and 32B show flowcharts representing processes to generate a content ID prior to a check-in in the embodiment.

The following description explains processes allowing a content ID to be transmitted to the personal computer 1 at a request for a check-in of content data, which is indicated by the content ID, by referring to flowcharts shown in FIGS. 32A and 32B.

A content ID of content data can be found from the content data's length and track mode provided that the content data itself has been recorded. In other words, for content data recorded in the mini disc 100, data of the sampling points P1 and P2 can be fetched if the content data and information of U-TOC sector 0 can be read out from the mini disc 100. Thus, a content ID of the content data can be found.

Accordingly, the process represented by the flowchart shown in FIG. 32A is carried out to extract data of the sampling points P1 and P2, at a point of time data of the TOC is read out from the mini disc 100. That is to say, data of the TOC is read out from the mini disc 100 when the mini disc 100 is mounted on the secondary-recording-medium recording/reproduction apparatus 20A or when the power supply of the secondary-recording-medium recording/reproduction apparatus 20A is turned on with the mini disc 100 mounted on the secondary-recording-medium recording/reproduction apparatus 20A.

The process represented by the flowchart shown in FIG. 32A begins with a step F401 at which data of the TOC is read out from the mini disc 100. Then, at the next step F402, a variable n is set at 1. Subsequently, at the next step F403, locations of the sampling points P1 and P2 are found for track #n, where notation #n denotes a track number. Thus, locations of the sampling points P1 and P2 are found for the first track in this case. Since information of U-TOC sector 0 has been read out, locations of the sampling points P1 and P2 can be found for each track.

Then, at the next step F404, data of the sampling points P1 and P2 is actually read out from the mini disc 100 for track #n and stored in an area specially allocated in the buffer memory 30 Subsequently, the flow of the process goes on to a step F405 to form a judgment as to whether or not the variable n is a track number assigned to the last track. If the variable n is a track number assigned to the last track, the flow of the process goes on to a step F406 at which the variable n is incremented by one. Then, the flow of the process goes back to a step F403 at which the processing described above is repeated. In the processing, locations of the sampling points P1 and P2 are found for track #n, that is, the second track in this case. Then, data of the sampling points P1 and P2 is actually read out from the mini disc 100 for the second track and stored in an area specially allocated in the buffer memory 30.

That is to say, by carrying out the loop processing comprising the steps F403 to F406, data of the sampling points P1 and P2 can be read out from the mini disc 100 and stored in an area specially allocated in the buffer memory 30 for each of tracks recorded in the mini disc 100.

When the processing for all tracks is completed, the flow of the process exits from the loop through the step F405.

On the other hand, the flowchart shown in FIG. 32B represents details of the processing carried out by the secondary-recording-medium recording/reproduction apparatus 20A at the step F252 of the flowchart shown in FIG. 28 at a request made by the personal computer 1 for a content ID at the step F151 of the flowchart shown in FIG. 28.

The flowchart shown in FIG. 32B begins with a step F451 at which data of the sampling points P1 and P2 is read out from the buffer memory 30 for a track indicated by a track number specified in the request. Then, at the next step F452, the hash engine employed in the decryption processing unit 28 computes a content ID from the data of the sampling points P1 and P2. It is to be noted that a track mode and a length, which are also required in the content ID's computation based on Eqs. (1) and (2), can be found at that point of time from the U-TOC information already stored in the buffer memory 30.

Subsequently, at the next step F453, the content ID is set in a response command. The response command is transmitted to the personal computer 1 at a step F253 of the flowchart shown in FIG. 28.

By carrying out such a process, it is not necessary to read out data of the sampling points P1 and P2 from the mini disc 100 at a point of time a request for a content ID is received from the personal computer 1. Thus, it is possible to carry out processing faster at a request for a content ID. As a result, as a whole, the time required for a check-in session can be shortened.

Figure 33A:
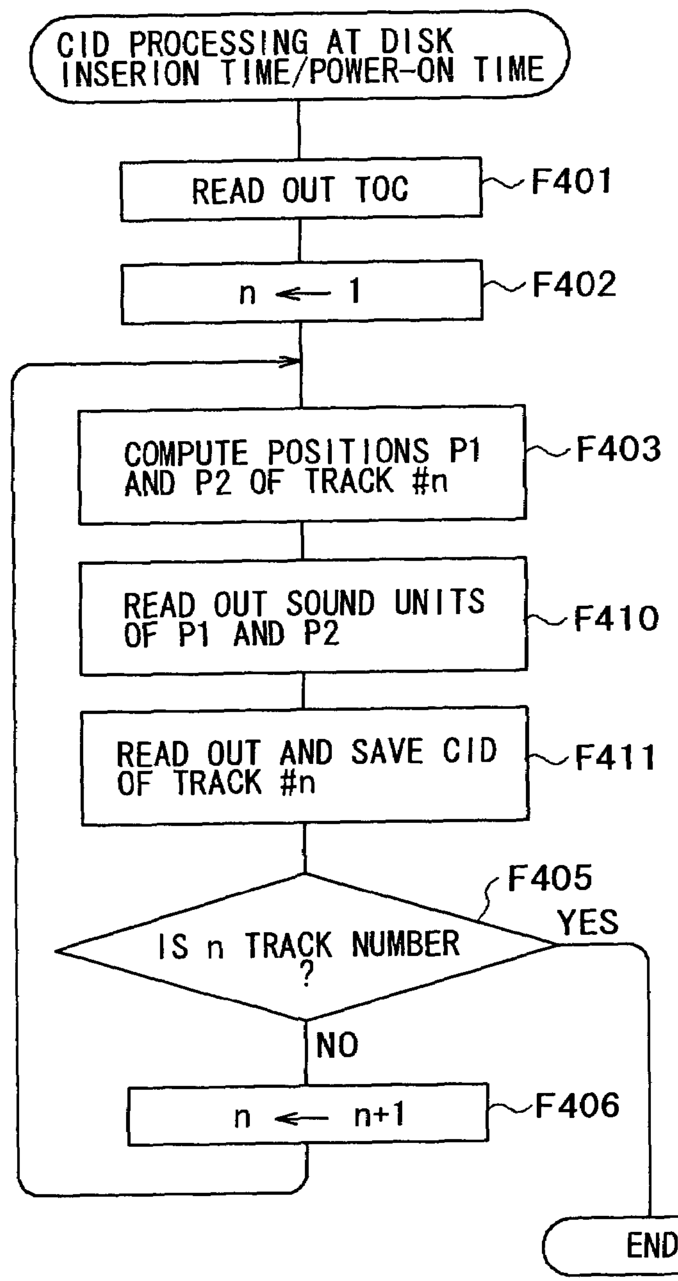
FIGS. 33A and 33B show flowcharts representing processes to generate a content ID at a disc insertion time/a power-on time in the embodiment.
Figure 33B:
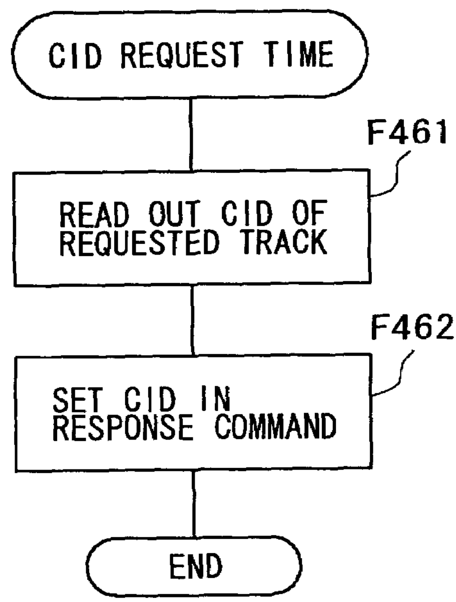

By the way, processes represented by flowcharts shown in FIGS. 33A and 33B can also be carried out as substitutes for the processes represented by the flowcharts shown in FIGS. 32A and 32B respectively. It is to be noted that, in the flowcharts shown in FIGS. 33A and 33B, processing steps identical with their counterparts in the flowcharts shown in FIGS. 32A and 32B respectively are denoted by the same reference numerals as the counterparts, and their explanations are not repeated. After locations of the sampling points P1 and P2 are found for track #n at a step F403 of the flowchart shown in FIG. 33A, data of the sampling points P1 and P2 is read out from the mini disc 100 at the next step F410 and supplied to the hash engine of the decryption processing unit 28. Then, at the next step F411, a content ID is found from the data. The found content ID is then stored in the buffer memory 30.

This processing is carried out for all tracks in the mini disc 100. That is to say, content IDs are generated and stored in the buffer memory 30 in advance for all the tracks.

When a request for a content ID is received from the personal computer 1, processing of the step F252 of the flowchart shown in FIG. 28 is carried out in accordance with the flowchart shown in FIG. 33B.

The flowchart shown in FIG. 33B begins with a step F461 at which a content ID of a track indicated by a track number specified in the request is read out from the buffer memory 30. Then, at the next step F462, the content ID is set in a response command. The response command is transmitted to the personal computer 1 at a step F253 of the flowchart shown in FIG. 28.

By carrying out such a process, it is not necessary to read out data of the sampling points P1 and P2 from the mini disc 100 and to compute a content ID at a point of time a request for the content ID is received from the personal computer 1. Thus, it is possible to carry out processing even faster at a request for a content ID.

It is to be noted that the processes represented by the flowcharts shown in FIGS. 32A and 33A are each carried out by the secondary-recording-medium recording/reproduction apparatus 20A, starting with an operation to read out the TOC from the mini disc 100. Once the TOC has been read out from the mini disc 100, the rest of the process can be performed at any available time such as a time during a reproduction operation or a time between reproduction operations. In a reproduction operation carried out in a mini-disc system, musical data is read out from a disc at a transfer rate intermittently. Thus, data of the sampling points P1 and P2 can be read out from the disc during intermittent pauses in the operation to read out the musical data from the disc intermittently.

In either case, the processes represented by the flowcharts shown in FIGS. 32A and 33A are each carried out before a request for the content ID is received from the personal computer 1. Thus, the check-in session can be implemented with a high degree of efficiency.

13: Content Write Protect Flag

When a check-out represented by the flowchart shown in FIGS. 26 and 27 is carried out for content data, the d1 bit of the content data's track mode in U-TOC sector 0 on the mini disc 100 is set at 1 as described earlier.

The d1 bit functions as a write protect flag for the content data checked out and recorded on the mini disc 100. In a mini-disc system, the d1 bit is the so-called write protect flag. That is to say, for a track with the d1 bit thereof set, operations to edit the track such as processing to erase, divide and link the track are prohibited. That is to say, no editing operations such as deletion and division processing can be carried out on a track with the d1 bit thereof set without regard to whether the recording apparatus is a conventional mini-disc recorder, which has been becoming popular at the present time, or a mini-disc recorder serving as the secondary-recording-medium recording/reproduction apparatus 20A.

In actuality, however, in a mini-disc system, the d1 bit is not set automatically for a track recorded on the mini disc 100.

Thus, the d1 bit has not only a function to prohibit an operation to edit the track, but also a function to reveal the fact that the track is a content checked out from the personal computer 1.

In the data transfer system provided by this embodiment, the d1 bit of a track is used as a write protect flag for prohibiting an operation to edit the track, which is a check-out content, and for forming a judgment as to whether or not the track is a check-out content when a request for a check-in of the track is received.

In order to check in a check-out content, from the content-management point of view, it is nice to check in a content having data remaining the same as the data of the check-out content. In addition, in the secondary-recording-medium recording/reproduction apparatus 20A, a content ID of a content is computed from data of the sampling points P1 and P2, locations of which are determined on the basis of the length of the content, as described above. Thus, if the original content is divided or concatenated with another content, the length of the resulting content will be inevitably different from the length of the original content. As a result, the content ID computed at a check-in time will also be unavoidably different from the content ID computed at the check-out time.

In other words, if a check-out content is edited, the content IDs will mismatch each other, making it impossible to execute proper management of the usage rule. In this case, a check-in of the content is not allowed in the system processing. In addition, an operation to check in a content having data different from the data of the check-out content due to an edit process is improper if viewed from the standpoint of the concept of the usage-rule management.

For the reasons described above, the policy of prohibiting an operation to edit a check-out content recorded on the mini disc 100 is regarded as a proper policy.

FIG. 34 is a diagram showing processes in the secondary-recording-medium recording/reproduction apparatus 20A, which are related to the write protect flag. It is to be noted that, notation WPF used in the figure denotes the write protect flag or the d1 bit of the track mode in U-TOC sector 0.

For a check-out content recorded on the mini disc 100, the write protect flag WPF is turned on in a process S100 carried out at the step F212 of the flowchart shown in FIG. 27 to update the U-TOC.

For a content other than a check-out content recorded on the mini disc 100 of the secondary-recording-medium recording/reproduction apparatus 20A in accordance with this data transfer system, that is, for a content received from another source or a content recorded on the mini disc 100 by another mini-disc recorder, on the other hand, the write protect flag WPF is kept in the off state as it is in a process S105. A content other than a check-out content recorded on the mini disc 100 of the secondary-recording-medium recording/reproduction apparatus 20A in accordance with this data transfer system is referred to hereafter as a self-recorded content.

In this data transfer system, there is conceived a management technique whereby, for a content or a track with the write protect flag WPF thereof turned on, an edit operation is prohibited at all so as to allow a check-in to be carried out later. However, there is also conceived a management technique to allow an edit operation by issuing a warning indicating that a check-in can no longer be carried out to the user.

First of all, consider a case in which an operation to edit a check-out content is prohibited at all. In this case, the system control unit 32 carries out a process S101 to reject an edit command for such a content as an implementation of the prohibition of an edit operation even if the edit command is received as a result of an operation carried out by the user or a result of another operation. Thus, a check-out content cannot be edited at all and the write protect flag WPF is always put in an on state. When a request for a check-in is received after the process 101, a process 104 is carried out. Thus, in this case, the process transition is S101→S104.

On the other hand, a self-recorded content can of course be edited with a high degree of freedom in a process S106. If an edit command is received as a result of an operation carried out by the user or a result of another operation, the system control unit 32 requests the MD control unit 21 to carry out processing to update the U-TOC as part of the implementation of the edit operation.

However, the write protect WPF of a self-recorded content is kept in an off state all the time in the process S105 without regard to whether an edit operation is carried out or not. When a request for a check-in is received after the process 105 or 106, the process 104 is carried out. Thus, in this case, the process transition is S105→S104 or S105→S106→S104.

In the case of a management technique to allow an edit operation by issuing a warning indicating that a check-in can no longer be carried out for a check-out content to the user as described above, if an edit command is received as a result of an operation carried out by the user or a result of another operation, first of all, the system control unit 32 outputs a message serving as a warning to a display unit not shown in FIG. 7 in a process S102. That is to say, the message warns the user of the fact that a check-in can no longer be carried out for the check-out content.

In response to the message, the user may cancel the edit command. When a request for a check-in is received after the process 102, a process 104 is carried out. Thus, in this case, the process transition is S102→S104. If the user does not cancel the edit command in spite of the warning, on the other hand, an edit operation can be carried out by assuming that the user consents to the condition that a check-in can no longer be carried out for a check-out content. In this case, the system control unit 32 requests the MD control unit 21 to carry out processing to update the U-TOC as part of the implementation of the edit operation in accordance with operations carried out by the user and other edit commands. At that time, the write protect flag WPF of the edited track, that is, the d1 bit of the track's track mode in U-TOC sector 0, is turned off in a process S103. When a request for a check-in is received after the process 103, a process 104 is carried out. Thus, in this case, the process transition is S102→S103→S104.

By carrying out the processes described above, as a result, the write protect flag WPF of a check-out content remains in an on state as long as no edit operation is carried out. On the other hand, the write protect flag WPF of an edited check-out content or a self-recorded content is put in an off state without regard to whether the self-recorded content is to be edited or not.

Thus, when the personal computer 1 makes a request for a content ID of a particular content to be checked in at the step F151 of the check-in session shown in FIG. 28, the secondary-recording-medium recording/reproduction apparatus 20A forms a judgment as to whether or not the particular content to be checked in can be indeed checked in at the step F251 by merely examining the write protect flag WPF or the d1 bit of the particular content's track mode in U-TOC sector 0 to determine whether the write protect flag WPF is on or off.

If the write protect flag WPF of the content, the content ID of which was requested, is off, the secondary-recording-medium recording/reproduction apparatus 20A needs to inform the personal computer 1 that the content cannot be checked in. In this case, it is thus possible to eliminate the processing of the step F253 of the flowchart shown in FIG. 28 to transmit the content ID from the secondary-recording-medium recording/reproduction apparatus 20A to the personal computer 1, and the processing of the step F152 to collate the content ID with a check-out content ID in the personal computer 1. The processing of the step F253 and the processing of the step F152 are wasteful since the content cannot be checked in anyway. The pieces of processing to be carried out at the steps F253 and F152 of the flowchart shown in FIG. 28 are provided to the bitter end for a content confirmed as an unedited check-out content. For an unedited check-out content, the processing of the step F253 to transmit the content ID from the secondary-recording-medium recording/reproduction apparatus 20A to the personal computer 1 and the processing of the step F152 to collate the content ID with a check-out content ID in the personal computer 1 are not wasteful. Thus, the check-in communication session and the confirmation processing can be carried out with a high degree of efficiency.

By the way, basically, a self-recorded content can be edited with a high degree of freedom. In some cases, however, it may be desired to impose a restriction on the free operations to edit self-recorded contents in an application running on the personal computer 1 where check-out contents coexist with self-recorded contents on the mini disc 100.

In order to impose such a restriction, in this embodiment, an inclusive log-in control command shown in FIG. 24 and an inclusive log-out control command shown in FIG. 25 are provided for implementing exclusive control by the personal computer 1 on functions of the secondary-recording-medium recording/reproduction apparatus 20A.

When the secondary-recording-medium recording/reproduction apparatus 20A receives an inclusive log-in control command shown in FIG. 24 from the personal computer 1, the system control unit 32 enters an edit prohibition mode or an edit restriction mode in dependence on a priority value specified in control the command.

As shown in FIG. 34, for example, in a process S107, editing and other processing of a self-recorded content can be prohibited or restricted. If editing and other processing of a self-recorded content are prohibited, an edit command generated as a result of an operation carried out by the user is not accepted.

It is to be noted that the user's operations including an operation to turn on the power and an operation to eject a disc are restricted or prohibited in accordance with the control levels described above. In turn, the control levels are determined by a priority value specified in an inclusive log-in control command.

When an inclusive log-out control command is received, on the other hand, the prohibition and/or the restriction set for edit operations are removed. In this case, a self-recorded content becomes editable and the process transition is S107→S106.

Since an inclusive log-in control command allows the personal computer 1 to exclusively control functions of the secondary-recording-medium recording/reproduction apparatus 20A, edit processing and other operations can be restricted in dependence on the state of the system operation. As a result, the system operation becomes more convenient.

14: Accounting-Information Process

Next, an accounting-information process is explained.

FIG. 36 is a diagram showing a system configuration for an accounting-information process for distribution of content data. It is to be noted that this system configuration is the same as that shown in FIG. 4 except that the configuration of the content server 91 is shown in detail.

As described earlier, the data transfer system implemented by this embodiment is a system in which musical data or the like is downloaded from the content server 91 to the HDD 5 serving as a primary recording medium as a content, and the content can then be checked out to the mini disc 100 serving as a secondary recording medium. It is needless to say that the content data is conceivably data provided by the content server 91 by charging a fee to the recipient.

In this case, the content server 91 is operated by an organization or an individual. The organization or the individual renders a service of providing contents. Basically, the content server 91 has a content-holding function for storing a variety of contents, a function for providing any of the contents to the personal computer 1 through the network 110 by communication and an accounting function for executing accounting management for users receiving contents.

These functions can all be operated by a single organization, a single company, an individual or the like, or by different organizations, different companies, different individuals or the like in a coordinated manner. For example, the functions are operated by the Internet websites which are linked to each other to form coordinated management.

As a secondary recording medium for eventually recording content data at a user site, a mini disc 100 or a memory card is employed as described earlier. A medium serving as a secondary recording medium is also used for storing prepaid-item information which cannot be rewritten. The content server 91 receives the prepaid-item information recorded in the secondary recording medium to carry out an accounting process for users.

The content server 91 comprises a network distribution apparatus 130, a content-database control apparatus 140, a customer information apparatus 150, a content database 160 and a customer database 170.

The network distribution apparatus 130 is a member for executing the function for providing any of the contents held by the content server 91 to the personal computer 1 or the like through the network 110.

The content-database control apparatus 140 and the content database 160 are each a member for executing the content-holding function for storing a variety of contents. The customer information apparatus 150 and the customer database 170 are each a member for executing the accounting function for executing accounting management for users receiving contents.

The content database 160 is implemented by a recording medium such as a hard disc and an optical disc. The content database 160 is used for storing typically a large number of musical contents, which are to be provided to users in services rendered for the users, in a musical-library form. The content-database control apparatus 140 controls operations to record and read out typically musical contents onto and from the content database 160. For example, the content-database control apparatus 140 reads out a content from the content database 160 and supplies the content to the network distribution apparatus 130 at a request made by the network distribution apparatus 130.

By the same token, the customer database 170 is implemented by a recording medium such as a hard disc and an optical disc. The customer database 170 is used for storing accounting information associated with prepaid-item information stored in the mini disc 100. The customer information apparatus 150 controls operations to record and read out accounting information onto and from the customer database 170. For example, the customer information apparatus 150 records accounting information onto the customer database 170 and reads out accounting information from the customer database 170, supplying the information to the network distribution apparatus 130 at a request made by the network distribution apparatus 130.

The members composing the content server 91 can all be operated by a single organization, a single company, an individual or the like, or by different organizations, different companies, different individuals or the like. For example, the network distribution apparatus 130 is operated by a distribution service company whereas the content-database control apparatus 140 and the content database 160 are operated by a record company, a record level company or the like. On the other hand, the customer information apparatus 150 and the customer database 170 can be operated by an accounting service firm.

In another case, a plurality of content-database control apparatus 140 and a plurality of content databases 160 are employed, whereas the network distribution apparatus 130 is capable of distributing contents stored in the content databases 160.

In the data transfer system implemented by this embodiment, the personal computer 1 establishes a communicative connection with the content server 91 to receive a list or a menu of presentable contents. When the user carries out an operation to select a desired content from those on the list, the content server 91 transmits the selected content to the personal computer 1. At the user site, the content is recorded onto the secondary recording medium 100 in a check-out operation described above. In this way, the user is capable of obtaining a desired piece of music or the like.

In addition, in this embodiment, for the accounting of the price of the content, prepaid-item information recorded on the mini disc 100 is used. As will be described later, the prepaid-item information recorded on the mini disc 100 includes a medium ID assigned to the mini disc 100 and a prepaid amount of money for the mini disc 100. The prepaid amount of money may vary from medium to medium.

The personal computer 1 receives prepaid-item information from the secondary-recording-medium recording/reproduction apparatus 20A or 20B, and passes on the information to the content server 91. The network distribution apparatus 130 carries out an accounting process on the customer database 170 on the basis of the prepaid-item information. Roughly speaking, in the customer database 170, accounting information associated with the prepaid-item information stored in the mini disc 100 has been recorded. When a content is distributed to the mini disc 100, the price of the content is subtracted from a present balance in the accounting information to result in a new balance. The initial balance was a copy of a portion of the prepaid-item information stored the mini disc 100. That is to say, the accounting process is carried out to update the accounting information stored in the customer database 170. On the other hand, the prepaid-item information stored in the mini disc 100 cannot be changed at all.

In the customer database 170, pieces of accounting information like ones shown in FIG. 37 have been recorded. Each piece of accounting information is a recorded set of data associated with a piece of prepaid-item information in a secondary recording medium 100. The recorded set of data typically includes a medium ID, a balance and a purchase history. The example shown in FIG. 37 includes pieces of accounting information K1 to K5 and so on. ID1 to ID5 and so on are medium IDs included in the pieces of accounting information K1 to K5 and so on respectively.

A medium ID included in accounting information is a medium ID included in prepaid-item information to be described later. The initial balance was a copy of a prepaid amount of money included in the prepaid-item information stored the mini disc 100. A new balance included in accounting information is obtained by subtracting the price of a purchased content from the present balance when the content is purchased. The balance is thereafter updated each time a content is purchased by subtracting the price of the content from the balance to give a new balance. The purchase history is a history of information such as a purchase date and time, the name of a content, the price of a content and a user terminal. That is to say, the history is content-related data, which is recorded each time a content is purchased.

It is to be noted that the accounting information may of course include other data such as the prepaid amount of money included in the prepaid-item information, the type of the medium, the seller of the medium and the author of the purchased content, or may of course exclude the history. With regard to the operation to distribute contents in accordance with the embodiment, the accounting information needs to include at least the medium ID and the balance, which have been described above. The other information may be included in dependence on conditions of the operation of the data transfer system and the type of the service.

Figure 38:
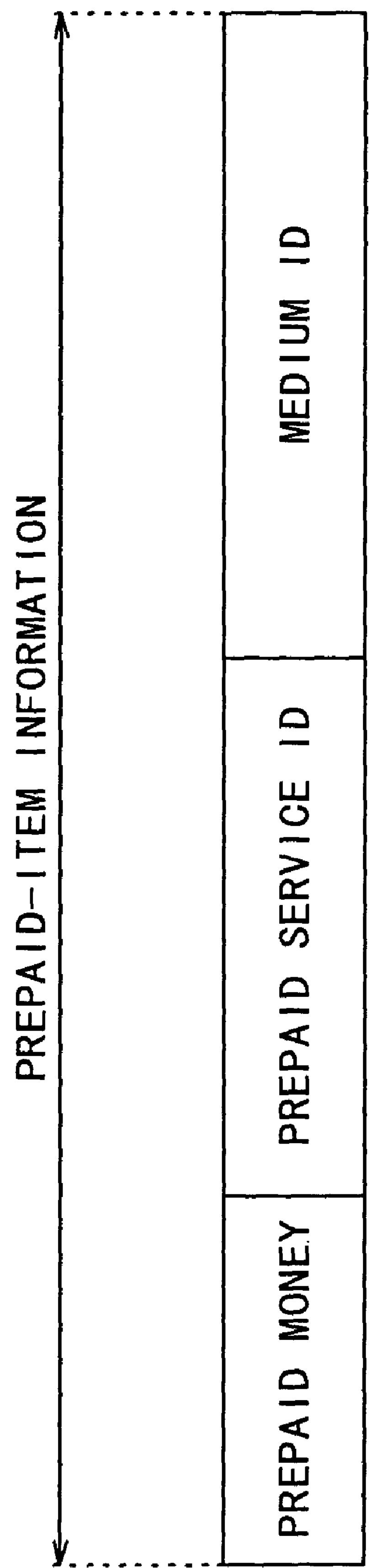
FIG. 38 is an explanatory diagram showing prepaid-item information according to the embodiment.

As described above, the prepaid-item information is recorded on the mini disc 100 as data that cannot be rewritten. Basically, the prepaid-item information includes a prepaid amount of money, a prepaid-service ID and a medium ID as shown in FIG. 38.

The prepaid amount of money is an amount of money prepaid by the user as an advance payment.

The secondary recording medium 100 is sold typically as an unused mini disc or an unused memory card. The unused mini disc or the unused memory card does not include recorded contents. The total selling price of the secondary recording medium 100 is set to include the prepaid amount of money. Assume that the selling price of an ordinary secondary recording medium 100 including no recorded contents is 500 yen and the prepaid amount of money included in the prepaid-item information prerecorded on the secondary recording medium 100 is set at 5,000 yen. In this case, the user must actually purchase the secondary recording medium 100 at a total selling price of 5,500 yen. It is needless to say that the total selling price can be set at an arbitrary price. For example, the secondary recording medium 100 itself including no recorded contents can be sold gratis and the prepaid amount of money can be set at 5,000 yen or discounted to a total selling price of 4,800 yen. The user purchasing a secondary recording medium 100 with a prepaid amount of money of 5,000 yen recorded thereon at the discounted total selling price of 4,800 yen is regarded as a user who has paid 5,000 yen as far as the content distribution service rendered by the data transfer system provided by this embodiment is concerned.

The prepaid-service ID represents the address of the content server 91, which renders the content distribution service. Typically, the prepaid-service ID is the address of the network distribution apparatus 130 for a communicative connection in the network 110. The prepaid-service ID can be an IP address in the Internet. When the personal computer 1 receives prepaid-item information for the secondary recording medium 100 mounted on the secondary-recording-medium recording/reproduction apparatus 20A, the personal computer 1 makes a communication access to the content server 91 on the basis of the prepaid-service ID included in the prepaid-item information in order to establish a connection to the content server 91.

It is to be noted that, in dependence on the configuration of the content server 91, the prepaid-service ID may represent the address of the content-database control apparatus 140 or the address of the customer information apparatus 150 instead of representing the address of the network distribution apparatus 130.

As another conceivable alternative, assume for example that the network distribution apparatus 130, the content-database control apparatus 140 and the customer information apparatus 150 are all created as the Internet websites linked to each other. In this case, the prepaid-service ID is set to represent the address of the content-database control apparatus 140 so that the personal computer 1 needs to make a communication access to the content-database control apparatus 140. Then, with the distribution process carried forward, the customer information apparatus 150 is linked, and the content-database control apparatus 140 as well as the customer information apparatus 150 are further subjected to general processing by the network distribution apparatus 130.

Conversely speaking, as a further conceivable alternative, the prepaid-service ID is set to represent the address of the customer information apparatus 150 so that the personal computer 1 needs to make a communication access to the customer information apparatus 150. Then, with the distribution process carried forward, the content-database control apparatus 140 is linked, and the content-database control apparatus 140 as well as the customer information apparatus 150 are further subjected to general processing by the network distribution apparatus 130.

The medium ID is an identification number assigned uniquely to the secondary recording medium 100. Assume that the user purchases 2 prepaid mediums each to be used as a secondary recording medium 100. In this case, the medium ID recorded on one of the secondary recording mediums 100 is different from the medium ID recorded on the other.

Typically, in the prepaid-item information, 8 bits can be allocated to the prepaid amount of money, 22 to 32 bits can be allocated to the prepaid-service ID and 32 to 40 bits can be allocated to the medium ID.

The bit counts are determined in accordance with the design of the prepaid-service system. It is nice to allocate a sufficiently large number of bits to the prepaid-service ID so that the bits can represent a large number of different addresses each assigned to a content server 91. By the same token, it is nice to allocate a sufficiently large number of bits to the medium ID so that the bits can represent different ID numbers of all sold prepaid mediums including those sold in the future. At least, 1 byte (or 8 bits) are allocated to the prepaid amount of money, 3 or 4 bytes are allocated to the prepaid-service ID and 3 or 4 bytes are allocated to the medium ID. Thus, the prepaid-item information has a size of at least 8 bytes.

The following description explains a relation between the prepaid-item information recorded on the mini disc 100 with a format and the accounting information shown in FIG. 37.

Assume for example that a user utilizes a secondary recording medium 100 with recorded prepaid-item information including a medium ID of ID1 and a prepaid amount of money set at 5,000 yen. At a point of time the secondary recording medium 100 is initially used, accounting information K1 shown in FIG. 37 is recorded in the customer database 170 employed in the content server 91. At that time, the accounting information K1 includes the same medium ID as the medium ID of the prepaid-item information and a balance equal to the prepaid amount of money included in the prepaid-item information. To put it concretely, the accounting information K1 includes a medium ID of ID1 and a balance of 5,000 yen.

Then, during the use of the secondary recording medium 100, a content is downloaded from the content server 91 to the personal computer 1 and, finally, checked out to the mini disc 100 employed in the secondary-recording-medium recording/reproduction apparatus 20A. In this case, an accounting process is carried out to deduct the price of the content from the balance included in the accounting information K1 to result in a new balance. To put it in detail, each time a content is downloaded and checked out to the secondary recording medium 100, the customer database 170 is searched for a piece of accounting information matching the medium ID included in the prepaid-item information recorded on the secondary recording medium 100 and the price of the content is deducted from the balance included in the piece of accounting information.

For example, a balance of 3,700 yen in the accounting information K1 shown in FIG. 37 for a medium ID of ID1 is obtained as a result of deducting the price of a content downloaded into the secondary recording medium 100, which has a medium ID of ID1 as a part of prepaid-item information recorded thereon, from the balance of 5,000 yen after the content is purchased at a price of 1,300 yen.

In addition, as is obvious from this technique of accounting process, the prepaid-item information recorded on the secondary recording medium 100 owned by the user is not updated at all. In other words, the prepaid-item information can be recorded on the secondary recording medium 100 as data that cannot be rewritten.

It is to be noted that the prepaid-item information can also be recorded on the secondary recording medium 100 as data that can be rewritten. In this case, however, the prepaid amount of money of the prepaid-item information and medium ID can be falsified for improper use. In addition, it is also feared that a problem of the service operation may arise due to falsification of the prepaid-service ID.

As described above, in the case of a mini disc used as the secondary recording medium 100, the prepaid-item information having a size of 8 bytes is recorded as data that cannot be rewritten by adopting one of the following techniques.

(1): The prepaid-item information is recorded in an area in the P-TOC.

(2): The prepaid-item information is recorded in an area in the U-TOC as data that cannot be rewritten.

(3): The prepaid-item information is recorded in the management region in an area outside the U-TOC as data that cannot be rewritten.

If the prepaid-item information is recorded in an area in the P-TOC, it is possible to conceivably allocate a special area with a size of 8 bytes for example in a P-TOC sector in the lead-in area shown in FIG. 9A as an area for recording the prepaid-item information.

If the prepaid-item information is recorded in an area in the U-TOC as data that cannot be rewritten, it is possible to allocate an unused area for example in sectors 0, 1, 2, 3 or 4 each having an already prescribed format as an area for recording the prepaid-item information. In order to eliminate the possibility of being rewritten of prepaid-item information, however, the use of a sector with a format not prescribed yet is conceivable.

For example, an area with a size of 8 bytes can be set in U-TOC sector 5 as an area for recording the prepaid-item information. In addition, in this case, a used-sector-field bit for sector 5 in U-TOC sector 0 is set at 0 to indicate that sector 5 is not used so that the prepaid-item information will not be rewritten. That is to say, an ordinary mini-disc recorder will thus recognize sector 5 as an unused sector so that the recorder will not carry out a process to update data in sector 5 or the like. Thus, the prepaid-item information cannot be rewritten at the user site.

Then, in the secondary-recording-medium recording/reproduction apparatus 20A provided by the embodiment, an application program for reading out the prepaid-item information reads out the information from sector 5.

It is to be noted that the unused sector for recording the prepaid-item information is not limited to sector 5. That is to say, sector 6, sector 7 and another unused sector can of course be utilized as a sector for recording the prepaid-item information.

If the prepaid-item information is recorded in the management region shown in FIG. 9B in an area outside the U-TOC as data that cannot be rewritten, for example, a sector in an unused cluster like one shown by a hatched portion PD can conceivably be allocated as an area for recording the prepaid-item information.

In the management area, a power calibration area PCA and a U-TOC area are formed and their locations are shown by the P-TOC as described above. By referring to the P-TOC, an ordinary mini-disc recorder is thus capable of making an access to the power calibration area PCA and the U-TOC area.

However, an ordinary mini-disc recorder is thus capable of making an access to the hatched portion PD, the location of which is not shown by the P-TOC. An area such as the hatched portion PD is an area inaccessible to an ordinary mini-disc recorder or an area, which has no meaning even if an access thereto is made. Thus, the prepaid-item information recorded in the hatched portion PD cannot be rewritten.

In the secondary-recording-medium recording/reproduction apparatus 20A used in the data transfer system implemented by this embodiment, an application program for reading out the prepaid-item information is capable of reading out the information from the hatched portion PD. In order to make the secondary-recording-medium recording/reproduction apparatus 20A capable of reading out the information from the hatched portion PD, it is necessary for example to prescribe the start address of the hatched portion PD as a location having a predetermined offset relative to the U-TOC start address shown by the P-TOC. Assume for example that the U-TOC is recorded in area stretched over 3 clusters. In this case, the start address of an area for recording the prepaid-item information can be prescribed as an address equal to the sum of the start address USTA of the U-TOC and the size of 5 clusters.

Assume for instance that, in the example described above, a mini disk is sold as a prepaid medium having a medium ID of 4. In addition, as explained in the description of a mini disc, also in the case of prepaid-item information with a size of at least 8 bytes stored in a memory card or an optical disc such as a CD-R, a CD-RW or a DVD used as the secondary recording medium 100, it is nice to set a location for storing the information on the basis of a management format or the like of the medium.

By the way, in constructing a data transfer system using the prepaid-item information, it is necessary to make the personal computer 1 capable of acquiring the prepaid-item information of the secondary recording medium (or the mini disc) 100 mounted on the secondary-recording-medium recording/reproduction apparatus 20A.

For this reason, by specifying prepaid-item information in the sub-function of a check-in control command explained earlier by referring to FIGS. 20 and 21, the personal computer 1 is capable of requesting the secondary-recording-medium recording/reproduction apparatus 20A to provide the prepaid-item information.

In addition, by using a check-in response command shown in FIG. 23, the secondary-recording-medium recording/reproduction apparatus 20A is capable of transmitting the prepaid-item information recorded on the mini disc 100 to the personal computer 1 at a request made by the personal computer 1.

Figure 35:
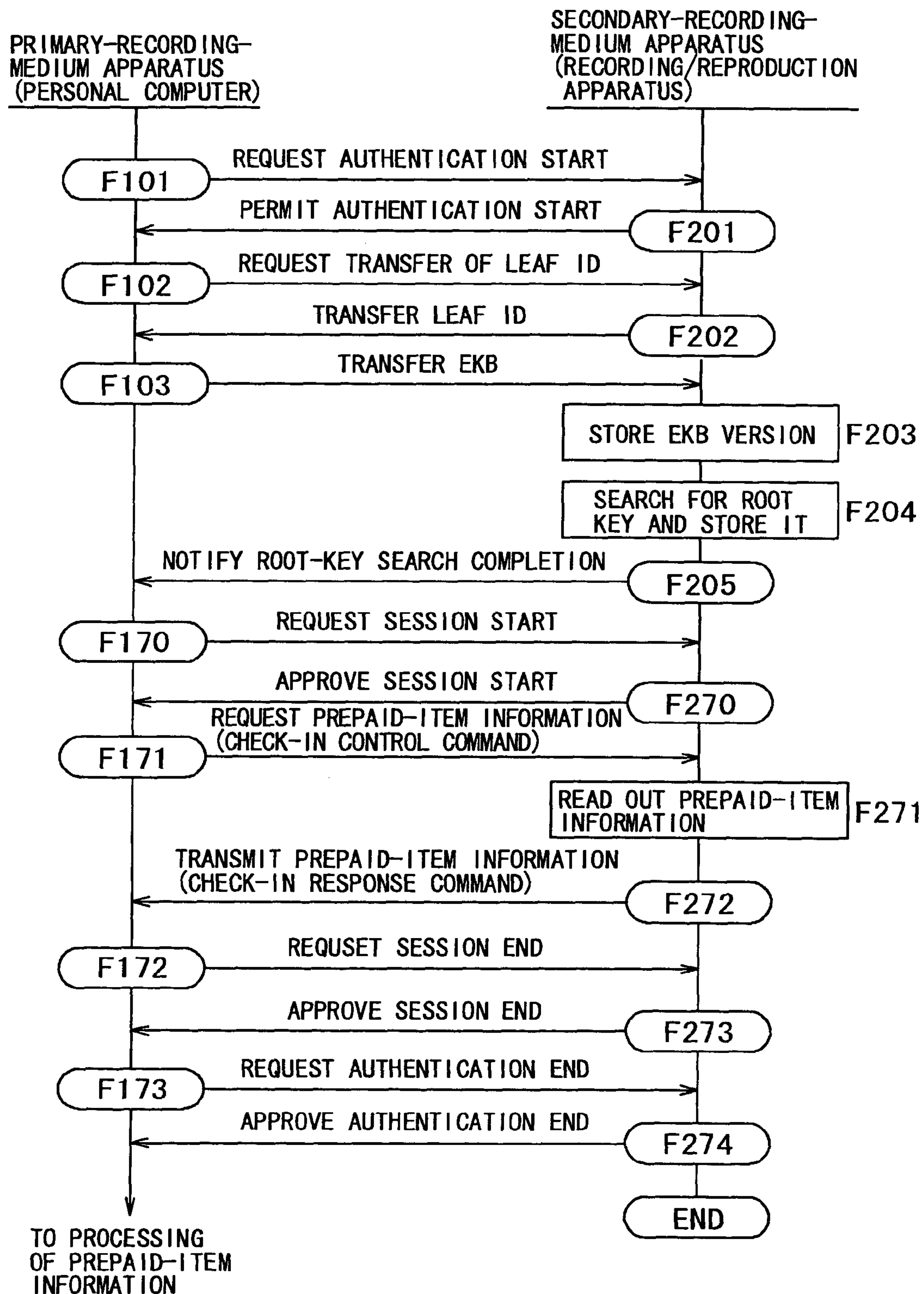
FIG. 35 shows a flowchart representing operations to acquire prepaid-item information in the embodiment.

FIG. 35 shows a flowchart representing operations to acquire prepaid-item information.

In the flowchart shown in FIG. 35, the CPU 2 employed in the personal computer 1 carries out processing at steps F101 to F173 whereas components such as the system control unit 32 and the MD control unit 21, which are employed in the secondary-recording-medium recording/reproduction apparatus 20A, carry out processing at steps F201 to F274.

A communication session is implemented by exchanging a variety of control commands and a variety of response commands transmitted in response to the control commands.

Also in this case, processing including the start of an authentication process, a transfer of an EKB and a search for a root key is carried out in the same way as the check-out described earlier. To be more specific, pieces of processing varied out at steps F101 to F103 and F201 to F205 are the same as their counterparts shown in FIGS. 26 and 28, making it unnecessary to repeat their explanation.

At a step F170, the personal computer 1 transmits a control command making a request for the start of a session to the secondary-recording-medium recording/reproduction apparatus 20A.

In response to this control command, the secondary-recording-medium recording/reproduction apparatus 20A transmits a response command at a step F270. It is to be noted that, also in this case, the authentication processing explained earlier by referring to FIG. 12 is carried out.

If the result of the authentication processing carried out on the secondary-recording-medium recording/reproduction apparatus 20A is OK, the requested session is started. In this case, the personal computer 1 makes a request for the prepaid-item information at a step F171.

That is to say, the personal computer 1 transmits a check-in control command explained earlier by referring to FIG. 20. The value of the sub-function included in this check-in control command is not 00h or 01h, but another value indicating a request for the prepaid-item information. For meanings of the sub-function values, refer to FIG. 21.

At this request, the secondary-recording-medium recording/reproduction apparatus 20A reproduces the prepaid-item information from the aforementioned special area of the mini disc 100 at a step F271.

Then, at the next step F272, the reproduced prepaid-item information having a typical size of 8 bytes is set in a check-in response command shown in FIG. 23, and the check-in response command is then transmitted to the personal computer 1.

Receiving the check-in response command including the prepaid-item information, the personal computer 1 transmits a control command making a request for an end of the session to the secondary-recording-medium recording/reproduction apparatus 20A at a step F172. At a step F273, the apparatus 20A transmits a response command approving the end of the session to the personal computer 1 in response to the control command.

At a step F173, the personal computer 1 transmits a control command to end the authentication state to the secondary-recording-medium recording/reproduction apparatus 20A. At a step F274, the secondary-recording-medium recording/reproduction apparatus 20A transmits a response command approving the end of the authentication state to the personal computer 1 in response to the control command.

At this point of time, the communications for passing the prepaid-item information from the secondary-recording-medium recording/reproduction apparatus 20A to the personal computer 1 are ended.

Thereafter, the personal computer 1 carries out a process for the prepaid-item information. To be more specific, the communication unit 8 employed in the personal computer 1 establishes a communicative connection to the content server 91 through the network 110 and transmits the prepaid-item information received from the secondary-recording-medium recording/reproduction apparatus 20A to the content server 91. In addition to the prepaid-item information, the personal computer 1 also transmits a content data identifying information checked out to the mini disc 100 to the content server 91. The content server 91 then carries out an accounting process for the user. To be more specific, the content server 91 updates the database shown in FIG. 37.

As described above, the personal computer 1 is capable of requesting the secondary-recording-medium recording/reproduction apparatus 20A to transfer the prepaid-item information peculiar to the mini disc 100. Thus, an accounting process based on a prepaying technique can be carried out.

As described above, this embodiment adopts a technique for acquiring prepaid-item information peculiar to the mini disc 100. It is to be noted that various kinds of other unique information can of course be acquired by the personal computer 1 through exchanges of similar control commands and similar response commands issued in response to the control commands.

Examples of the other unique information are a utilization state of the user and a user ID, which have been recorded in the secondary recording medium 100. By acquiring such unique information, it is possible to assume that the personal computer 1 is capable of managing the secondary recording medium 100 or passing the information to the content server 91 to be used by the content server 91 in a variety of services rendered for the user and various kinds of management.

A preferred embodiment has been described so far. However, the scope of the present invention is not limited to the embodiment. That is to say, it is possible to provide a variety of versions within a range of essentials of the present invention by changing the operations of the data transfer system including the encryption, the data paths, the check-out/check-in techniques, the authentication technique, the content-ID generation technique, the content-ID management technique, the actual example of write control flag, the editing management and the prepaid information.

In addition, the present invention does not limit the object of the data transfer processing from a primary recording medium to a secondary recording medium as described above to an SDMI content. Instead, the data transfer processing can be applied widely to various kinds of content data. Furthermore, the primary recording medium can be a medium other than the HDD.

It is needles to say that the secondary recording medium is not limited to a mini disc and the secondary-recording-medium recording/reproduction apparatus 20A is not limited to a mini-disc recording apparatus. Instead, the secondary recording medium can be of one of different types. For example, as the mini disc 100, it is possible to employ another medium such as a CD-R, a CD-RW, a DVD-RAM, a DVD-R, a DVD-RW or one of a variety of memory cards. Thus, as the secondary-recording-medium recording/reproduction apparatus 20A, a recording apparatus for the other medium can be used.

In addition, the recording/reproduction apparatus 20B can also be used as a secondary recording medium conforming to the SDMI standard as described above. That is to say, the present invention can also be applied to processing to transfer content data to the recording/reproduction apparatus 20B.

As is obvious from the above description, in accordance with the present invention, the data transfer apparatus (or the primary-recording-medium apparatus) manages transfer rights for contents stored in the primary recording medium. To be more specific, the data transfer apparatus generates a first content descriptor of a content transferred to the data-recording apparatus (or the secondary-recording-medium apparatus). The data transfer apparatus then creates a data table associating the first content descriptor with a second content descriptor generated by the data-recording apparatus for the transferred content and received from the data-recording apparatus. The data table is used in the management of rights to transfer contents from the data transfer apparatus to the data-recording apparatus.

That is to say, even if a second content descriptor (or a content ID) for a content cannot be recorded in the secondary recording medium, the second content descriptor (or the content ID) generated by the data-recording apparatus employing the secondary recording medium and used for identifying the content is associated with another content ID (a first content descriptor) generated for the same content by the data transfer apparatus employing the primary recording medium. Thus, management of rights can be executed properly by using content IDs at check-out and check-in times. As a result, even if a content is recorded on a secondary recording medium not conforming to the SDMI standard, rights to transfer, copy and reproduce the content can be managed properly so that both convenience and protection of a copyright can be provided to the user.

In addition, the data-recording apparatus for recording and reproducing data onto and from a secondary recording medium generates a content's second content identifier based on partial data extracted from the content in an unencrypted state. For each content, it is thus possible to generate a content ID unique to the content.

Furthermore, the partial data used for generating a content ID of a content is extracted from the content's sampling point set on the basis of the length of the content. The sampling point is used as an extraction point from which partial data of the content is extracted. Therefore, for each content, it is possible to generate a content ID peculiar to the content. That is to say, even if the second content identifier cannot be recorded onto the secondary recording medium, for each content, the data-recording apparatus employing the secondary recording medium is always capable of generating a second content identifier peculiar to the content. Thus, the second content identifier can be used as information proper for the right management cited above.

Moreover, one or more points other than the start and the end of a content can be used as sampling points for generating a second content identifier of the content. Thus, the second content identifier can be used as information proper for and peculiar to the content. In the case of an audio content, for example, the start and the end of the content are typically soundless, containing data, which is the same as other contents in many cases. However, portions other than the start and the end contain data, which is never the same as other contents.

In addition, when a content is transferred from a data transfer apparatus to a data-recording apparatus as a check-out content, on a data path ending with an operation to record a decrypted content onto the secondary recording medium, partial data is extracted from a sampling point in the content, and processing based on the extracted partial data is carried out to generate a second content identifier for the content. Thus, it is not necessary to carry out an operation to make a read access to the secondary recording medium in order to acquire partial data from the sampling point to be used in the processing to generate a second content identifier.

As a result, it is possible to improve the efficiency of a process carried out by the data-recording apparatus to inform the data transfer apparatus of a second content identifier at a check-out time and to perform a sequence of check-out communication operations at a higher speed.

Furthermore, with the secondary recording medium for recording contents mounted on the data-recording apparatus, during a period of time in which no request for a check-in is made, partial data is reproduced from the secondary recording medium and stored in a memory in advance for each of the contents, or partial data is reproduced from the secondary recording medium to be used for generating a second content identifier to be stored in a memory in advance for each of the contents. Thus, when a request for a second content identifier is made prior to a check-in, an access to the secondary recording medium is not required. As a result, a sequence of check-in communication operations can be carried out at a higher speed.

The invention claimed is:

1. A data transfer system comprising a data transfer apparatus and a data-recording apparatus, wherein said data transfer apparatus comprises:

primary-recording-medium driving means for recording and reproducing data onto and from a primary recording medium;

storage controlling means for controlling said primary-recording-medium driving means to store content data in an encrypted state and a first content identifier generated uniquely to said content data onto said primary recording medium;

communication means for carrying out a variety of data communications including transfers of content data with said data-recording apparatus; and transfer management means for managing rights to transfer content data and for managing transfer rights of content data already transferred to said data recording apparatus by using a generated table for associating said first content identifier with a second content identifier received from said data-recording apparatus and generated by said data-recording apparatus for said content data already transferred to said data-recording apparatus; and wherein said data-recording apparatus comprises:

communication means for carrying out data communications including exchanges of content data with said data transfer apparatus;

secondary-recording-medium driving means for recording and reproducing data onto and from a secondary recording medium;

decryption means for decrypting encrypted content data received from said data transfer apparatus, putting said content data in an unencrypted state;

recording controlling means for controlling said secondary-recording-medium driving means to record said encrypted content data decrypted by said decryption means onto said secondary recording medium;

identifier generation means for generating a second content identifier of said content data from said content data in said unencrypted state; and identifier-transmission controlling means for requesting said communication means to transmit said second content identifier generated by said identifier generation means to said data transfer apparatus.

2. A data transfer system according to claim 1, wherein said transfer management means manages said rights to transfer content data by managing the number of allowable transfers of content data to said data-recording apparatus.

3. A data transfer system according to claim 1, wherein, when a right to reproduce content data from said secondary recording medium is lost for said content data recorded on said secondary recording medium, said transfer management means requests said data-recording apparatus to transmit said second content identifier generated for said content data and, after using said table for collation of said second content identifier received from said data-recording apparatus, updates said right to transfer said content data.

4. A data transfer system according to claim 1, wherein said identifier generation means extracts a portion of said content data from a sampling point determined on the basis of the length of said content data, and generates a second content identifier by carrying out a process using said extracted portion.

5. A data transfer system according to claim 4, wherein a point or a plurality of points other than a start and an end of content data are used as said sampling points for generating a second content identifier of said content data.

6. A data transfer system according to claim 1, wherein:

when said content data is received from said data transfer apparatus, said identifier generation means extracts a portion from said sampling point in said content data on a data path ending with an operation to record said content data decrypted by said decryption means onto said secondary recording medium, and generates a second content identifier by carrying out a process using said extracted portion; and upon completion of a transfer of said content data from said data transfer apparatus, said identifier-transmission controlling means requests said communication means to transmit said second content identifier generated by said identifier generation means to said data transfer apparatus.

7. A data transfer system according to claim 1, wherein, with said secondary recording medium for recording contents mounted on said data-recording apparatus:

said secondary-recording-medium driving means reproduces a portion from a sampling point in one of said contents recorded in said secondary recording medium and stores said portion in a storage means in advance for each of said contents;

when a request for said second content identifier of one of said contents recorded in said secondary recording medium is received from said data transfer apparatus, said identifier generation means generates said second content identifier by carrying out a process using extracted portion of said sampling point already stored in said storage means; and said identifier-transmission controlling means requests said communication means to transmit said second content identifier generated by said identifier generation means to said data transfer apparatus.

8. A data transfer system according to claim 1, wherein, with said secondary recording medium for recording contents mounted on said data-recording apparatus:

said secondary-recording-medium driving means reproduces a portion from a sampling point in one of said contents data recorded in said secondary recording medium, said identifier generation means uses said reproduced portion in a process to generate said second content identifier to be stored in a storage means in advance for each of said contents; and when a request for said second content identifier of one of said contents recorded in said secondary recording medium is received from said data transfer apparatus, said identifier-transmission controlling means requests said communication means to transmit said second content identifier already stored in said storage means to said data transfer apparatus.

9. A data transfer apparatus comprising:

primary-recording-medium driving means for recording and reproducing data onto and from a primary recording medium;

storage controlling means for storing encrypted content data and first content identifier generated inherently for the content data onto said primary recording medium;

communication means for carrying out a variety of data communications including transfers of content data with an external data-recording apparatus; and transfer management means for managing rights to transfer content data and for managing transfer rights of content data already transferred to said external data-recording apparatus by using a generated table for associating said first content identifier with a second content identifier received from said external data-recording apparatus and generated by said data-recording apparatus for said content data already transferred to said data-recording apparatus.

10. A data transfer apparatus according to claim 9, wherein said transfer management means manages said rights to transfer content data by managing the number of allowable transfers of content data to said external data-recording apparatus.

11. A data transfer apparatus according to claim 9, wherein, when a right to reproduce content data from said secondary recording medium is lost for said content data recorded on said secondary recording medium, said transfer management means requests said external data-recording apparatus to transmit said second content identifier generated for said content data and, after using said table for collation of said second content identifier received from said data-recording apparatus, updates said right to transfer said content data.

* * * * *